(12) United States Patent
Tsang et al.

(10) Patent No.: US 11,087,043 B2
(45) Date of Patent: Aug. 10, 2021

(54) FULL WAVE SIMULATIONS OF PHOTONIC CRYSTALS AND METAMATERIALS USING THE BROADBAND GREEN'S FUNCTIONS

(71) Applicant: Leung W. Tsang, Ann Arbor, MI (US)

(72) Inventors: Leung W. Tsang, Ann Arbor, MI (US); Shurun Tan, Ann Arbor, MI (US)

(73) Assignee: Leung W. Tsang, Ann Arbor, MI (US)

( * ) Notice: Subject to any disclaimer, the term of this patent is extended or adjusted under 35 U.S.C. 154(b) by 323 days.

(21) Appl. No.: 15/798,148

(22) Filed: Oct. 30, 2017

(65) Prior Publication Data
US 2018/0121580 A1    May 3, 2018

Related U.S. Application Data

(60) Provisional application No. 62/415,198, filed on Oct. 31, 2016.

(51) Int. Cl.
*G06F 30/20* (2020.01)
*G06F 17/12* (2006.01)
(Continued)

(52) U.S. Cl.
CPC .............. *G06F 30/20* (2020.01); *G06F 17/12* (2013.01); *G06F 30/23* (2020.01); *G06F 2111/10* (2020.01)

(58) Field of Classification Search
CPC .. G06F 17/5009; G06F 17/12; G06F 17/5018; G06F 2217/16
See application file for complete search history.

(56) References Cited

U.S. PATENT DOCUMENTS 5,963,329 A    10/1999  Conrad et al.
6,608,690 B2   8/2003   Niu et al.
(Continued)

OTHER PUBLICATIONS

Chang et al "Fast and broadband modeling method for multiple vias with irregular antipad in arbitrarily shaped power/ground planes in 3-D IC and packaging based on generalized Foldy-Lax equations." IEEE Transactions on Components, Packaging and Manufacturing Technology 4, No. 4 685-696 (Year: 2013).*
(Continued)

*Primary Examiner* — Chuen-Meei Gan
(74) *Attorney, Agent, or Firm* — Seed IP Law Group LLP

(57) ABSTRACT

Broadband Green's function computing technique that employs low wavenumber extraction, obtains fast frequency independent modal band solutions and achieves fast convergence of modal expansions, is used to model and design electromagnetic wave behavior of signals in artificial materials with periodic structures, including metamaterials, photonic crystals, and phononic crystals, which are used for smart microwave devices, photonic devices, and acoustic devices. The Broadband Green's function is a general response function for artificial materials and is used to model bandgaps, bandpasses, impurities, defects, displacements of scatterers, and to formulate integral equations for periodic scatters in a finite volume. Designs of metamaterials, photonic crystals, and phononic crystals enable controlling the waves through bandpasses, bandgaps, surface states, polarizations, defects, absorption, enhancement, refraction, substrates, and guidance. The Broadband Green's function technique is used in computer simulations to analyze wave behavior over a broad frequency range, which improves design optimization of smart microwave and photonic devices.

17 Claims, 48 Drawing Sheets

(51) Int. Cl.
    *G06F 30/23*     (2020.01)
    *G06F 111/10*    (2020.01)

(56)            References Cited

U.S. PATENT DOCUMENTS

| | | | |
|---|---|---|---|
| 7,038,850 | B2 | 5/2006 | Chang et al. |
| 7,106,459 | B2 | 9/2006 | Chu |
| 7,149,666 | B2 | 12/2006 | Tsang et al. |
| 7,359,929 | B2 | 4/2008 | Tsang et al. |
| 9,946,825 | B2 | 4/2018 | Tsang et al. |
| 2003/0072130 | A1* | 4/2003 | Tsang ............... G06F 17/5036 361/679.01 |
| 2004/0268287 | A1 | 12/2004 | Toh |
| 2005/0102343 | A1* | 5/2005 | Tsang ............... G06F 17/5018 708/446 |
| 2012/0323356 | A1* | 12/2012 | Dziura ............... G01N 21/47 700/121 |
| 2013/0080984 | A1* | 3/2013 | Liu ..................... G06F 17/5081 716/112 |
| 2014/0300695 | A1 | 10/2014 | Smalley et al. |
| 2016/0314231 | A1* | 10/2016 | Tsang ............... G06F 17/5036 |
| 2016/0357884 | A1* | 12/2016 | Makarov ........... G06F 17/5009 |
| 2018/0011014 | A1* | 1/2018 | Setija ................ G01N 21/4788 |

OTHER PUBLICATIONS

Tsang, Leung. "Broadband calculations of band diagrams in periodic structures using the broadband green's function with low wavenumber extraction (BBGFL)."; Progress in Electromagnetics Research; 153 (2015): 57-68. (Year: 2015).*

Lehmann, G. "The Green Function of Ideal Crystals and Electronic Properties of Localized Defects in Metals."; physica status solidi (b);70, No. 2 (1975): 737-748. (Year: 1975).*

Tsang, Leung, and Xin Chang. "Modeling of vias sharing the same antipad in planar waveguide with boundary integral equation and group T-matrix method."; IEEE transactions on components, packaging and manufacturing technology, No. 2 (2012): 315-327. (Year: 2013).*

Tsang, Leung, and Shaowu Huang. "Broadband Green's function with low wavenumber extraction for arbitrary shaped waveguide and applications to modeling of vias in finite power/ground plane." Progress in Electromagnetics Research 152 (2015): 105-125. (Year: 2015).*

Tsang, Leung, and Shurun Tan. "Calculations of band diagrams and low frequency dispersion relations of 2D periodic dielectric scatterers using broadband Green's function with low wavenumber extraction (BBGFL)." Optics Express 24, No. 2 (2016): 945-965. (Year: 2016).*

Tan, Shurun, and Leung Tsang. "Green's functions, including scatterers, for photonic crystals and metamaterials." JOSA B 34, No. 7 (2017): 1450-1458. (Year: 2017).*

Huang, Shaowu, and Leung Tsang. "Broadband Green's function and applications to fast electromagnetic modeling of high speed interconnects." In 2015 IEEE International Symposium on Antennas and Propagation & USNC/URSI National Radio Science Meeting, pp. 1478-1479. IEEE, 2015. (Year: 2015).*

Zhao, Li-Ming, Xue-Hua Wang, Ben-Yuan Gu, and Guo-Zhen Yang. "Green's function for photonic crystal slabs." Physical Review E 72, No. 2 (2005): 026614. (Year: 2005).*

Tsang, Leung, and Shaowu Huang. "Broadband Green's function with low wavenumber extraction for arbitrary shaped waveguide and applications to modeling of vias in finite power/ground plane."; Progress in Electromagnetics Research; 152 (2015): 105-125. (Year: 2015).*

Tsang, Leung, and Shurun Tan. "Calculations of band diagrams and low frequency dispersion relations of 2D periodic dielectric scatterers using broadband Green's function with low wavenumber extraction (BBGFL)."; Optics Express; 24, No. 2 (2016): 945-965. (Year: 2016).*

Tan, Shurun, and Leung Tsang. "Green's functions, including scatterers, for photonic crystals and metamaterials."; Josa B; 34, No. 7 (2017): 1450-1458. (Year: 2017).*

Huang, Shaowu, and Leung Tsang. "Broadband Green's function and applications to fast electromagnetic modeling of high speed interconnects."; 2015 IEEE International Symposium on Antennas and Propagation & USNC/URSI National Radio Science Meeting, pp. 1478-1479. IEEE, 2015. (Year: 2015).*

Zhao, Li-Ming, Xue-Hua Wang, Ben-Yuan Gu, and Guo-Zhen Yang. "Green's function for photonic crystal slabs."; Physical Review; 72, No. 2 (2005): 026614. (Year: 2005).*

Chang et al., "Fast and Broadband Modeling Method for Multiple Vias With Irregular Antipad in Arbitrarily Shaped Power/Ground Planes in 3-D IC and Packaging Based on Generalized Foldy-Lax Equations," *IEEE Transactions on Components, Packaging and Manufacturing Technology* 4(4):685-696, 2014.

Huang et al., "Fast Broadband Modeling of Traces Connecting Vias in Printed Circuit Boards Using Broadband Green's Function Method," *IEEE Transactions on Components, Packaging and Manufacturing Technology*, 2017, 13 pages.

Huang et al., "Fast Electromagnetic Analysis of Emissions From Printed Circuit Board Using Broadband Green's Function Method," *IEEE Transactions on Electromagnetic Compatibility* 58(5):1642-1652, 2016.

Liao et al., "High Order Extractions of Broadband Green's Function with Low Wavenumber Extractions for Arbitrary Shaped Waveguide," *Progress in Electromagnetics Research* 158:7-20, 2017.

Tan et al., "Green's Functions, including scatterers, for photonic crystals and metamaterials", Journal of the Optical Society of America B, vol. 34(7), Jul. 2017, 9 pages.

Tan et al., "Arbitrary Wire Medium Characterization Using 3D Broadband Green's Function with Higher Order Low Wavenumber Extractions", IEEE Transactions on Antennas and Propagation, Sep. 2017, 7 pages.

Tan et al., "Scattering of Waves by a Halfspace of Periodic Scatterers Using Broadband Green's Function", Optics Letters, Sep. 2017, pp. 1-5.

Tsang, "Broadband Calculations of Band Diagrams in Periodic Structures Using the Broadband Green's Function with Low Wavenumber Extraction (BBGFL)," *Progress in Electromagnetics Research*, 153:57-68, 2015.

Tsang et al., "Broadband Green's Function with Low Wavenumber Extraction for Arbitrary Shaped Waveguide and Applications to Modeling of Vias in Finite Power /Ground Plane," *Progress in Electromagnetics Research* 152:105-125, 2015.

Harrington, Roger F., "Field Computation by Moment Methods," Chapters 1, 3, and 4, 1993.

Rao et al., "Electromagnetic Scattering by Surfaces of Arbitrary Shape," Sep. 1979, 63 pages.

Peterson, Andrew F., "Computational Methods for Electromagnetics," Chapters 7 and 10, 1998.

Huang, "Broadband Green's Function and Applications to Fast Electromagnetic Analysis of High-Speed Interconnects," University of Washington, 2015, 221 pages.

U.S. Appl. No. 62/152,702, filed Apr. 24, 2015, 52 pages.

* cited by examiner

FULL WAVE SIMULATIONS OF PHOTONIC CRYSTALS AND METAMATERIALS USING THE BROADBAND GREEN'S FUNCTIONS

BACKGROUND

Technical Field

The present disclosure relates to modeling and design of electromagnetic, optical, and acoustic wave behavior of signals in artificial materials known as metamaterials, photonic crystals, and phononic crystals that are used for smart microwave devices, photonic devices, and acoustic devices through controlling waves through bandpasses, bandgaps, surface states, band edge states, polarizations, defects, disorders, shape variations, absorption, enhancement, refraction, substrates, scatterer properties, and guidance.

Description of the Related Art

Metamaterials, photonic crystals, and phononic crystals are artificial materials that consist of elements smaller than a wavelength embedded periodically in a background. The elements act as scatterers to scatter electromagnetic, optical, and acoustic waves. Because the scatterers are placed periodically, the scattering of waves are coherent. The elements can be manipulated and tuned to control the waves scattering and propagation achieving important wave properties, such as absorption, bandgaps, bandpasses, enhancement, refraction, surface states, substrates, and guidance. Additional manipulations can be achieved by introducing defects, sources, impurities, disorders, displacements, etc. into the periodic structures. The periodic structures can also be finite in size with sources of waves from inside or outside. Smart microwave, photonic, and acoustic devices are designed and fabricated to utilize these wave functional behaviors. Computer simulations of wave behavior are very helpful for the design and optimization of performance of these smart devices. Moreover, computer simulations are also needed for performance over a wide frequency or wavelength range.

Existing electromagnetic simulation tools modeling smart devices of metamaterials, photonic crystals, and phononic crystals tend to be computationally complex, inefficient, and inaccurate. They are also not suitable for broadband analysis, as solutions have to be computed one frequency or one wavelength at a time to study the frequency and wavelength dependence.

BRIEF SUMMARY

Utilization of finite difference in time domain method (FDTD), finite element method (FEM), method of moment (MoM), plane wave method, and the method of multiple scattering (MST). The MoM and MST are based on free space Green's function or periodic Green's function of an empty lattice, is a slow process that entails finding the multi-band solutions one at a time and solving the multi-frequency wave behavior one frequency or one wavelength at a time. For any relative small change in geometry, such as adding an impurity, a defect, a displacement of a scatterer, or confining the periodic structure in a finite volume, these solution methods repeat the entire calculations of the solutions of all the wave interactions among scatterers.

Embodiments described herein utilize a Broadband Green's function computer simulation technique that employs low wavenumber extraction, efficiently obtains frequency independent modal solutions of multi-bands, and obtains fast convergence of modal expansions. The Broadband Green's function technique permits simulations of a broad frequency range as the Broadband Green's function can be used over a wide frequency range. In addition, for relatively small change in the geometry, such as adding an impurity, displacement of a scatterer, or putting the periodic structure in a finite volume, the Broadband Green's function described herein can be applied to the part that is changed without repeating the entire calculations. It can be used to formulate integral equations of problems instead of using the traditional Green's functions.

Green's functions are general physical response functions. Previous Green's functions include free space Green's functions; periodic Green's functions for empty periodic lattices; Green's functions of regular geometry, such as a sphere or cylinder; Green's functions of layered media; etc. The Broadband Green's functions described herein include the presence of periodic and arbitrarily shaped scatterers.

The Broadband Green's function method described herein has been applied to the problem of modeling the band structures of periodic structures, such as metamaterials, photonic crystals, and phononic crystals. It has also been applied to modeling the broadband behavior of the propagation of waves due to a point source in the periodic structure or a defect/impurity in the periodic structure. This Broadband Green's function technique is useful in the design of smart microwave, millimeter wave, photonic, and acoustic devices using metamaterials, photonic crystals, and phononic crystals.

DESCRIPTION OF THE SEVERAL VIEWS OF THE DRAWINGS

In the drawings, identical reference numbers identify similar elements or acts. The sizes and relative positions of elements in the drawings are not necessarily drawn to scale.

DETAILED DESCRIPTION

In the following description, certain specific details are set forth in order to provide a thorough understanding of various aspects of the disclosed subject matter. However, the disclosed subject matter may be practiced without these specific details. In some instances, well-known structures and methods comprising embodiments of the subject matter disclosed herein have not been described in detail to avoid obscuring the descriptions of other aspects of the present disclosure.

Unless the context requires otherwise, throughout the specification and claims that follow, the word "comprise" and variations thereof, such as "comprises" and "comprising" are to be construed in an open, inclusive sense, that is, as "including, but not limited to."

Reference throughout the specification to "one embodiment" or "an embodiment" means that a particular feature, structure, or characteristic described in connection with the embodiment is included in at least one embodiment. Thus, the appearance of the phrases "in one embodiment" or "in an embodiment" in various places throughout the specification are not necessarily all referring to the same aspect. Furthermore, the particular features, structures, or characteristics may be combined in any suitable manner in one or more aspects of the present disclosure.

Figure 1:
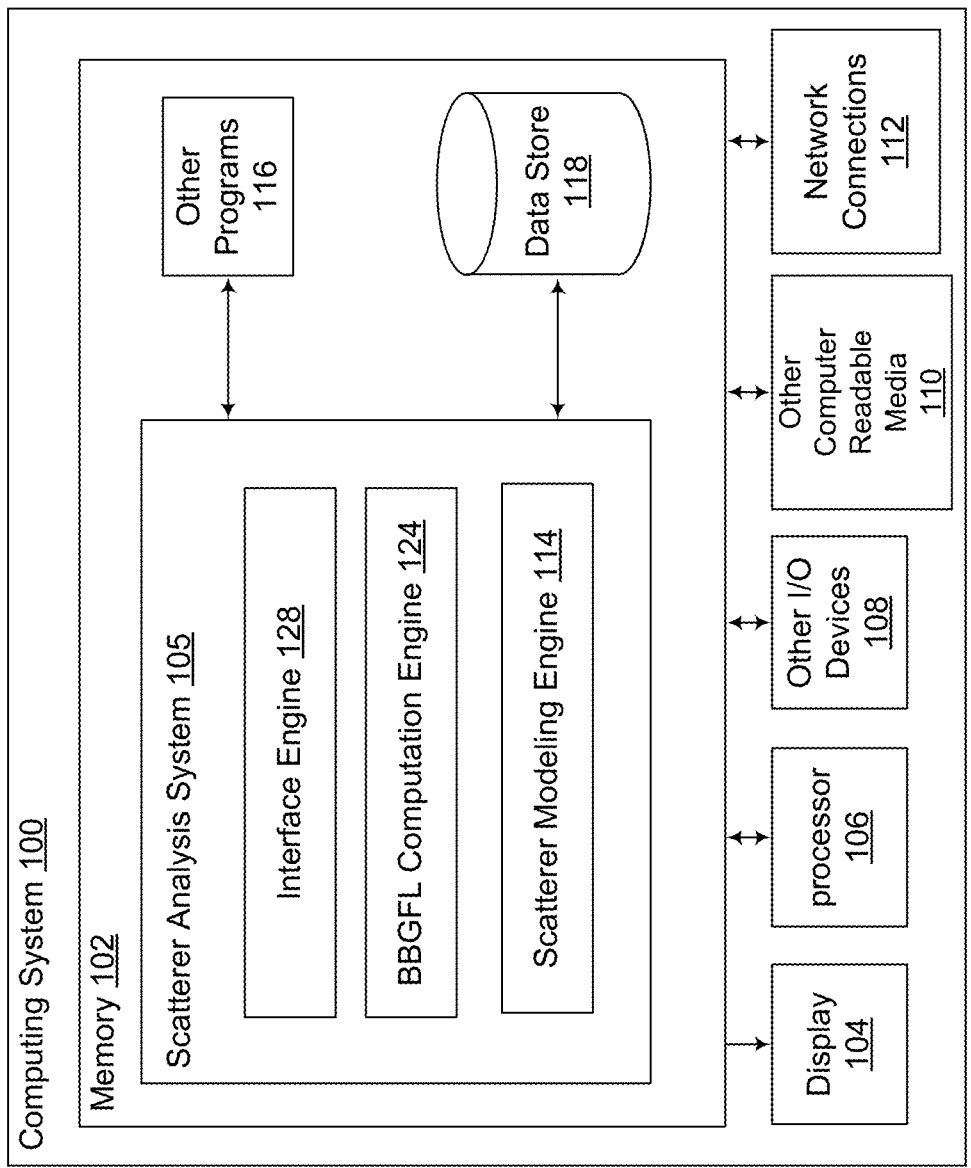
FIG. 1 is a block diagram of a computing system for practical embodiments of the computational analysis method described herein.

FIG. 1 shows a special purpose computing system 100 for analyzing the wave behavior and band modal solutions in a periodic lattice with scatterers of arbitrary shape placed periodically and later with excitations, impurities, displacement of scatterers, disorders, defects, and finite size periodic structures using the BBGFL described herein.

In the embodiment shown, the computing system 100 includes a non-transitory processor-readable memory 102, a display 104, one or more processors (e.g., central processing units) 106, other input/output devices 108 (e.g., keyboard, mouse, joystick, track pad, display, or the like), other computer-readable media 110, and network connections 112.

Scatterer analysis system 105 is shown residing in the memory 102. In an embodiment, the scatterer analysis system 105 includes a broadband Green's Function (BBGFL) computation engine 124, a scatterer modeling engine 114, and an interface engine 128. In some embodiments, the BBGFL computation engine 124 is separate from the scatterer modeling engine 114. In other embodiments, the BBGFL computation engine 124 is part of or integrated into the scatterer modeling engine 114. In various embodiments, some portion of the components or some or all of the components of the scatterer analysis system 105 may be stored on and/or transmitted over other computer-readable media 110. The components of the scatterer analysis system 105 are in the form of instructions that are executable on the processor 106 and generate data for use in the computing system 100 or other computing systems, not illustrated.

The BBGFL computation engine 124 of the scatterer analysis system 105 employs various analysis methods, used alone or in combination with one another, to analyze the wave behavior and the electromagnetic fields of the scatterer structures, as further described herein. In various embodiments, the results of the scatterer structures system 105 can be stored in the data store 118 for further processing.

In various embodiments, the scatterer modeling engine 114 generates a scatterer model based on one or more descriptions of a scatterer structure and the results of the BBGFL computation engine 124. After the scatterer modeling engine 114 generates a model, it can store the generated model in the data store 118 for further processing by the BBGFL computation engine 124 or other aspects of the scatterer analysis system 105. For example, the scatterer analysis system 105 can provide the output from the BBGFL computation engine 124 or the scatterer modeling engine to be displayed on the display 104.

The interface engine 128 facilitates user interaction with the scatterer modeling engine 114 and its various components. For example, the interface engine 128 may implement a user interface engine. The user interface engine may provide an interactive graphical user interface (GUI) that can be used by a human being operating the computing system 100. The operator may interact with the scatterer modeling engine 114 to perform functions, such as to specific regions of interest in an existing scatterer layout or to provide modifications to excitations, impurities, displacement of scatterers, disorder, defects, and to define finite size periodic structures in a scatterer layout. In at least some embodiments, access to the functionality of the interface engine 128 is provided via a Web server, possibly executing as one of the other programs 116.

Other code or programs 116 (e.g., a Web server, a database management system, and the like) and potentially other data repositories, such as a data store 118, also reside in the memory 102. The other programs 116 also may execute on the processor 106. Not all of the components in FIG. 1 are required for each implementation. For example, some embodiments embedded in other software do not provide means for user input, for display, for a customer computing system, or other components.

Components/modules of the scatterer analysis system 105 can be implemented in software, hardware, firmware, or a combination thereof.

The operation of certain aspects will now be described with respect to process 200 in FIGS. 2A-2C. In at least one of various embodiments, process 200 is implemented by or executed on one or more computing devices, such as computing system 100. Accordingly, embodiments of process 200 are implemented by the BBGFL computer simulation engine 124, the scatterer modeling engine 114, the interface engine 128, or some combination thereof.

Figure 2A:
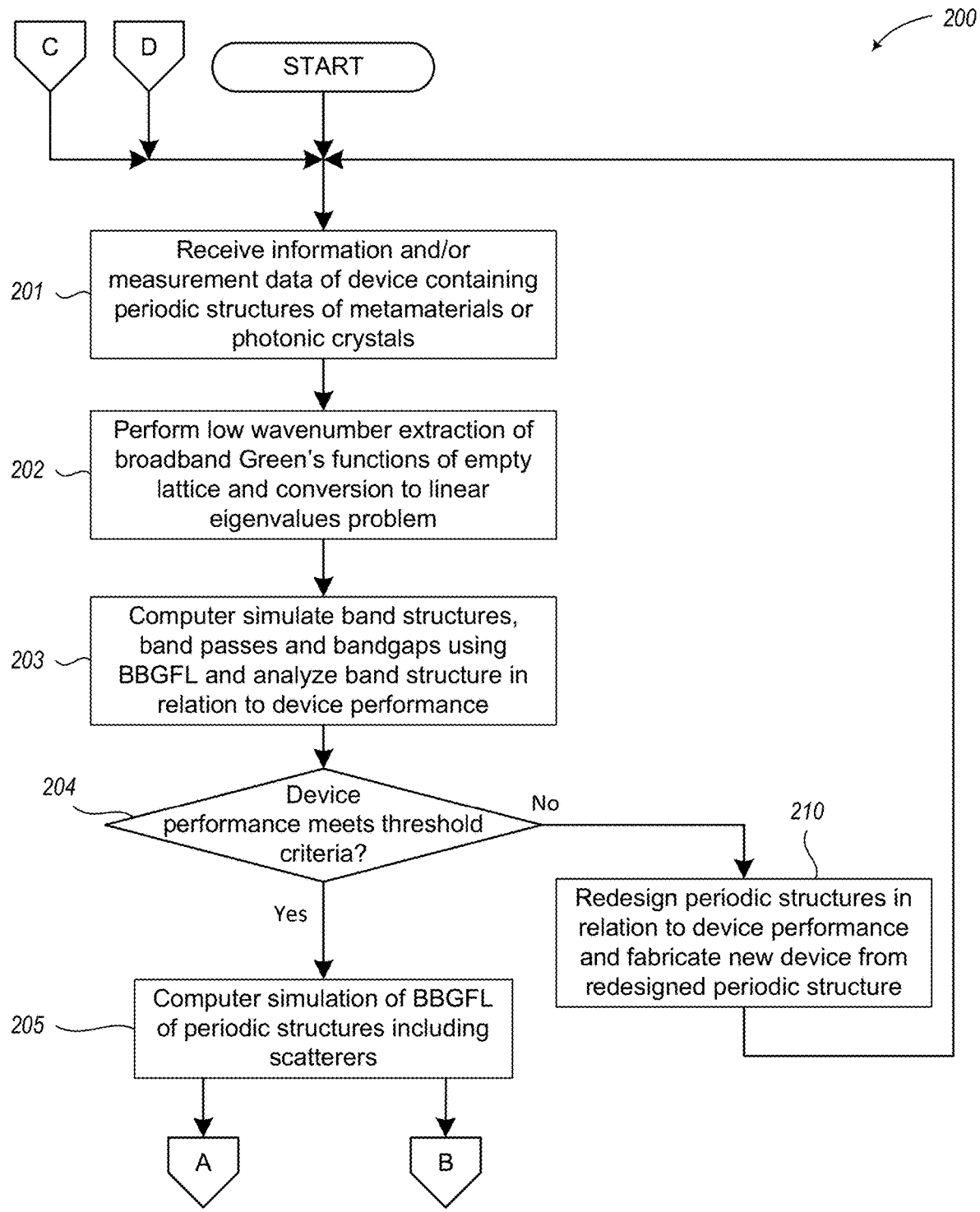
FIGS. 2A-2C illustrate a logical low diagram generally showing one embodiment of a process for utilizing Broadband Green's Functions with Low wavenumber extraction (BBGFL) to simulate band structures in metamaterials or photonic crystals and redesign the same.
Figure 2B:
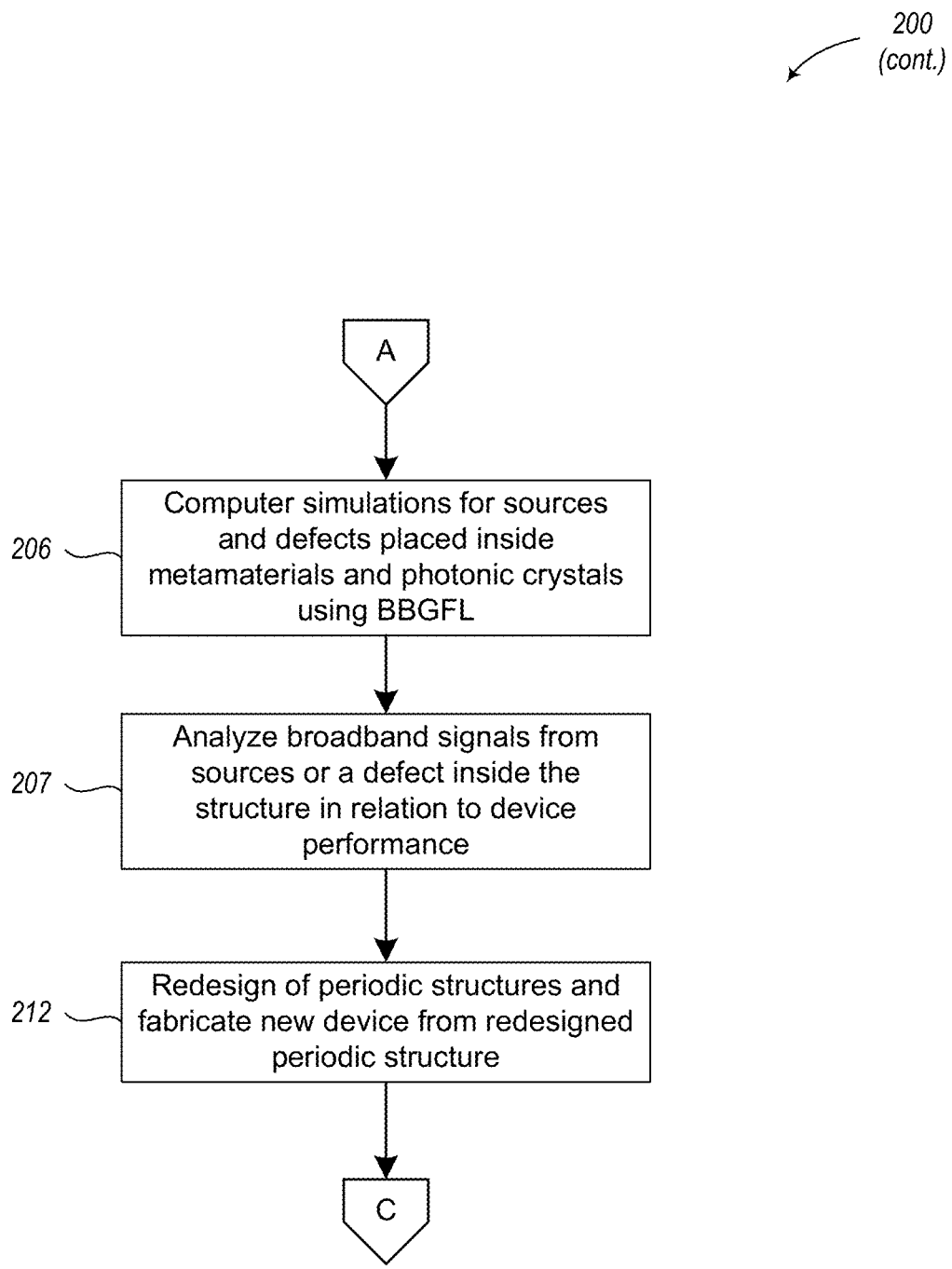
Figure 2C:
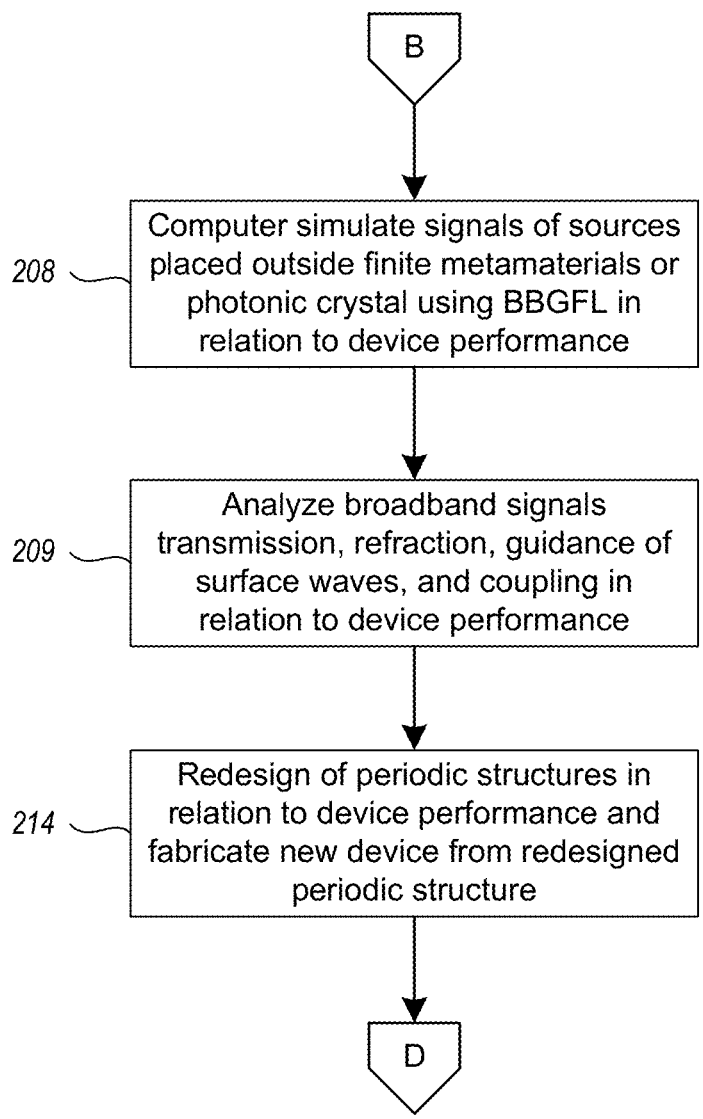

FIGS. 2A-2C show a flow diagram illustrating steps in a computer-implemented method of analyzing wave behavior and band modal solutions in periodic lattice with scatterers to computer simulate and model microwave and optical signals in a metamaterial or photonic crystal. Performing such simulating and modeling computations using the BBGFL, as described herein, provides metamaterial and photonic crystal designers with a tool for predicting and optimizing the operational behavior of metamaterial and photonic crystals in microwave and photonic devices, which can provide improved results with significant computing efficiency. The BBGFL computer simulation methods are significantly better than the method of moments (MoM) and the plane wave method. BBGFL provides more accurate results than plane wave method and better computational efficiency than MoM and plane wave method as these two latter methods can become computationally difficult because of CPU and memory utilization.

Process 200 begins at block 201 in FIG. 2A, where parameters or information of a device containing metamaterials or photonic crystals having periodic structures are received at the computing system 100. Accordingly, the received parameters and information maps the periodic structures of the metamaterials or photonic crystals consisting of the periodic arrangement of the cells and a scatterer in each cell.

In some embodiments, the received parameters or information include information regarding the geometry of the periodic structures of the metamaterial or photonic crystals. The geometry is periodic structures where each period has the same structure, and each period is labelled a cell. Inside each cell is a scatterer with specific geometry of size, shape, and material properties. The geometry also includes the periodic arrangement, such as the spacing between cells, i.e., the lattice constant a, and the symmetry arrangements of the periodic structures, such as cubic lattices, triangular lattices, hexagonal lattices, etc. In other embodiments, the received parameters or information, alternatively or in addition to the geometry information, include measurement data of the performance of the device that contains to periodic structures of metamaterials of photonic crystals. Such measurement data can be the wave behavior of the device.

In various embodiments, the parameters or information about the metamaterials or photonic crystals geometry is provided or input to the computing system 100 by a user, such as via interface engine 128. In other embodiments, the parameters or information about the metamaterials or photonic crystals may be extracted from a data store or from a design automation computing system, which may be remote from the computing system 100 and may be accessed via a network. Various example periodic structures are shown in FIGS. 3A-3C and 4A-4B.

Figure 3A:
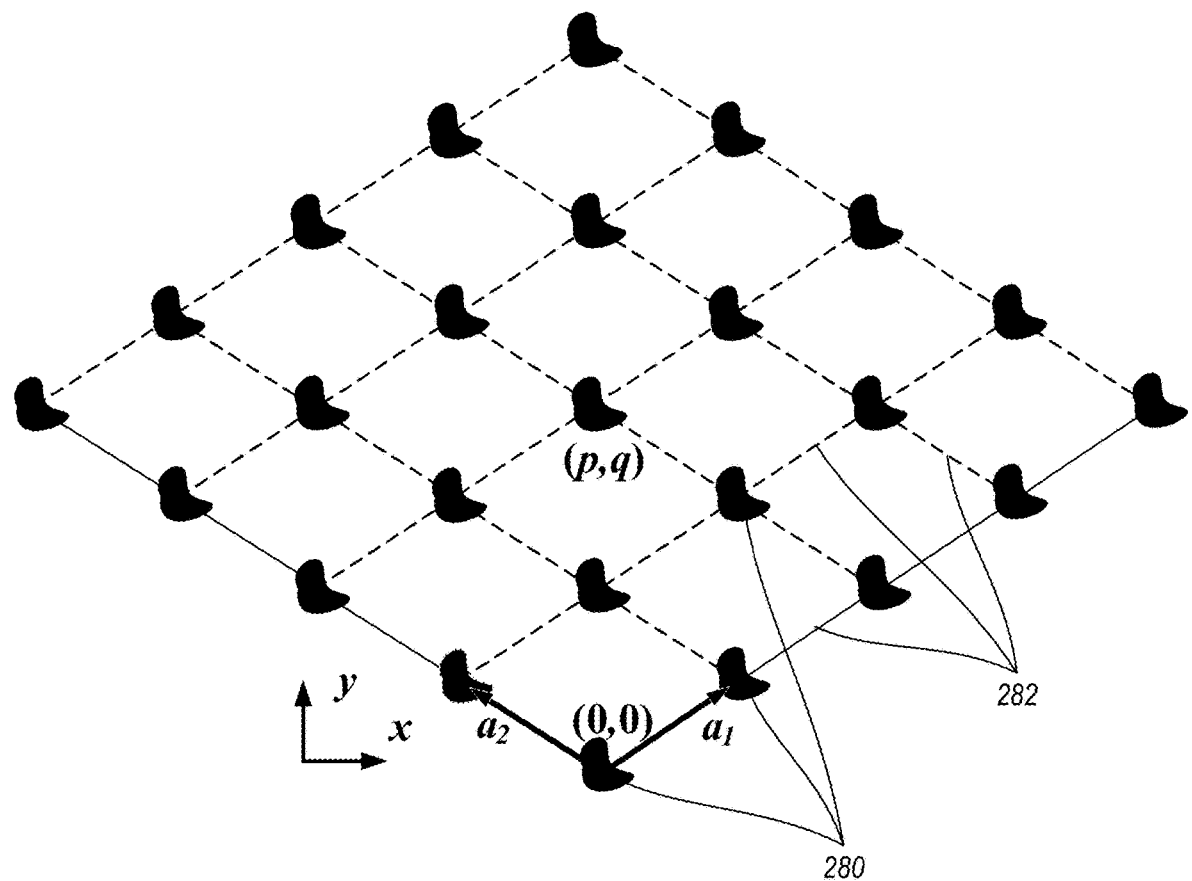
FIGS. 3A-3C are example views of periodic lattice with scatterers of arbitrary shape placed periodically.
Figure 3B:
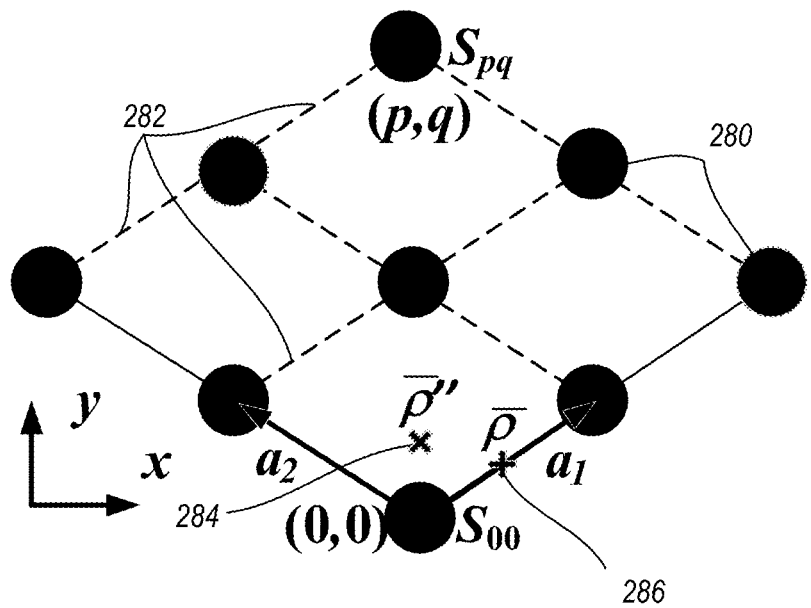
Figure 3C:
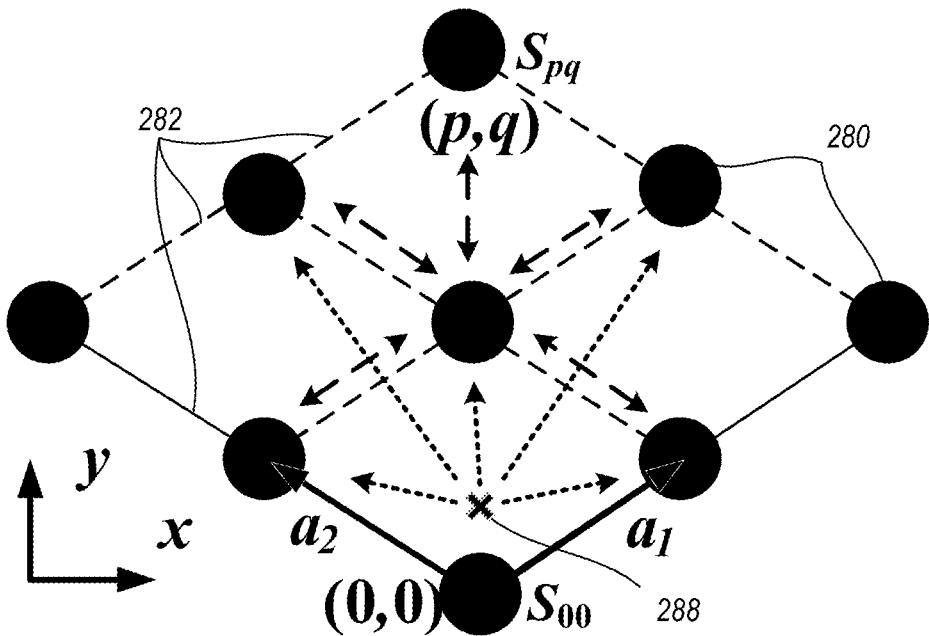

The example structures in FIGS. 3A-3C include scatterers arranged in a 2D hexagonal lattice. Inside each cell is a circular cylinder forming a scatterer 280. The scatterer material property can be a conductor or a dielectric. The lattice constant a is the spacing 282 between cells or scatterers. In these figures, the scatterers 280 denote the surface of the scatterer. Moreover, $\bar{\rho}''$ (represented by reference 284) represent the locations of an arbitrary source point and $\bar{\rho}$ (represented by reference 286) represent the locations of an arbitrary field point. FIG. 3C is a point source 288, which can also be a defect or an impurity, in one of the cells of the periodic structure onto which is superimposed a representation of electromagnetic waves incident on the periodic array of scatterers, and the resulting scattered waves.

Figure 4A:
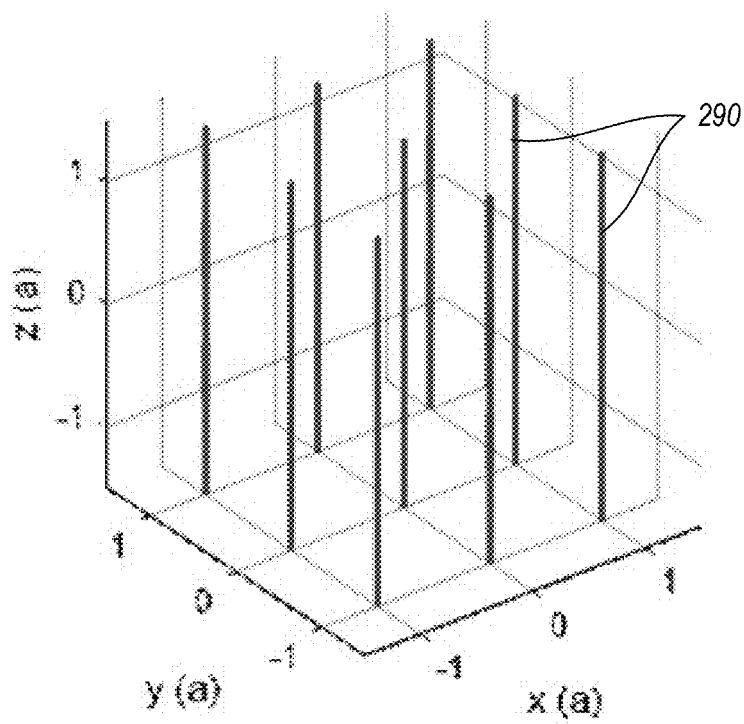
FIGS. 4A-4B are example views of wire segments forming a 3D cubic lattice.
Figure 4B:
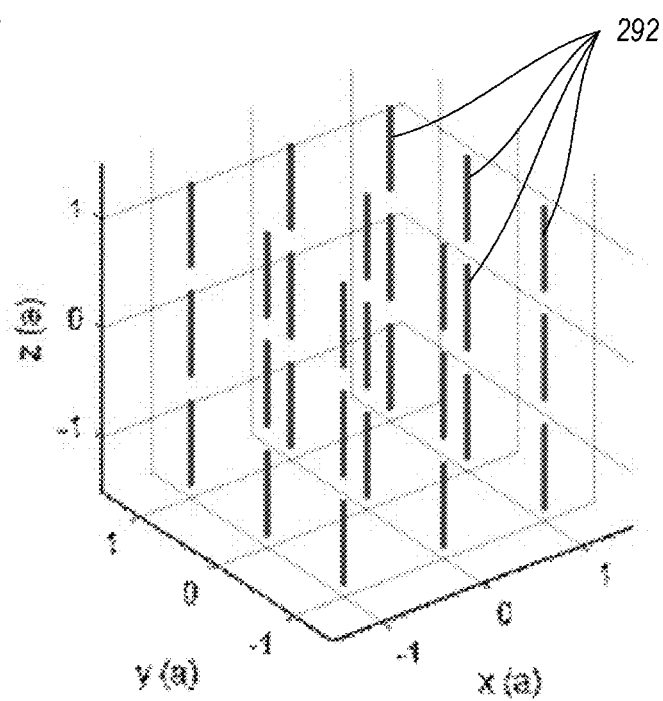

The periodic example structures in FIGS. 4A-4B are 3D cubic lattice. Inside each cell is a conductor wire that acts as a scatterer. For example, the 3D cubic lattice in FIG. 4A includes connected wire mediums 290 and the 3D cubic lattice in FIG. 4B includes dis-connected wire mediums 292. Because surface integral equations are used on the surface of the scatterer, more complex arbitrary geometry can also be treated.

In metamaterials and photonics crystals, designers often design the geometry to have the desired wave propagation properties to optimize design performance. The BBGFL method described in the sections below is used to computer simulate the band diagrams over a broad range of frequencies to enable the redesign of the geometry of the metamaterials and photonics crystals to have a desired performance.

Process 200 proceeds next to block 202, where low wavenumber extraction of broadband Green's functions of empty lattice and conversion to a liner eigenvalues problem is performed. In a 2D periodic lattice of scatters of perfect electric conductor (PEC), the TM mode obeys the surface integral equation $$\int_{S_{00}} dl' \, g_P(k, \bar{k}_i; \bar{\rho}, \bar{\rho}')[\hat{n}' \cdot \nabla' \psi(\bar{\rho}')] = 0, \text{ for } \bar{\rho} \text{ in } A_{00} \quad (1)$$

where $\psi(\bar{\rho})$ is the modal eigenfunction to be determined. The periodic Green's function of the empty lattice is $g_P(k, \bar{k}_i; \bar{\rho}, \bar{\rho}')$ that has no scatterer and is represented in expansions/summations of plane waves. The conventional method of moments (MoM) searches the frequency/wavenumber k that obeys Eq. (1). This conventional method is generally inefficient because of three issues/disadvantages: (i) the eigenvalue problem is nonlinear requiring an iterative search; (ii) there are multiple band solutions corresponding to multiple values of k for a single $\bar{k}_i$ (as shown the vertical lines in the band diagram in FIGS. 5A-5B, 6, 7A-7B, and 8A-8B). The iterative method is repeated for each band solution one at a time; and (iii) the planewave summation is a slowly convergent series. It has a second order convergence of $k_\alpha^{-2}$. As described herein, the BBGFL is used to convert the periodic Green's function into a linear eigenvalue problem. $g_P(k, \bar{k}_i; \bar{\rho}, \bar{\rho}')$ is expressed by using a low wavenumber extraction.

$$g_P(k, \bar{k}_i; \bar{\rho}, \bar{\rho}') = \quad (2)$$

$$g_P(k_L, \bar{k}_i; \bar{\rho}, \bar{\rho}') + \frac{k^2 - k_L^2}{\Omega_0} \sum_\alpha \frac{\exp(i\bar{k}_{i\alpha} \cdot (\bar{\rho} - \bar{\rho}'))}{(|\bar{k}_{i\alpha}|^2 - k^2)(|\bar{k}_{i\alpha}|^2 - k_L^2)}$$

This BBGFL method solves the three pre-mentioned disadvantages of the conventional MoM method. (i) The summation is a fast-convergent series converging to the fourth order. (ii) When this new expression is substituted in Eq. (1), it results in a linear eigenvalue problem as follows. Let the surface integral $\int_{S_{00}} dl'$ be discretized into N points and the summation of plane waves in $\Sigma_\alpha$ be kept to M plane waves. The linear matrix eigenvalue becomes $$\bar{\bar{A}} \bar{b} = \frac{1}{k^2 - k_L^2} \bar{b} \quad (3)$$

where $$\bar{\bar{A}} = \bar{\bar{D}} - \bar{\bar{R}}^t \bar{\bar{L}}^{-1} \bar{\bar{R}} \quad (4)$$

where $\bar{\bar{D}}, \bar{\bar{R}}, \bar{\bar{L}}$ are matrices independent of the wavenumber k with dimensions M×M, N×M, and N×N, respectively.

Thus, there is no need of iterative search because a linear eigenvalue problem does not need iterative search. And (iii) by solving the eigenvalue problem, all the multi-band solutions are determined simultaneously. The eigenvalue $$\frac{1}{k^2 - k_L^2}$$

has a one to one correspondence to the wavenumber k, and the wavenumber k is equivalent to frequency as wavenumber and frequency is proportional to each other by a constant.

Process 200 continues at block 203, where band structures, band passes, and bandgaps using BBGFL are computer simulated and analyzed in relation to device/structure performance. Using BBGFL, which is further described in the sections below, the device/structure performance is simulated in the form of band mode diagrams. In periodic structures, the wave propagations are referred to in terms of band modes. In the example band mode diagrams in the following figures, the diagrams are analyzed for band passes and bandgaps. For each frequency, if a horizontal line intersects a band mode, then the wave can pass through the photonic crystal, and is known as a bandpass. If the horizontal line does not intersect a band mode, then the wave cannot pass through the photonic crystal, and it is known as a bandgap. Thus, whether the photonic crystal behaves as a band pass, passing a wave, or band gap, blocking wave propagations, is dependent on frequency, direction, and polarization. Such a band diagram is known as plotting the frequency ω versus the $\overline{k}_i$ vector that lies in the first Brillouin zone.

Figure 5A:
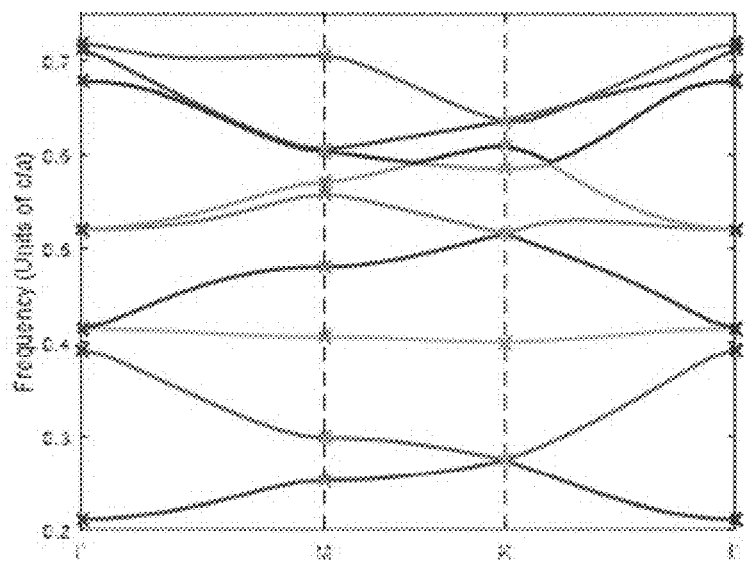
FIGS. 5A-5B are band diagrams of transverse magnetic (TM) waves in a 2D periodic array of circular perfect-electric-conductor (PEC) cylinders forming a hexagonal lattice.
Figure 5B:
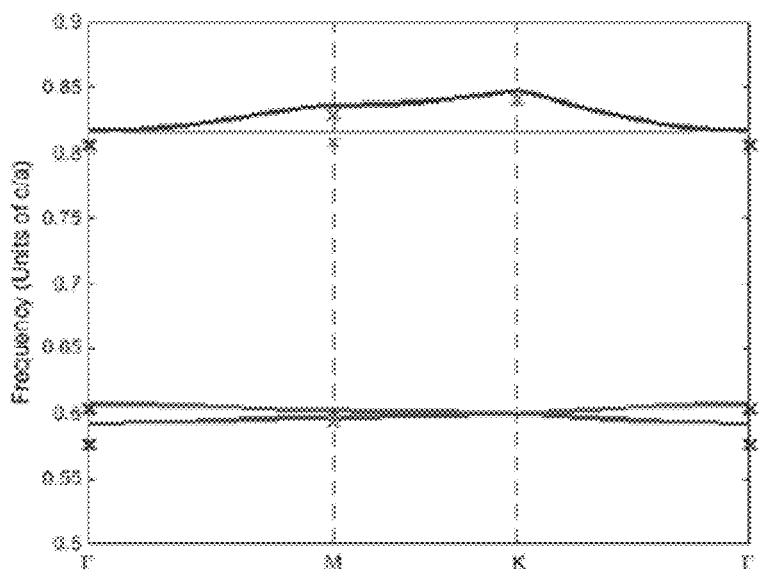
Figure 6:
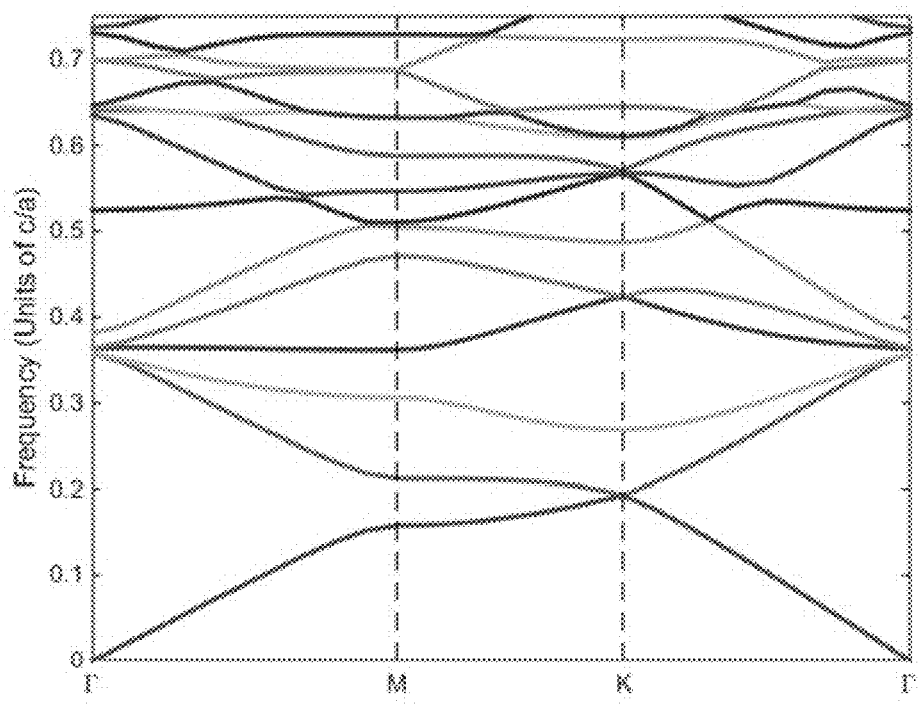
FIG. 6 is a band diagram of transverse electric (TE) waves in a 2D periodic array of circular PEC cylinders forming a hexagonal lattice.

FIGS. 5A-5B show example band diagrams simulated for the transverse magnetic (TM) waves in a 2D hexagonal periodic array when the scatter inside a unit cell is a circular PEC cylinder with radius b=0.2a (FIG. 5A) and b=0.4a (FIG. 5B), respectively, where a is the lattice constant. In both cases, there are multiple band solutions corresponding to the same $\overline{k}_i$. FIG. 6 shows a band diagram of TE waves in a 2D periodic array of circular PEC cylinders forming a hexagonal lattice with a radius b=0.2a. FIGS. 5 and 6 show the dependence of band diagrams on the two polarizations TM and TE.

These band mode diagrams plot the frequency ω as a function of propagation wavevector $\overline{k}_i$. $\overline{k}_i$, which is the Bloch wavevector, denotes the direction of wave propagation. Thus, the band diagram is directional dependent. For convenience, only particular sections of the band diagrams are shown, where the Γ point corresponds to $\overline{k}_i$=0, M point to $$\overline{k}_i = \frac{\pi}{a}\left(\frac{1}{\sqrt{3}}\hat{x} + \hat{y}\right),$$

and K point to $$\overline{k}_i = \frac{4\pi}{3a}\hat{y},$$

where a is the lattice constant. Note that these definitions are corresponding to the arrangement of the lattice in FIG. 3B.

The space between lines represents band gaps and the lines represent band passes. It is noted that increasing the radius of the PEC cylinder significantly splits up the passbands, creating large band gaps. These are design considerations for performance of microwave devices and photonic devices in deciding whether the wave is passed or stopped/blocked as a function of frequency. As a comparison, FIG. 5A shows the band diagram for the TE case of the same 2D periodic array of circular PEC cylinders forming a hexagonal lattice structure with the radius of the cylinder b=0.2a. There is no bandgap for TE wave at low frequency. Comparison of FIGS. 5A-5B and 6 shows the polarization dependence that requires consideration in designing a photonic crystal. The performance of the periodic structure for the device is then analyzed using the computer simulated band structures to determine if they meet one or more threshold criteria.

At decision block 204, process 200 determines if the device performance meets one or more threshold criteria based on the analysis of the simulated band structures. These threshold criteria may include the number of band passes, the number of band gaps, the frequencies at which the band gaps or band passes occur, or other periodic structure performance criteria, or any combination thereof. If the device performance does not meet the threshold criteria, then process 200 proceeds to block 210.

At block 210 the periodic structures are redesigned by modifying the geometry of the metamaterials or photonic crystals. In some embodiments, this geometry modification includes redesigning the shape, size, and material property of the scatterer in each cell or redesigning the periodic arrangement of cells in relation to device performance, or a combination thereof. Additional modifications may include adding an impurity, a defect, a displacement of a scatterer, or confining the periodic structure in a finite volume. Such redesign modifications may include a single modification or a plurality of modifications.

In some embodiments, the periodic structure is redesigned, based on the device performance, to meet specific design specifications of band passes (passbands) and band gaps (stopbands) by changing the scatter sizes. For example, FIG. 5A illustrates the resulting computer simulated band diagram for the TE case of a 2D periodic array of circular PEC cylinders forming a hexagonal lattice structure, where the radius of the cylinders is b=0.2a. This example shows large band passes and small band gaps. However, if the design specifications specify a desire for different band passes and band gaps, then the radius of the cylinders is modified, i.e., the scatter sizes is changed. For example, the periodic structure may be redesigned so that the radius of the cylinders is b=0.4a, which results in smaller band passes and larger bandgaps. Accordingly, as the diameter of the PEC cylinders increase in a photonic crystal comprised of non-penetrable scatterers, the band passes shrink and the bandgaps expand.

Figure 7A:
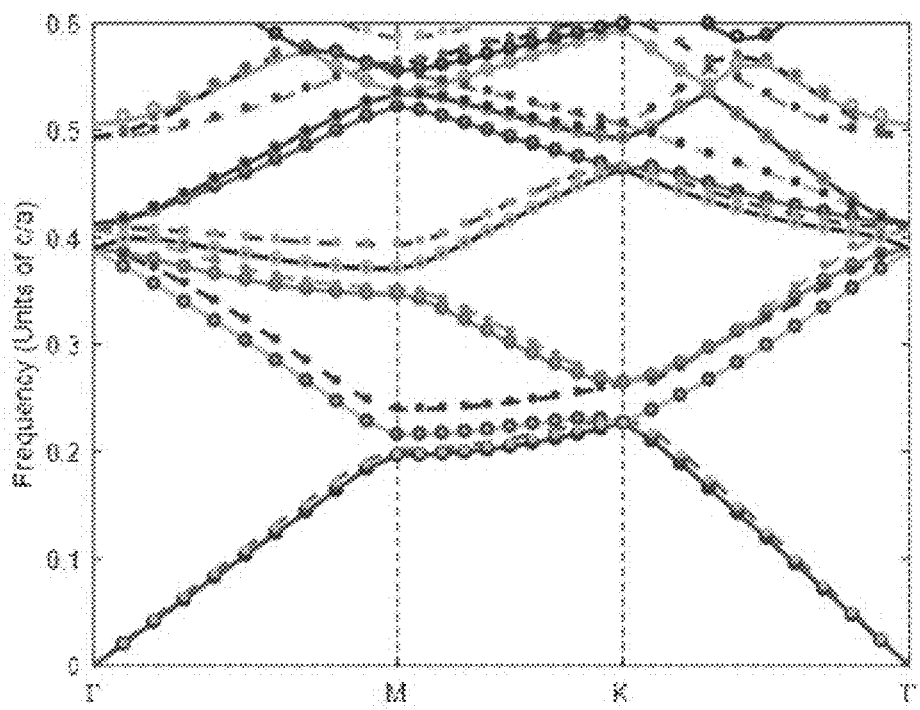
FIGS. 7A-7B are band diagrams of a hexagonal array of circular air voids driven in a dielectric host medium.
Figure 7B:
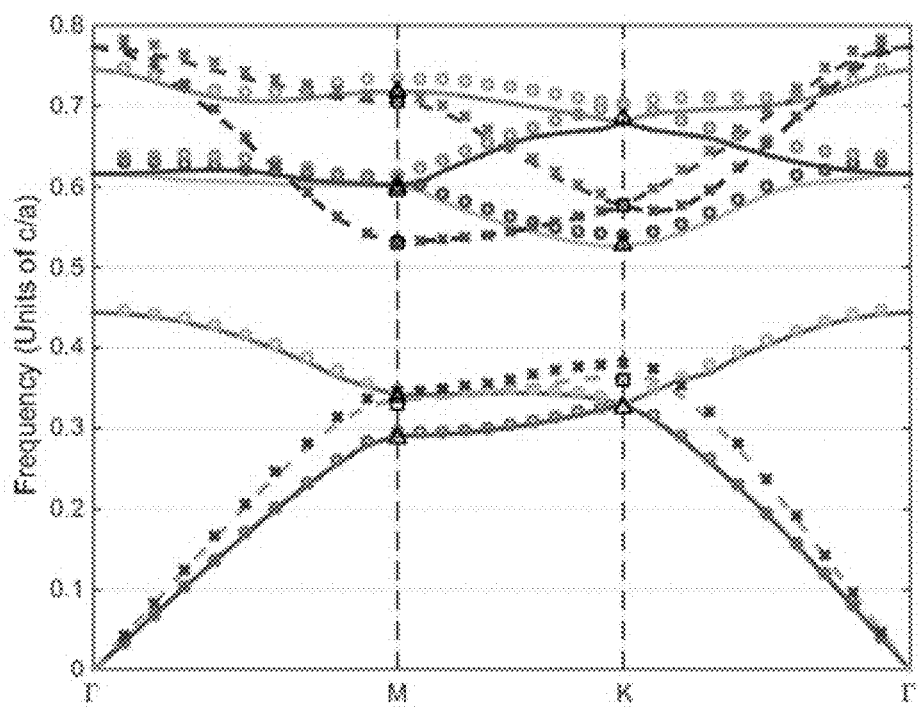

As another example, FIG. 7A, which is discussed in more detail below, shows the resulting computer simulated band diagram for a hexagonal array of circular air voids driven in a dielectric background (host medium), where the radius of the air voids is b=0.2a. As shown in this example, there are no consistent band gaps in the photonic crystal. However, if the design specifications specify a desire for particular band gaps, then the radius of the air voids is modified, i.e., the scatter sizes is changed. For example, the periodic structure may be redesigned so that the radius of the air voids is b=0.48a, which increases in the diameter of the dielectric cylinder in the photonic crystal and results in a band gap being created in the redesigned periodic structure. Accordingly, specific band gaps can be created by increasing the diameter of the dielectric cylinders in a photonic crystal comprised of penetrable scatterers. FIGS. 7A and 7B also show that the degeneracy between the first two bands is raised up as the scatter sizes are increased in the redesigned periodic structures.

Figure 8A:
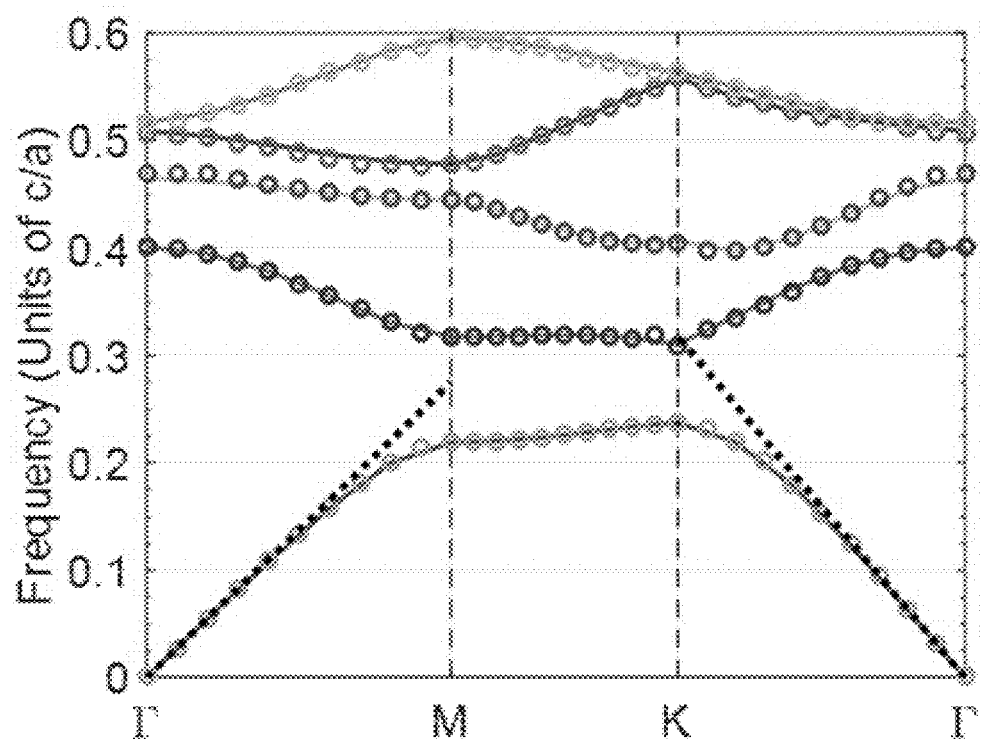
FIGS. 8A-8B are band diagrams of a hexagonal array of elliptical air voids driven in a dielectric host medium.
Figure 8B:
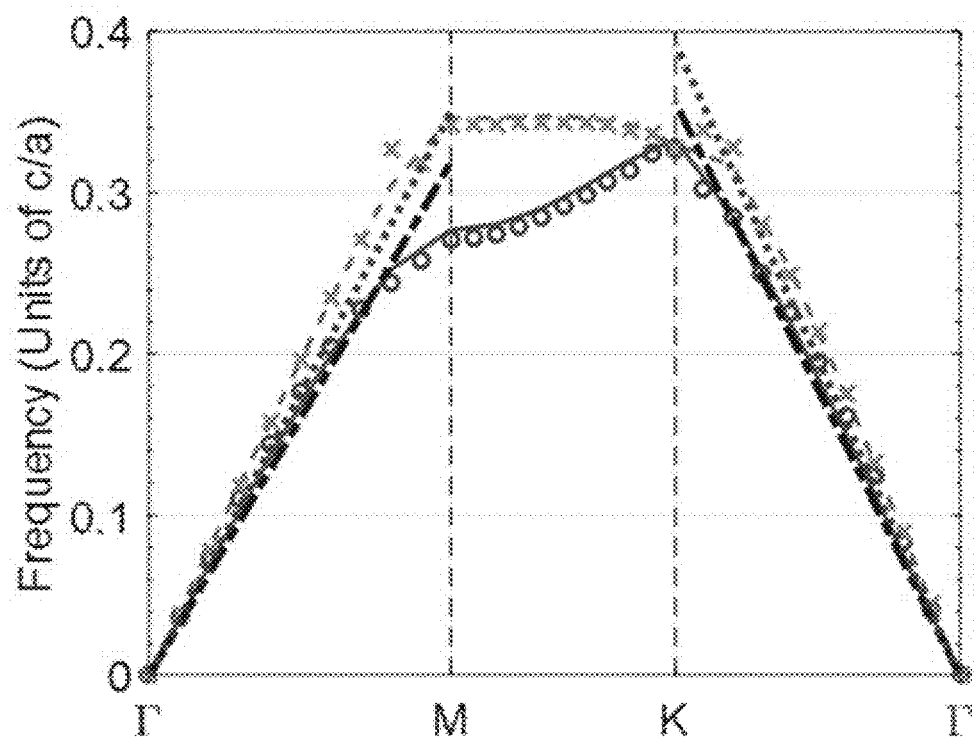

In other embodiments, the periodic structure is redesigned by modifying the shape of the scatterers. As mentioned herein, FIGS. 7A and 7B show the resulting computer simulated band diagrams for a hexagonal array of circular air voids driven in a dielectric background with different radii, which have corresponding band passes and band gaps. These band passes and band gaps can be further modified by modifying the shapes of the air voids in the periodic structure, such as by changing the shapes of the air voids from circular (the resulting computer simulated band diagrams shown in FIGS. 7A and 7B) to elliptical (the resulting computer simulated band diagrams shown in FIGS. 8A and 8B). In some embodiments, the periodic structure is further redesigned by modifying the orientation of the scatterers with respect to the lattice vectors. For example, FIG. 8B shows, with respect to the first TE band shown in FIG. 8A, how the first TE band is altered by rotating the orientation of the elliptical air voids.

Figure 9A:
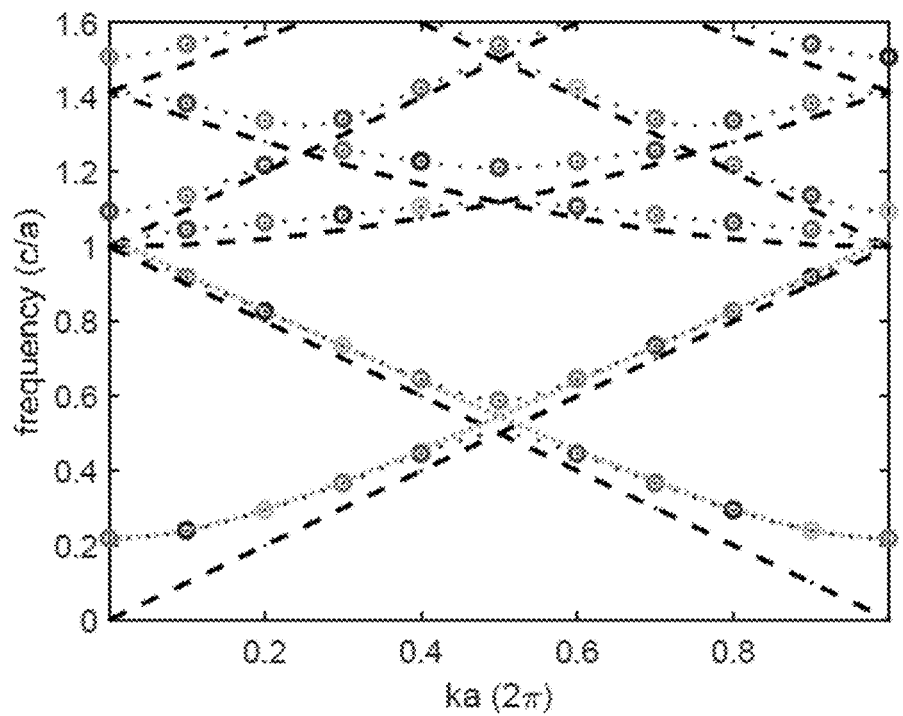
FIGS. 9A-9B are band diagrams of a connected wire medium and a disconnected wire medium, respectively, forming a 3D cubic lattice.
Figure 9B:
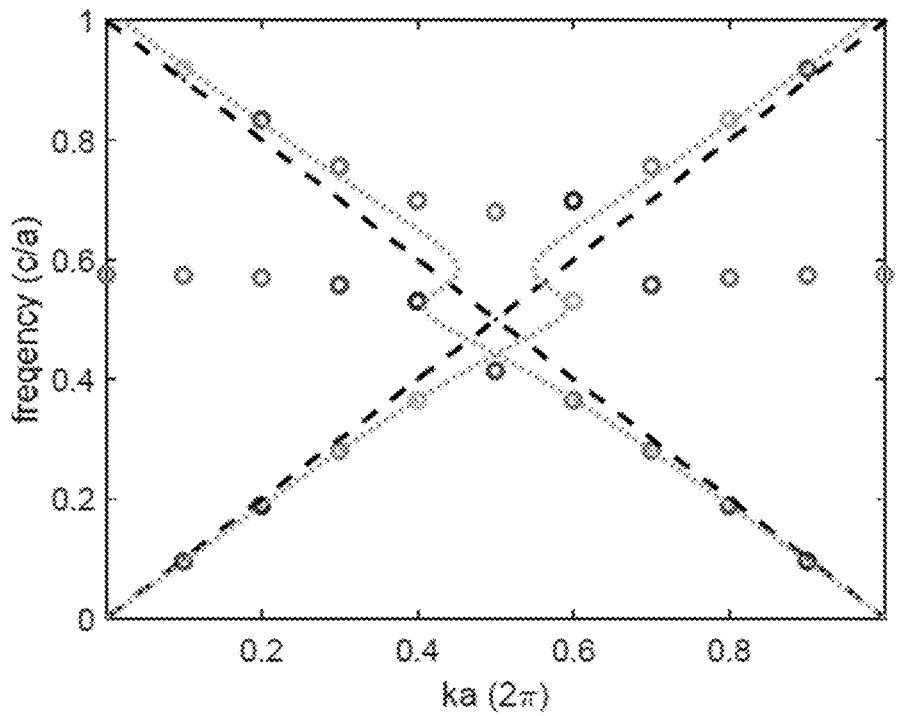

In yet other embodiments, the periodic structure is redesigned to control the transition between band gaps and band passes by changing the connection topology of the scatterers. For example, FIG. 9A illustrates the resulting computer simulated band diagram for connected wire scatterers forming a 3D cubic lattice, which includes a first band stop at low frequency. However, by redesigning the periodic structure from connected wire scatterers to disconnected wire scatterers (i.e., by disconnecting the wire segments in the lattice), the first band stop at low frequency is removed, which the resulting computer simulated band diagram is shown in FIG. 9B.

In some additional embodiments, the periodic structure is redesigned to control the band structures by modifying the periodic arrangement of the scatterers, such as from a hexagonal lattice (such as shown in FIGS. 3A-3C) to rectangular or cubic lattices (such as shown in FIGS. 4A-4B). The resulting computer simulated band diagrams and the band gaps and band passes change from those depicted in FIGS. 5A-5B to FIGS. 9A-9B, as an example.

In various embodiments, the example modifications discussed above may be employed alone or in combination to redesign the periodic structures of the metamaterials or photonic crystals of the device.

The redesigned periodic structures are utilized to fabricate a new device to have metamaterials or photonic crystals having the redesigned periodic structures. In some embodiments, instructions are provided to another computing device, module, or engine to fabricate the new device based on the redesigned periodic structure of the metamaterials or photonic crystals. For example, computing device 100 instructs another computing system to fabricate a new smart microwave device, photonic device, or acoustic device to have the redesigned periodic structures. In some embodiments, the instructions to fabricate the new device include the modified scatter sizes, the revised scatter shapes, the changed connection topology of the scatterers, or any other modification to the periodic structure. In at least one embodiment, such instructions may also include other non-modified parameters of the periodic structure so that the receiving device of the instructions can execute the instructions to fabricate the new device.

Process 200 then loops to block 201 for additional simulations based on the redesigned structure of the newly fabricated device. In various embodiments, new measurement data of the performance of the new device may be made, such as the wave behavior of the new device, which can be used as input for the additional simulations of the new device with the redesigned structure.

Although not mentioned above with respect to blocks 202 and 203, the BBGFL method is also applicable to metamaterials or photonic crystals consisting of dielectric scatterers. In this case, low wavenumber extractions is applied to both $g_P$, and $g_{1P}$, representing the periodic lattice Green's function in the host and scatterer medium, respectively. In addition to Eq. (2), the periodic lattice Green' function of the host medium, the low wavenumber extraction to the empty lattice Green's function using the wavenumber of the dielectric scatterer is also applied. Applying both low wavenumber extractions in the coupled surface integral equations (SIEs) converts the coupled SIEs into a linear eigenvalue problem of dimension 4M×4M, yielding all the band solutions simultaneously. The matrix for the linear eigenvalue problem is independent of the wavenumbers k and $k_1$. Thus, the same three advantages discussed above are also achieved with the BBGFL method for dielectric scatterers.

FIGS. 7A-7B show the band diagram simulated for a hexagonal array of circular air voids driven in a dielectric background (host medium). The radius of the air voids is b=0.2a (FIG. 7A) and b=0.48a (FIG. 7B), respectively, for the two cases illustrated. The background has a dielectric constant of 12.25. The band diagrams are illustrated for both the TM and TE polarized waves in solid and dashed curves, respectively. Similar to FIGS. 5A-5B and 6 the Γ point corresponds to $\bar{k}_i$=0, M point to $$\bar{k}_i = \frac{\pi}{a}\left(\frac{1}{\sqrt{3}}\hat{x} + \hat{y}\right),$$

and K point to $$\bar{k}_i = \frac{4\pi}{3a}\hat{y},$$

where a is the lattice constant.

There are no consistent bandgaps for both polarizations in the small radius case although a small gap opening is observed between the first and second TE bands. However, in the large radius case, a clear band gap is revealed around the frequency of 0.5 c/a, where c is the speed of light in free-space, and both TM and TE waves are prohibited in the photonic crystal in this stop band. The dispersion curves close to the Γ point, the origin in the reciprocal space of wave propagation vectors, can be used to homogenize the medium consisting of host and scatterers, which means determining an effective propagation constant for the metamaterial or photonic crystal.

Another advantage of the BBGFL technique is that it applies to arbitrary scatterer geometry because surface integral equation is formulated on the surface of the scatterer. FIGS. 8A-8B illustrate the band diagrams simulated for a hexagonal array of elliptical air voids driven in a dielectric host medium. The host medium also has a dielectric constant of 12.25. The elliptical air voids are characterized by a semi-long and semi-short axis of a/√3 and a/3, respectively.

Similar to FIGS. 5A-5B and 6 the Γ point corresponds to $\overline{k}_i=0$, M point to $$\overline{k}_i = \frac{\pi}{a}\left(\frac{1}{\sqrt{3}}\hat{x} + \hat{y}\right),$$

and K point to $$\overline{k}_i = \frac{4\pi}{3a}\hat{y},$$

where a is the lattice constant. The band diagrams are plotted for both TM and TE waves. For TM wave (FIG. 8A), the band diagram shows a bandgap between the first and second bands, and it is independent of the ellipse orientation. On the other hand, for TE waves (FIG. 8B), the dispersion relation is sensitive to, or dependent on, the orientation of the elliptical voids.

The BBGFL technique is also applicable to three-dimensional (3D) scatterers forming a 3D lattice. For the 3D periodic structure, a high order low wavenumber extraction technique is applied to the periodic lattice Green's function.

$$g_P(k,\overline{k}_i;\overline{r},\overline{r}') = g_P(k_L,\overline{k}_i;\overline{r},\overline{r}') + (k^2 - k_L^2)\left[\frac{1}{2k}\frac{dg_P(k,\overline{k}_i;\overline{r},\overline{r}')}{dk}\right]_{k=k_L} + \frac{(k^2-k_L^2)^2}{\Omega_0}\sum_\alpha \frac{\exp(i\overline{k}_{i\alpha}\cdot(\overline{r}-\overline{r}'))}{(|\overline{k}_{i\alpha}|^2 - k^2)(|\overline{k}_{i\alpha}|^2 - k_L^2)^2} \quad (5)$$

The second term on the right-hand side of Eq. (5) is a wavenumber derivative, which is a new computer simulation in BBGFL for higher order extractions to further accelerate convergence. Note that in Eq. (5), the last term, representing the broadband part of the Green's function, converges up to a $6^{th}$ order convergence rate $|\overline{k}_{i\alpha}|^{-6}$ much faster than the convergence rate of $4^{th}$ order $|\overline{k}_{i\alpha}|^{-4}$ in Eq. (2), and the conventional slow convergence rate of $2^{nd}$ order $|\overline{k}_{i\alpha}|^{-2}$ in the usual plane wave expansion. This fast convergence of Green's function, in terms of frequency independent Floquet planewaves or modal solutions, is a key to the BBGFL technique.

The band diagram of a 3D wire medium problem as depicted in FIGS. 4A-4B may also be characterized through the application of Eq. (5). The dispersion relation of the wire medium is characterized by a line integral equation (LIE) under the thin wire approximation. The LIE is converted into a nonlinear eigenvalue problem by making use of Eq. (5). Although the eigenvalue problem is nonlinear, the iterative search is much faster than convention MoM method because of the following two properties. (i)The size of the eigenvalue problem is typically small and is M×M, where M is the number of terms included in the model summation part of Eq. (5). (ii) The matrix has simple k dependence.

FIGS. 9A-9B illustrate band diagrams simulated for the wire scatterers forming a 3D cubic lattice, with FIG. 9A illustrating the band diagram for a connected wire medium and FIG. 9B illustrating the band diagram for a disconnected wire medium with element length L=0.8a. In both cases the radius of the wires is $r_0$=0.01a. In these illustrations, the horizontal axis is normalized to a phase shift $\phi=|\overline{k}_i|a$. These band diagrams are known as the $\omega$-$\overline{k}_i$ or $\omega$-$\phi$ diagrams and are also called dispersion relations. The dispersion relation describes the frequency of the wave as a function of the propagation constant, the direction of propagation, and the polarization.

The band diagrams in FIGS. 9A and 9B are for TM polarized waves with electric field polarized along the axis of the wire elements. For the connected wire medium, it behaves at low frequency like a plasma, characterized by a plasmonic frequency below which the waves cannot propagate. For the disconnected wire medium, the band diagram is quite distinct from its connected counterpart, where the stop band is shifted upward, and the medium behaves very similar to the free space at low frequency, being transparent to the wave propagation. The band diagrams are determined together with the band modal solutions, which are directly related to the eigenvectors of the eigenvalue problem. The band modal solutions $\psi_\beta^S(\overline{k}_i;\overline{\rho})$ obey the orthogonality condition.

Figure 10:
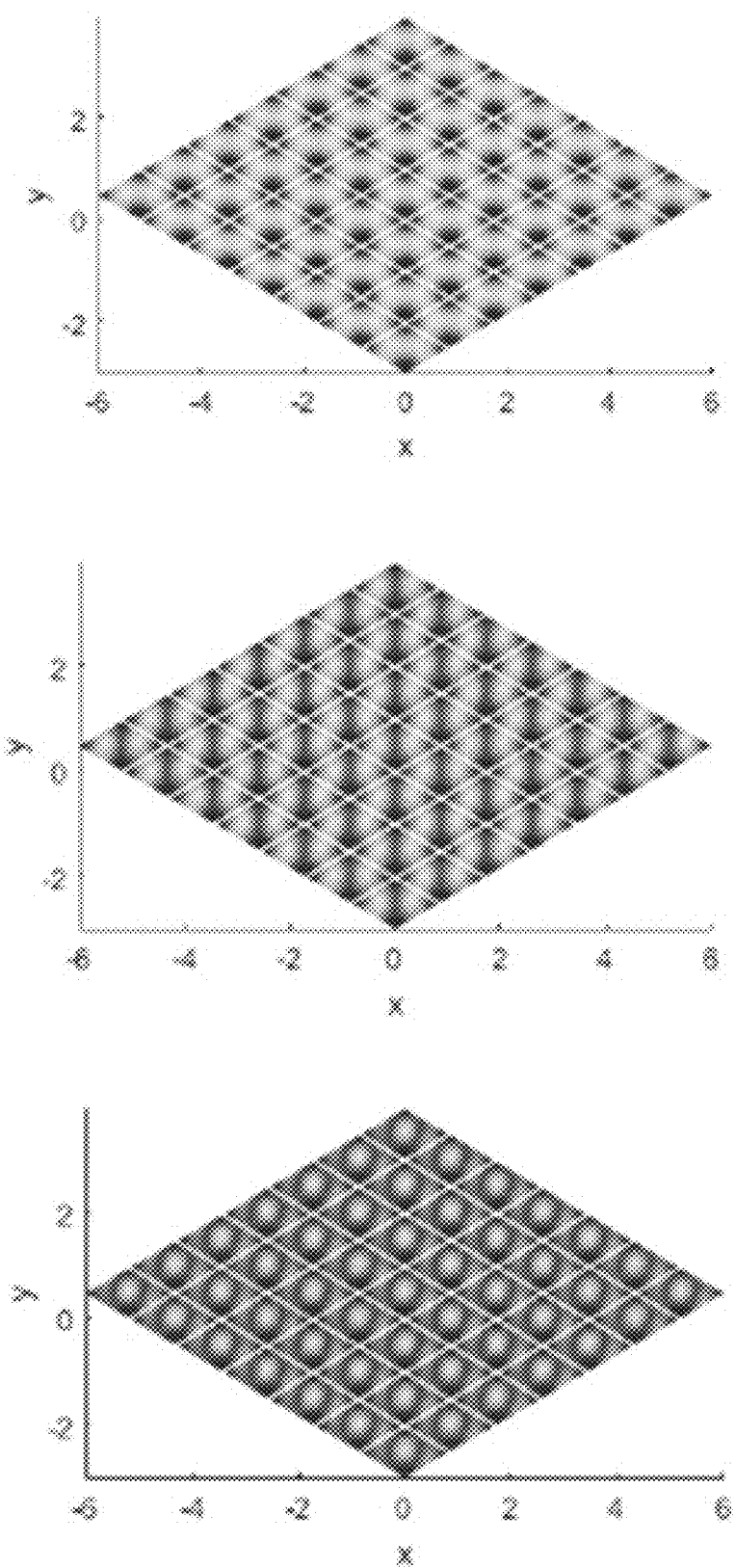
FIG. 10 are illustrations of modal field distributions in a hexagonal lattice of PEC cylinders.

The modal field distributions of $\psi_\beta^S(\overline{k}_i;\overline{\rho})$ for a hexagonal lattice of circular PEC cylinders with radius b=0.2a are illustrated in FIG. 10 for the lowest few modes. The modal fields satisfy boundary conditions on all the scatterers and they are solutions of the homogeneous wave equation. The modal field distributions and the modes are independent of the wavenumber/frequency.

Conventional studies of periodic structures based on the planewave method or the conventional MoM method study band modes in a periodic structure. For analysis of device performance, it is important to computer simulate the wave behavior for wave sources or defects placed inside the metamaterials or photonic crystals and for wave sources placed outside the metamaterials or photonic crystals.

If the threshold criteria of the device performance is met at decision block 204, process 200 flows from decision block 204 to block 205, where the BBGFL of periodic structures including scatterers is simulated. This simulation is followed by the simulation of sources and defects placed inside metamaterials and photonic crystals, as represented by block 206, in FIG. 2B, and the simulation of signals of sources placed outside finite metamaterials or photonic crystals, as represented by block 208, in FIG. 2C.

At block 205 the Green's function of the periodic structures is derived and simulated for BBGFL. These Green's functions are unlike the Green's functions of the previous equations, which are that of empty lattices. The new BBGFL Green's functions include all the scatterers and satisfy boundary conditions on all the scatterers. The periodic Green's function including the scatterers $g_p^S(k, \overline{k}_i; \overline{\rho}, \overline{\rho}')$, for a particular $\overline{k}_i$, can be represented in expansion/summations of the band modal solutions $\psi_\beta^S(\overline{k}_i; \overline{\rho})$. To accelerate convergence, a low wavenumber extraction is performed, such that $$g_P^S(k,\overline{k}_i;\overline{\rho},\overline{\rho}') = g_P^S(k_L,\overline{k}_i;\overline{\rho},\overline{\rho}') + (k^2-k_L^2)\sum_\beta \frac{\psi_\beta^S(\overline{k}_i;\overline{\rho})\psi_\beta^{S*}(\overline{k}_i;\overline{\rho}')}{(|k_\beta^S(\overline{k}_i)|^2 - k^2)(|k_\beta^S(\overline{k}_i)|^2 - k_L^2)} \quad (6)$$

The difference between Eq. (2) and Eq. (6) is that the empty lattice Green's function in Eq. (2) has planewave expansion that does not include the scatterers while the Greens function in Eq. (6) has the band mode expansion that includes the scatterers. The convergence rate in Eq. (6) is $4^{th}$ order up to $|k_\beta^S(\overline{k}_i)|^{-4}$, and it can be further raised to $6^{th}$ order $|k_\beta^S(\overline{k}_i)|^{-6}$ or higher by using a high order extraction technique.

The periodic Green's function $g_P^S(k, \bar{k}_i; \bar{\rho}, \bar{\rho}')$ includes the effects of all the scatterers and is the field response due to an array of periodic sources with progressive phase shift inside the photonic crystal. The Green's function due to a single point source inside the photonic crystal $g^S(k; \bar{\rho}, \bar{\rho}')$ is obtained by integrating $g_P^S(k, \bar{k}_i; \bar{\rho}, \bar{\rho}')$ with respect to the Bloch wavevector $\bar{k}_i$ in the first Brillouin zone.

$$g^S(k; \bar{\rho}, \bar{\rho}') = \frac{\Omega_0}{(2\pi)^2} \int\int_{BZ_1} d\bar{k}_i g_P^S(k, \bar{k}_i; \bar{\rho}, \bar{\rho}') \qquad (7)$$

Using Eq. (6) in Eq. (7) leads to the broadband Green's function of a single point source including the periodic scatterers. The Green's function $g^S(k; \bar{\rho}, \bar{\rho}')$ also has a fast convergence rate because the integrand $g_P^S(k, \bar{k}_i; \bar{\rho}, \bar{\rho}')$ is fast convergent.

Figure 11A:
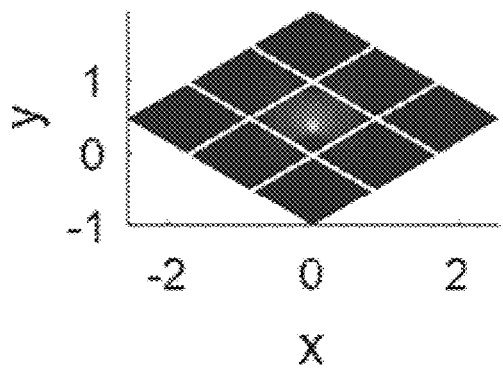
FIGS. 11A-11B show BBGFL including the presence of the scatterers in a lossless background.
Figure 11B:
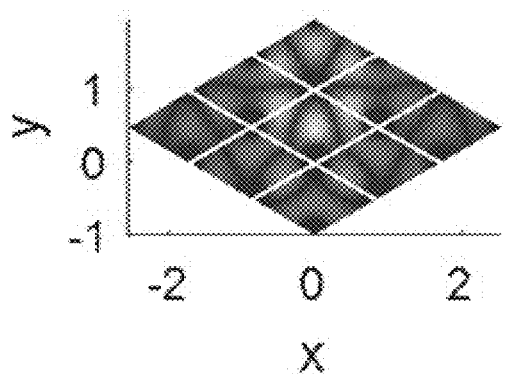
Figure 12A:
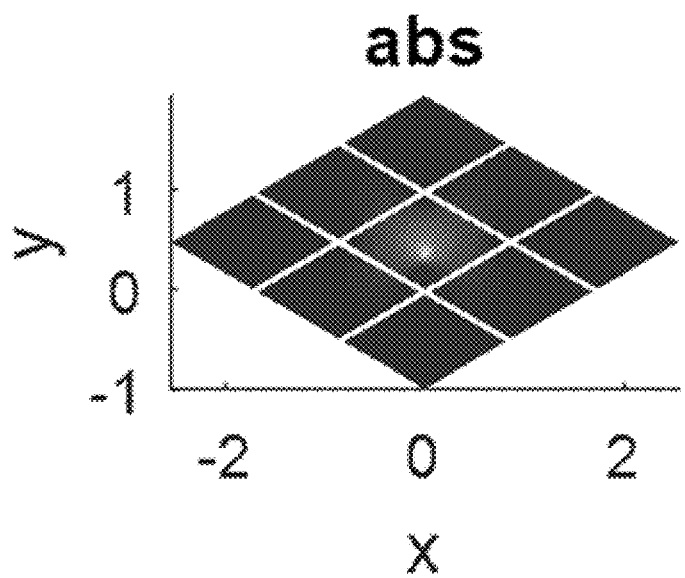
FIGS. 12A-12B show BBGFL including the presence of the scatterers in a lossy background.
Figure 12B:
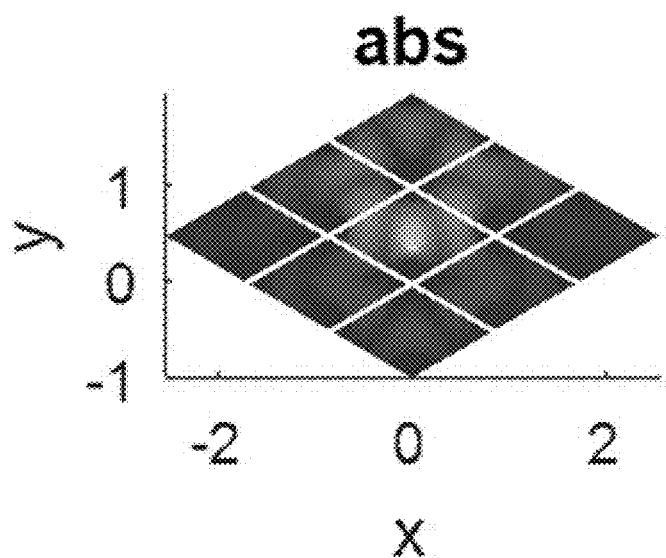

The Green's function $g^S(k; \bar{\rho}, \bar{\rho}')$ is representative of field responses due to sources inside the crystal or scattering from localized defects. At blocks 206 and 207, in FIG. 2B, simulations are performed for sources and defects inside metamaterials or photonic crystals using BBGFL, and the results analyzed in relation to device performance. Example computer simulations are shown in FIGS. 11A-11B and 12A-12B for the field responses in a crystal where periodic circular PEC cylinders are embedded in a lossless and lossy background, respectively, which are useful for the designer of the periodic structures. FIGS. 11A and 11B illustrate the band gap and passband, respectively, for broadband Green's function including scatterers in a lossless background and FIG. 12A and 12B illustrate the bandgap and passband, respectively, for broadband Green's function including scatterers in a lossy background.

It is important for designer to understand how waves from sources or defects inside can couple to the outside, and how the waves spread out from the sources or defects inside. In FIGS. 11A-11B and 12A-12B, the fields of the waves are depicted in both the stop band and pass band. The Green's function $g^S(k; \bar{\rho}, \bar{\rho}')$ includes the field interactions between the source and the infinite array of periodic scatterers and the multiple scattering among the scatterers. The multiple scattering causes waves to be localized around the source in the stop band, and to spread deep into the crystal in the pass band. A lossy background in general accelerates the field decay rate as the observation point moves away from the source.

Process 200 proceeds next to block 212, where the periodic structures are redesigned based on the simulations and analysis at blocks 206 and 207 and a new device is fabricated from the redesigned periodic structure. Using BBGFL, the broadband field responses of the waves are readily calculated. Such analysis is used to optimize device performance of the photonic crystals, as the designer uses the computer simulations and the analysis of device performance to redesign the metamaterials or photonic crystals.

In various embodiments, the periodic structures are redesigned by modifying the geometry of the metamaterials or photonic crystals. In some embodiments, this geometry modification includes redesigning the scatterer, such as shape, size, and material property, in each cell or redesigning the periodic arrangement of cells in relation to device performance, or a combination thereof. Additional modifications may include adding an impurity, a defect, a displacement of a scatterer, or confining the periodic structure in a finite volume. In some embodiments, such a redesign includes providing instructions to another computing device, module, or engine to change the periodic structure of the metamaterials or photonic crystals based on the previous periodic structure and the simulated results.

The redesigned periodic structures are utilized to fabricate a new device to have metamaterials or photonic crystals having the redesigned periodic structures. In some embodiments, instructions are provided to another computing device, module, or engine to fabricate the new device based on the redesigned periodic structure of the metamaterials or photonic crystals. For example, computing device 100 instructs another computing system to fabricate a new smart microwave device, photonic device, or acoustic device to have the redesigned periodic structures.

Figure 13:
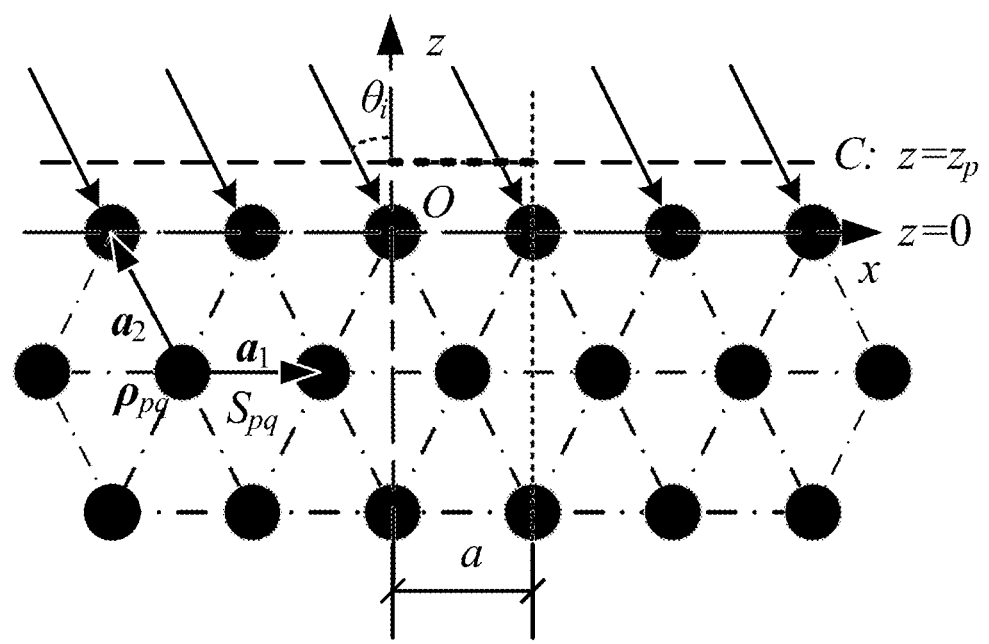
FIG. 13 is an example of planewave scattering from a half-space of periodic scatterers.
Figure 14:
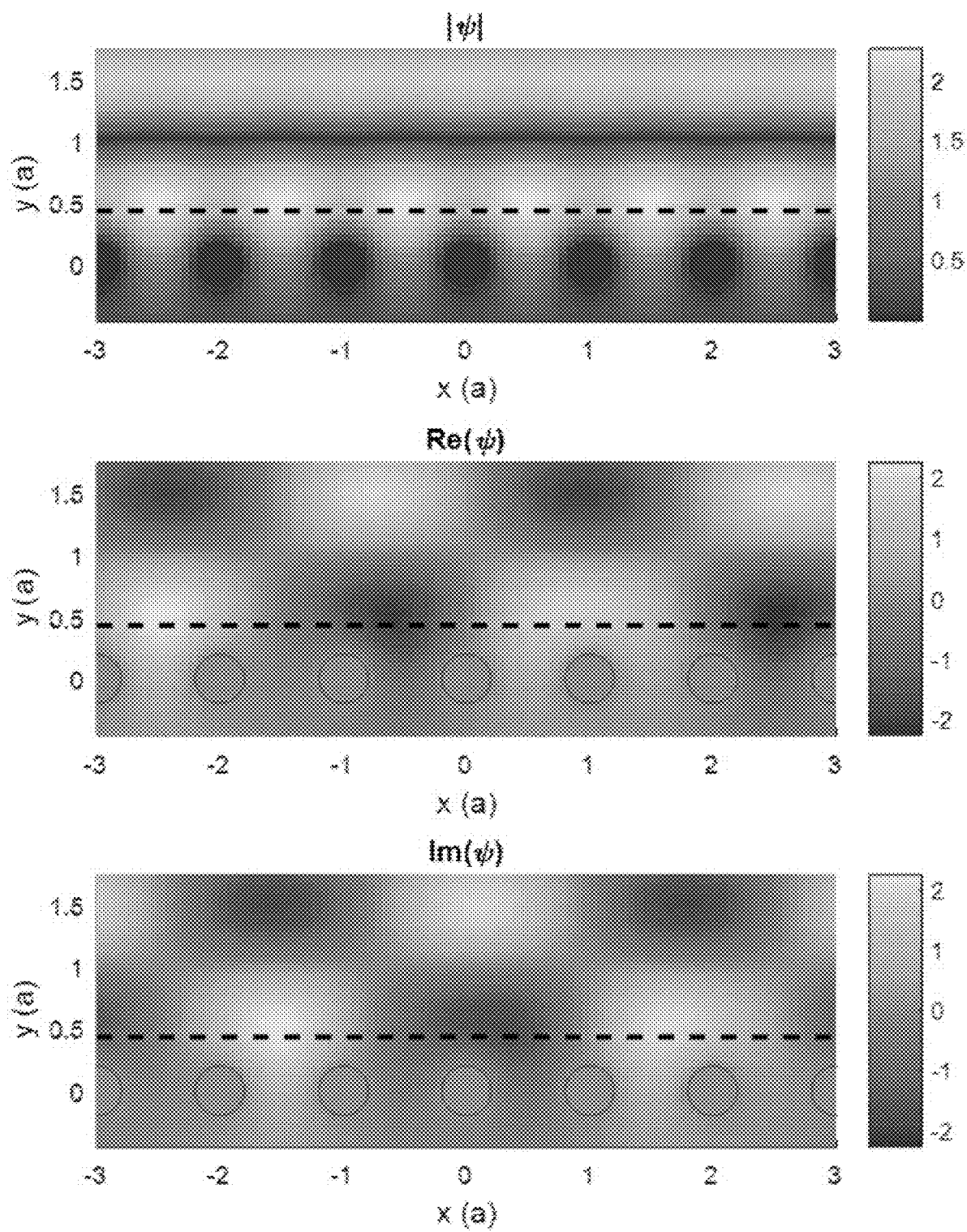
FIG. 14 is an illustration of wave scattering from a finite array of periodic scatterers.
Figure 15:
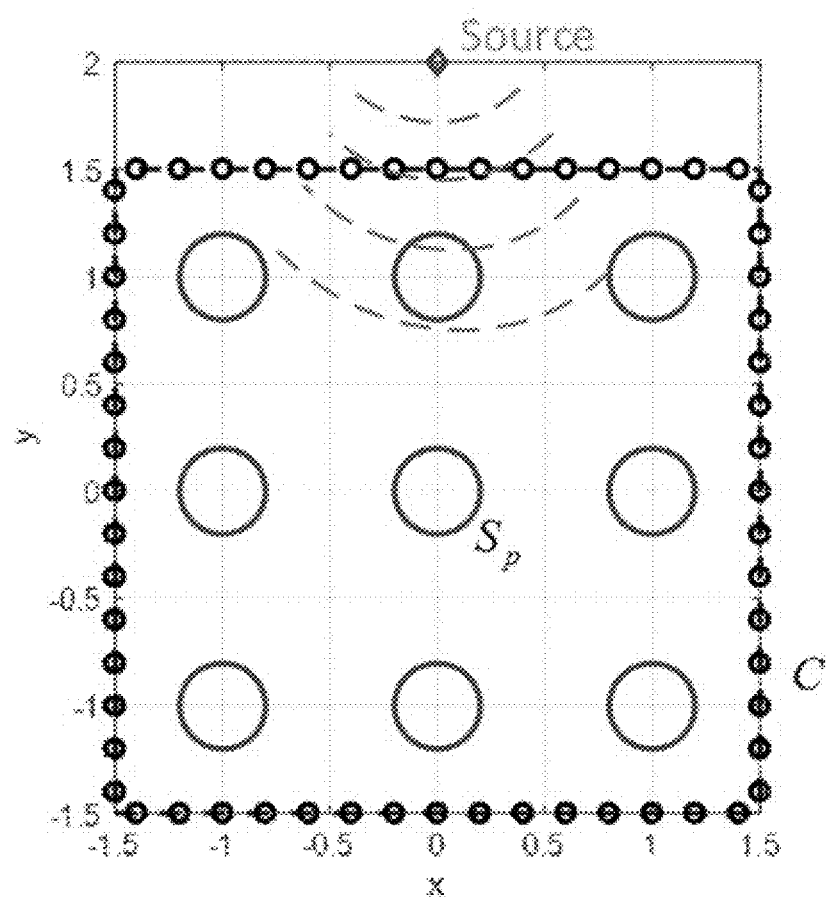
FIG. 15 illustrates example near field patterns around the interface of the periodic scatterer half-space.

The redesign process as specified in block 212 includes all the aspects as discussed in block 210. It also includes aspects such as introducing loss in the background medium, and truncating the periodic array in various shapes to redesign the periodic structure. FIGS. 11 and 12 illustrate a comparison of the confinement of field responses due to sources and defects in a lossless and lossy background, respectively. FIGS. 13 and 15 illustrate possibilities of truncating the array into a half-space (FIG. 13) or into a finite region (FIG. 14).

Process 200 then loops to block 201 for additional simulations based on the redesigned structure of the newly fabricated device. In various embodiments, new measurement data of the performance of the new device may be made, such as the wave behavior of the new device, which can be used as input for the additional simulations of the new device with the redesigned structure. In some embodiments, process 200 does not loop to block 201 and can stop if the device performance meets the design criteria. In at least one such embodiment, the computing device 100 outputs or provides an indication that the device performance meets the design criteria.

At blocks 208 and 209 in FIG. 2C, simulations are performed for signals of sources placed outside finite metamaterials or photonic crystals using BBGFL in relation to device performance, and the resulting broadband signal transmission, refraction, guidance of surface waves, and coupling are analyzed in relation to device performance. The Green's function $g^S(k; \bar{\rho}, \bar{\rho}')$ is used to formulate integral equations. The conventional technique using free-space Green's function $g^0$ consists of formulating surface integral equations on the surface of each scatterer. This means one surface integral for each scatterer. This is generally inefficient as there are large numbers of scatterers.

As $g^S(k; \bar{\rho}, \bar{\rho}')$ satisfies boundary conditions on the boundaries of all the periodic scatterers, applying $g^S(k; \bar{\rho}, \bar{\rho}')$ results merely in a single surface integral equation (SIE) on the boundary of the finite extent of the periodic structure. Thus, BBGFL solves wave interactions with bounded periodic arrays with substantially reduced number of unknowns. In FIG. 13, a planewave scattering incident upon a half-space of periodic scatterers in a photonic crystal that is separated by a boundary C from the upper region is considered. With the BBGFL technique, the surface integral using $g^S$ is only on the boundary C.

The surface integral equation can be combined with a dual integral equation using $g^0$ in the top half-space to solve the boundary unknowns on C. Method of moments (MoM) are applied to solve the coupled SIEs. The near field solutions around the interface separating the photonic crystals, the periodic scatterer half-space, from the upper region are depicted in FIG. 14 for the magnitude, the real part and imaginary part, respectively. The frequency of the incident planewave is chosen to be in the stop band of the crystal. All energy is being reflected into the top space. The magnitude of the field rapidly decays as it goes deep into the crystal. The field has detailed variations close to the interface representing evanescent modes. The fine-scale field variations quickly smooth out as by moving away from the interface, rendering a typical plane wave front.

Using these results, the existence of possible surface states, which are surface waves that exist only on the interface, may also be determined. Analyses of surface states are used to guide the waves along the surface of the photonic crystal, which is an important asset of device performance. Such BBGFL computer simulation is efficient as it significantly reduces the number of unknowns by an order of magnitude, and it can be readily extended to wave interaction with finite arrays or defects in the lattice. Solving wideband wave interactions with finite periodic arrays using the broadband Green's function $g^S$ of the scatterer is depicted in FIG. 15. The sources can be either far field excitations like a planewave or near field excitations like a point source.

Process 200 proceeds next to block 214, where the periodic structures are redesigned in relation to device performance based on the simulations and analysis at blocks 208 and 209. Such analysis can be used to optimize device performance of the photonic crystals in relation to wave transmission, refraction, coupling, and surface wave generation and guidance. The analysis helps the designer to use computer simulations to redesign the metamaterials or the photonic crystals.

In various embodiments, the periodic structures are redesigned by modifying the geometry of the metamaterials or photonic crystals. In some embodiments, this geometry modification includes redesigning the scatterer such as shape, size, and material property in each cell or redesigning the periodic arrangement of cells in relation to device performance, or a combination thereof. Additional modifications may include adding an impurity, a defect, a displacement of a scatterer, or confining the periodic structure in a finite volume. In some embodiments, such a redesign includes providing instructions to another computing device, module, or engine to change the periodic structure of the metamaterials or photonic crystals based on the previous periodic structure and the simulated results.

The redesigned periodic structures are utilized to fabricate a new device to have metamaterials or photonic crystals having the redesigned periodic structures. In some embodiments, instructions are provided to another computing device, module, or engine to fabricate the new device based on the redesigned periodic structure of the metamaterials or photonic crystals. For example, computing device 100 instructs another computing system to fabricate a new smart microwave device, photonic device, or acoustic device to have the redesigned periodic structures. The redesign process as specified in block 214 includes all the aspects as discussed in block 212.

Process 200 then loops to block 201 for additional simulations based on the redesigned structure of the newly fabricated device. In various embodiments, new measurement data of the performance of the new device may be made, such as the wave behavior of the new device, which can be used as input for the additional simulations of the new device with the redesigned structure. In some embodiments, process 200 does not loop to block 201 and can stop if the device performance meets the design criteria. In at least one such embodiment, the computing device 100 outputs or provides an indication that the device performance meets the design criteria.

The following sections describe various aspects of the BBGFL as used in the description above. The equation numbers in each section are unique to that section and should not be considered in the other sections unless explicitly stated or otherwise dictated by the context of the equation. Is should be noted that the character "g" and "g" utilized in the equations refers to the same character, even though they may be described using different fonts.

Section A—Broadband Calculations of Band Diagrams in Periodic Structures Using the Broadband Green's Function with Low Wavenumber Extraction (BBGFL)

Briefly, this section describes a Broadband Green's Functions with Low wavenumber extraction (BBGFL) technique to calculate band diagrams in periodic structures, such as 2D impenetrable objects placed in a 2D periodic lattice. The low wavenumber extraction is applied to the 2D periodic Green's function for the lattice, which is used to formulate the surface integral equation. The low wavenumber extraction accelerates the convergence of the Floquet modes expansion. Using the BBGFL to the surface integral equation and the Method of Moments gives a linear eigenvalue equation that gives the broadband (multi-band) solutions simultaneously for a given point in the Brillouin zone. Embodiments utilize the calculation of the periodic Green's function at a single low wavenumber. Numerical results are illustrated for the 2D hexagonal lattice to show an example of computational efficiency and accuracy. Because of the acceleration of convergence, an eigenvalue problem with dimensions 49 plane wave Floquet modes is sufficient to give the multi-band solutions that are in agreement with results of the Korringa Kohn Rostoker (KKR)/multiple-scattering (MS) method. The multiband solutions for the band problem and the complementary band problem are also discussed.

Additional details can be found in L. Tsang, "Broadband Calculations of Band Diagrams in Periodic Structures Using the Broadband Green's Function with Low Wavenumber Extraction (BBGFL)," Prog. Electromag. Res., 153, 57-68 (2015), which is herein incorporated by reference.

Equations in Section A have been numbered starting at equation (1) for ease of discussion. Each reference in this section to an equation number is a reference to another equation in this same section and not to Sections B or C or D or E, unless otherwise noted.

1. Introduction

The calculation of band diagrams has numerous applications for periodic structures in electron waves, microwaves, photonic crystals, metamaterials, volumetric EBG, acoustics etc. Example methods include the plane wave method, the Korringa Kohn Rostoker method (KKR), and the multiple scattering method MST. The latter two methods used wave expansions to treat circular/spherical scatterers and have high accuracy. The use of Ewald summation has also been used to speed up the calculations of the periodic Green's function. Discrete methods such as the finite difference time domain method (FDTD), and the finite element method (FEM) were also used. The MoM/BIRME method and the IE/BIRME method were also used in calculations of band diagrams in planar and closed metallic electromagnetic bandgap structures. The advantages of the plane wave method are simple implementation and that the eigenvalue problem is linear with the broadband solutions, i.e., all the bands, calculated simultaneously. The disadvantage of the method is the poor convergence of the plane wave Floquet mode expansion. In the plane wave method, a spectral expansion of the potential function or permittivity is taken. This spectral expansion has accuracy issues for large contrasts between the objects and the background medium. The KKR method and the MST have high accuracy, but is CPU intensive. This method also utilizes a nonlinear search for the band solution with one band at a time.

Embodiments described in this section utilize a periodic Green's function of the periodic lattice to formulate surface integral equation. The periodic Green's function has slow convergence. If the periodic Green's function is used for the surface integral equation to calculate the eigenvalues, the equation is nonlinear and an iterative search is performed with one band at a time. Recently, the Broadband Green's Function with Low wavenumber extraction (BBGFL) has been applied to wave propagation in waveguide/cavity of arbitrary shape. By using a single low wavenumber extraction, the convergence of the modal expansion of the Green's function is accelerated. Also the singularity of the Green's function has been extracted. This method has been shown to be efficient for broadband simulations of wave propagation in waveguides/cavity. It is noted that the modal expansion of Green's function in a waveguide is similar in form to the Floquet expansion of Green's function in a periodic structure. Embodiments described in this section utilize the BBGFL to calculate band diagrams in periodic structures. A low wavenumber extraction is utilized to accelerate the convergence of the periodic Green's function. The BBGFL is used to formulate the surface integral equations. Next, applying the Method of Moments gives a linear eigenvalue equation that gives all the multi-band solutions simultaneously for a point in the first Brillouin zone. This is labeled as "broadband simulations" as the multi-band solutions are calculated simultaneously rather than searching the band solution one at a time. The multiband solutions of the band problem and the multi-band solutions of the complementary band problem are calculated simultaneously. Numerical results are illustrated to show the computational efficiency and accuracy of the method. In sub-section 2, the scattering problem of PEC scatterers is formulated in a periodic structure. The BBGFL is then applied to the periodic Green's function. The method is then combined with the Method of Moments. In sub-section 3, numerical results are illustrated for circular impenetrable objects using size parameters that are representative. The case of hexagonal lattice is illustrated. Because of the acceleration of convergence, an eigenvalue problem with dimensions of 49 Floquet modes are sufficient to give the multi-band solutions that are in good agreement with the results of the KKR method. The multiband solutions of the complementary problem are also discussed.

2. Formulation

Figure 16A:
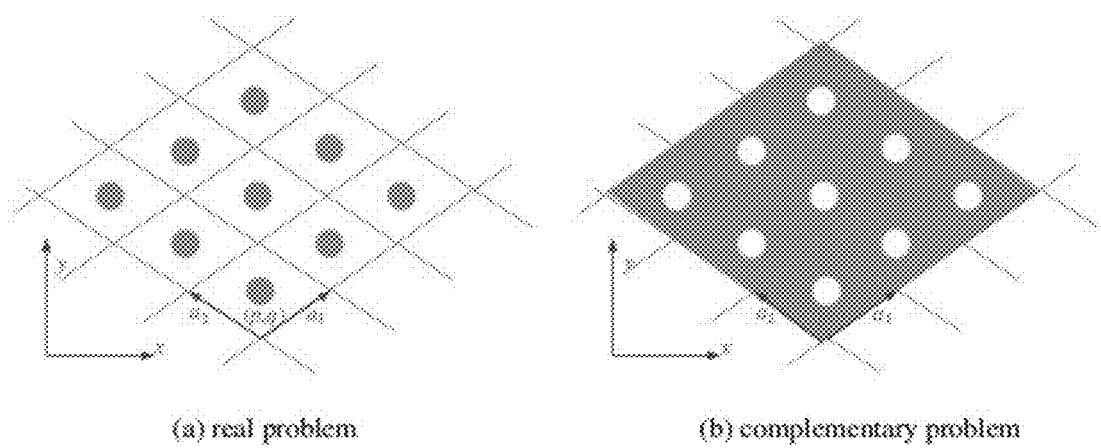
FIGS. 16A-16E illustrate various diagrams associated with broadband calculations of band diagrams in periodic structures of 2D impenetrable scatterers using the BBGFL.

Consider a 2D periodic lattice (FIG. 16A) in xy plane with z perpendicular to the plane. FIG. 16A illustrates a 2D periodic lattice: (a) Band problem consists of PEC for scatterers and permittivity ε for background; (b) complementary band problem consists of permittivity ε for scatterers and PEC for background. The following notations is utilized. A lattice translation is invariant for $$\bar{R}_{pq} = p\bar{a}_1 + q\bar{a}_2 \tag{1}$$

where $\bar{a}_1$ and $\bar{a}_2$ are the primitive translation vectors, and p, q are integers, $-\infty < p, q < \infty$.

The cell is labeled by index (p, q).

The reciprocal lattice vectors are $$\bar{K}_{pq} = p\bar{b}_1 + q\bar{b}_2 \tag{2}$$

where $-\infty < p, q < \infty$.

$$\bar{b}_1 = 2\pi \frac{\bar{a}_2 \times \hat{z}}{\Omega_0} \tag{3a}$$

$$\bar{b}_2 = 2\pi \frac{\hat{z} \times \bar{a}_1}{\Omega_0} \tag{3b}$$

and $\Omega_0 = |\bar{a}_1 \times \bar{a}_2|$ is the size of the unit cell.

Let $\bar{k}_i$ be a wave vector in the first Brillouin zone, where $$\bar{k}_i = \beta_1 \bar{b}_1 + \beta_2 \bar{b}_2 \tag{4}$$

where $0 \leq \beta_1, \beta_2 \leq \frac{1}{2}$.

Then the Floquet (Bloch) mode vector is $$\bar{k}_{ipq} = \bar{k}_i + \bar{K}_{pq} \tag{5}$$

Then in the spectral domain, the periodic Green's function for a given $\bar{k}_i$ and $k = w\sqrt{\mu\varepsilon}$ is $$g_P(k, \bar{k}_i; x, y, x', y') = \frac{1}{\Omega_0} \sum_{p,q} \frac{1}{|\bar{k}_{ipq}|^2 - k^2} \exp(i\bar{k}_{ipq} \cdot (\bar{\rho} - \bar{\rho}')) \tag{6}$$

The factor $\exp(i\bar{k}_{ipq} \cdot (\bar{\rho} - \bar{\rho}'))$ is the Floquet (Bloch) mode. A combined Greek index $\alpha = (p, q)$ is used next. Then $$g_P(k, \bar{k}_i; x, y, x', y') = \frac{1}{\Omega_0} \sum_{\alpha} \frac{1}{|\bar{k}_{i\alpha}|^2 - k^2} \exp(i\bar{k}_{i\alpha} \cdot (\bar{\rho} - \bar{\rho}')) \tag{7}$$

Note that the above expansion is similar to the waveguide mode expansion. The band problem consists of the scatterer being perfect electric conductor and the background has permittivity ε (FIG. 16A(a)). The complementary band problem has the roles reversed so that the scatterer has permittivity £ and the background is PEC (FIG. 16A(b)). Waves that obey the Dirichlet boundary conditions on the surface of the cylinder is considered.

The cylinder in cell (0, 0) is labelled as the 0-th cylinder and the cylindrical surface is labelled as $S_{00}$ with $\hat{n}$ the outward normal to $S_{00}$. The region inside the (0, 0) cylinder is labelled as $A_{00}$.

For the band problem, the integral equation is $$\int_{S_{00}} dl' \, g_P(k, \bar{k}_i; \bar{\rho} - \bar{\rho}')[\hat{n}' \cdot \nabla' \psi(x', y')] = 0, \text{ for } (x, y) \text{ in } A_{00} \tag{8}$$

where ψ is the wave function which is the z component of the electric field for the TM waves of the case of electromagnetics. For the complementary band problem, the integral equation is $$\int_{S_{00}} dl' \, g_P(k, \bar{k}_i; \bar{\rho} - \bar{\rho}')[\hat{n}' \cdot \nabla' \psi(x', y')] = \psi(x, y), \text{ for } (x, y) \text{ in } A_{00} \tag{9}$$

Equation (8) is the starting point of the KKR method (sub-section 5). Let t be the coordinate on the boundary so that (x, y) = (x(y), y(t)) be a point on the boundary. Then the surface integral equation is obtained by letting (x, y) approach $S_{00}$ from $A_{00}$. This is performed for both Eq. (8) and Eq. (9). Then $$\int_{S_{00}} dl' \, g_P(k, \bar{k}_i; x, y, x', y') J_s(t') = 0 \tag{10}$$

where (x(t), y(t)) and (x', y') = (x(t'), y(t')) are both on the surface of the circular cylinder. In Eq. (10), the surface current is $J_s(t') = \hat{n}' \cdot \nabla' \psi(x', y')$. Note that the same surface integral equation for the band problem and the complementary problem results. Thus, solving Eq. (10) gives solutions for the multi-bands of the band problem and the complementary multi-bands.

The surface integral equation is solved to find the multiple values of k for the given $\bar{k}_i$. The multivalues correspond to the different bands for the same $\bar{k}_i$. The difficulties of the approach include:

(i) the expansion $\Sigma_{p,q}$ has slow convergence;

(ii) the search for k is a nonlinear search that requires calculations of $G_p(k, \bar{k}_i; x, y, x', y')$ at many k's; and (iii) the search for k is one solution at a time, in order to obtain multiple k in multiband solutions.

In the following, the BBGFL that are to circumvent the above three problems is addressed.

A low wavenumber $k_L$ is chosen. Then BBGFL is applied, in a manner similar to waveguide/cavity problem. The periodic Green's function is expressed as the sum of the Green's function at that single low wavenumber $k_L$ and the Floquet mode expansion with that low wavenumber counterpart subtracted. Then $$g_P(k, \bar{k}_i; \bar{\rho}, \bar{\rho}') = g_P(k_L, \bar{k}_i; \bar{\rho}, \bar{\rho}') + \quad (11)$$

$$\frac{k^2 - k_L^2}{\Omega_0} \sum_\alpha \frac{1}{\left(|\bar{k}_{i\alpha}|^2 - k^2\right)\left(|\bar{k}_{i\alpha}|^2 - k_L^2\right)} \exp(i\bar{k}_{i\alpha} \cdot (\bar{\rho} - \bar{\rho}'))$$

The above is known as BBGFL (Broadband Green's Functions with Low wavenumber extraction) as it has simple frequency dependence in $(k^2-k_L^2)/(|\bar{k}_{i\alpha}|^2-k^2)$. It has two parts, the low wavenumber extraction $G_p(k_L, \bar{k}_i; \bar{\rho}, \bar{\rho}')$ and the Floquet modal expansion. The low wavenumber part has no wavenumber dependence. The mode expansion has convergence of $|\bar{k}_{i\alpha}|^4$ and converges even at the point $\bar{\rho}=\bar{\rho}'$.

The procedure performs the calculation of $G_p(k, \bar{k}_i; \bar{\rho}, \bar{\rho}')$ only at a single $k=k_L$. The calculated $G_p(k_L, \bar{k}_i; \bar{\rho}, \bar{\rho}')$ is further decomposed into free space Green's function and response $$g_P(k_L, \bar{k}_i; \bar{\rho}, \bar{\rho}')=g_0(k_L; \bar{\rho}, \bar{\rho}')+G_R(k_L, \bar{k}_i; \bar{\rho}, \bar{\rho}') \quad (12)$$

where $$g_0(k_L; \bar{\rho}, \bar{\rho}') = \frac{i}{4} H_0^{(1)}(k_L|\bar{\rho} - \bar{\rho}'|) \quad (13)$$

and the response $G_R(k_L, \bar{k}_i; \bar{\rho}, \bar{\rho}')$ can be calculated since $G_p(k_L, \bar{k}_i; \bar{\rho}, \bar{\rho}')$ is already calculated.

Next $G_p(k, \bar{k}_i; \bar{\rho}, \bar{\rho}')$ is substituted into the surface integral equation. The impedance matrix element has two parts, one part $Z_{mn}^{(L)}$ due to the low wavenumber extraction and the other $Z_{mn}^{(F)}$ due to the Floquet mode expansion. The singularity at $\bar{\rho}=\bar{\rho}'$ has been extracted and resides in $G_0(k_L; \bar{\rho}, \bar{\rho}')$. MoM with pulse basis functions and point matching is used. The scatterer boundary is divided into N patches. The impedance matrix elements are $$Z_{mn}=Z_{mn}^{(L)}+Z_{mn}^{(F)} \quad (14)$$

where $1 \leq m, n \leq N$, $\bar{\rho}_n$ is the center of the n-th patch, n=1, 2, ..., N. The point matching is at $\bar{\rho}_m$, m=1, 2, ..., N.

Discretize into arc length $\Delta t$.

The low wavenumber part is $$Z_{mn}^{(L)}=[g_0(k_L; \bar{\rho}_m, \bar{\rho}_n)+g_R(k_L, \bar{k}_i; \bar{\rho}_m, \bar{\rho}_n)]\Delta t, \text{ for } n \neq m \quad (15a)$$

$$Z_{mn}^{(L)} = \frac{i\Delta t}{4}\left[1 + i\frac{2}{\pi}\left[\ln\left(\frac{\gamma k_L \Delta t}{4}\right) - 1\right]\right] + g_R(k_L, \bar{k}_i; \bar{\rho}_m, \bar{\rho}_m)\Delta t, \quad (15b)$$

for $n = m$ where $\gamma=1.78107$ is the Euler's constant. The modal expansion part is $$Z_{mn}^{(F)} = \frac{k^2 - k_L^2}{\Omega_0} \sum_\alpha \frac{1}{\left(|\bar{k}_{i\alpha}|^2 - k^2\right)\left(|\bar{k}_{i\alpha}|^2 - k_L^2\right)} \exp(i\bar{k}_{i\alpha} \cdot (\bar{\rho}_m - \bar{\rho}_n))\Delta t \quad (16)$$

The matrix equation for the surface integral equation becomes $$\sum_n Z_{mn}^{(L)} J_n + \sum_n Z_{mn}^{(F)} J_n = 0 \quad (17)$$

where $J(t)=J_n$ on the nth patch. The matrix equation above can be converted to a linear eigenvalue equation that all the eigenvalues can be solved simultaneously due to the broadband nature of the Green's function. Let N be the number of points in MoM discretization.

There are two discretizations $\alpha=(p, q)$ is the Floquet mode index, while m and n are the indices for MoM point matching and patch discretization.

For the p, q index, truncate by $-N_{max} \leq p, q \leq N_{max}$. Thus, $M=(2N_{max}+1)^2$. Since the mode expansion is fast convergent with the low wavenumber extraction, M is much less than that without the extraction.)

To reexpress $Z_{mn}^{(F)}$, let $$R_{m\alpha} = \frac{1}{\sqrt{\Omega_0}} \frac{\exp(i\bar{k}_{i\alpha} \cdot \bar{\rho}_m)}{\left(|\bar{k}_{i\alpha}|^2 - k_L^2\right)} \quad (18)$$

The Greek index is $\alpha=1, 2, \ldots, M$ while the Roman index is $m=1, 2, \ldots, N$. Then $$\sum_{n=1}^{N} L_{mn} q_n + (k^2 - k_L^2) \sum_{n=1}^{N} \sum_{\alpha=1}^{M} \frac{|\bar{k}_{i\alpha}|^2 - k_L^2}{|\bar{k}_{i\alpha}|^2 - k^2} R_{m\alpha} R_{n\alpha}^* q_n = 0 \quad (19)$$

where $$q_n = \Delta t J_n \quad (20)$$

$$z_{mn}^{(L)} = L_{mn}\Delta t \quad (21)$$

Next, let $$W_{\alpha\beta} = \frac{1}{\frac{1}{k^2 - k_L^2} - \frac{1}{|\bar{k}_{i\alpha}|^2 - k_L^2}} \delta_{\alpha\beta} \quad (22)$$

$$D_{\alpha\beta} = \frac{1}{|\bar{k}_{i\alpha}|^2 - k_L^2} \delta_{\alpha\beta} \quad (23)$$

where $\delta_{\alpha\beta}$ is the Kronecker delta function. Then $$(k^2 - k_L^2)\frac{|\bar{k}_{i\alpha}|^2 - k_L^2}{|\bar{k}_{i\alpha}|^2 - k^2} = \frac{1}{\frac{1}{k^2 - k_L^2} - \frac{1}{|\bar{k}_{i\alpha}|^2 - k_L^2}} = \sum_{\beta=1}^{M} W_{\alpha\beta} \quad (24)$$

Then $$\sum_{n=1}^{N} L_{mn}q_n + \sum_{n=1}^{N}\sum_{\beta=1}^{M}\sum_{\alpha=1}^{M} R_{m\alpha}W_{\alpha\beta}R_{n\beta}^* q_n = 0 \quad (25)$$

In matrix notations $$\bar{\bar{L}}\bar{q} + \bar{\bar{R}}\bar{\bar{W}}\bar{\bar{R}}^\dagger \bar{q} = 0 \quad (26)$$

where $\bar{\bar{R}}^\dagger$ is the Hermitian adjoint of $\bar{\bar{R}}$. The matrix $\bar{\bar{R}}$ is of dimension N×M. The matrices $\bar{\bar{W}}$ and $\bar{\bar{D}}$ are M×M diagonal matrices.

Next let $$\bar{b} = \bar{\bar{W}}\bar{\bar{R}}^\dagger \bar{q} \quad (27)$$

The $\bar{b}$ column vector is of dimension M×1.
Then $$\bar{\bar{L}}\bar{q} + \bar{\bar{R}}\bar{b} = 0 \quad (28)$$

Note that $$\frac{1}{k^2 - k_L^2}\bar{\bar{W}} - \bar{\bar{D}}\bar{\bar{W}} = \bar{\bar{I}} \quad (29)$$

$$\bar{\bar{W}} = \left(\frac{1}{k^2 - k_L^2}\bar{\bar{I}} - \bar{\bar{D}}\right)^{-1} \quad (30)$$

Substitute in Eq. (27)

$$\frac{1}{k^2 - k_L^2}\bar{b} - \bar{\bar{D}}\bar{b} = \bar{\bar{R}}^\dagger \bar{q} \quad (31)$$

From Eq. (28)

$$\bar{q} = -\bar{\bar{L}}^{-1}\bar{\bar{R}}\bar{b} \quad (32)$$

Substitute Eq. (32) into Eq. (31), the eigen-problem becomes $$\bar{\bar{A}}\bar{b} = \frac{1}{k^2 - k_L^2}\bar{b} \quad (33)$$

where $$\bar{\bar{A}} = \bar{\bar{D}} - \bar{\bar{R}}^\dagger \bar{\bar{L}}^{-1}\bar{\bar{R}} \quad (34)$$

is of dimension M×M. Thus, the eigenvalue problem of Eq. (33) is of dimension M, which is the number of Floquet modes.

Note that $\bar{\bar{A}}$ is independent of wavenumber (frequency) k.

Solving the eigenvalue problem is a linear eigenvalue problem with all the eigenvalues $1/(k^2-k_L^2)$(bands) calculated simultaneously. The eigenvectors $\bar{b}$ are also calculated.

The surface current $J_s(t')$ is then calculated by using Eq. (32) and Eq. (20). Then the wave function $\psi(x, y)$ can be calculated by $$\psi(x, y) = \int_{S_{00}} dl' g_P(k, \bar{k}_i; x, y, x', y') J_s(t') \quad (35)$$

where (x, y) can be anywhere inside or outside the cylinder. Equation (35) can be used to determine whether the eigenvalue is a real band (mode) solution or that of the complementary band solution.

3. Numerical Results

Considering the example of a 2D hexagonal lattice defined by the lattice vectors $$\bar{a}_1 = \frac{a}{2}(\sqrt{3}\hat{x} + \hat{y}), \text{ and } \bar{a}_2 = \frac{a}{2}(-\sqrt{3}\hat{x} + \hat{y}).$$

Consider an array of impenetrable circular cylinders of radius b in the lattice. Let a=1, and the permittivity be $\varepsilon = 8.9\varepsilon_0$, where $\varepsilon_0$ is the free space permittivity. Consider two cases, b=0.2, and b=0.4.

Let $\bar{k}_i$ be a wave vector in the first Brillouin zone as defined in Eq. (4).

For each $\bar{k}_i$, the multi-band solutions give the multiple k's. For each k, calculate the normalized frequency $f_N$ by $$f_N(k) = \frac{k}{2\pi}\sqrt{\frac{\varepsilon_0}{\varepsilon}} \quad (36)$$

In the results, $k_L$ is used so that $f_N(k_L)=0.001$. $f_N(k_L)=0.2$ and 0.5, were also used and both give very similar results. Thus, the choice of the low wavenumber $k_L$ is robust.

Case 1: b=0.2, $\varepsilon=8.9\varepsilon_0$, a=1
Consider the case when the wave vector is

β1=0.1

β2=0.05

Table 1 is a comparison of band eigenvalues $f_N$ computed from BBGFL using different number of Floquet modes ($N_{max}$, M) after low wavenumber extraction. The results are compared against the KKR results. Results are computed for $\bar{k}_i = 0.1\bar{b}_1 + 0.05\bar{b}_2$. The 7-th mode 0.642 is shown to be a complementary band solution by testing the scattering field outside the PEC cylinder. The geometry parameters are as specified for case 1.

Figure 16B:
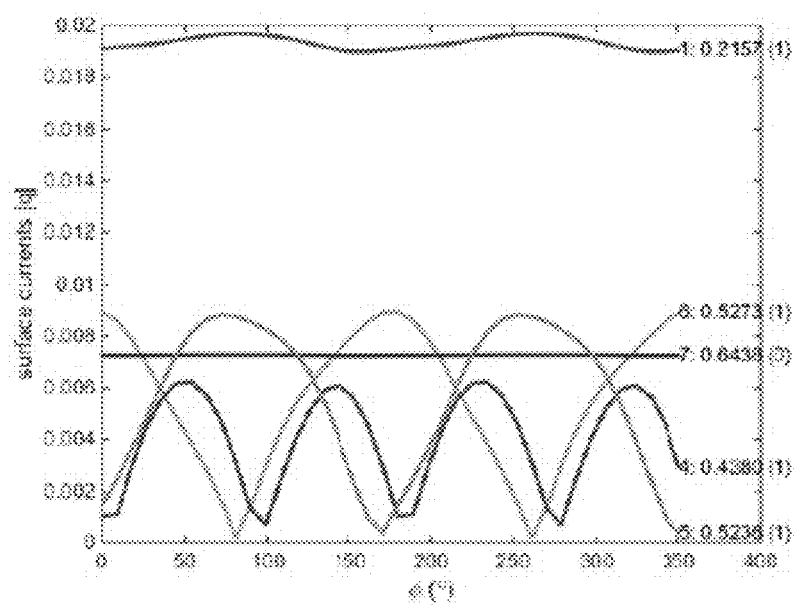

As shown Table 1 lists the $f_N$ for 10 eigenvalues. Three different $N_{max}$ are chosen to truncate the Floquet modes: ($N_{max}=3$, M=49), ($N_{max}=5$, M=121), ($N_{max}=20$, M=1681). The KKR solutions are also listed. The results with ($N_{max}=3$, M=49) agree with KKR to 2 significant figures. The results with ($N_{max}=5$, M=121) agree with KKR to 3 significant figures. This shows the BBGFL method is efficient and accurate. The surface currents of several eigenvalues are illustrated in FIG. 16B. In FIG. 16B shows surface currents of 5 band solutions: (e.g., 4:0.4380 means the normalized frequency of the fourth mode ordered in ascending order is 0.4380). The 7-th mode of $f_N=0.6438$ indicated by "(0)" is that of the complementary band. The modes indicated by "(1)" are real band solution. Results are computed for $\bar{k}_i=0.1\bar{b}_1+0.05\bar{b}_2$. The geometry parameters are as specified for case 1. Results are computed with M ≈ 600.

TABLE 1

| order | BBGFL $N_{max}$ = 3 M = 49 | BBGFL $N_{max}$ = 5 M = 121 | BBGFL $N_{max}$ = 20 M = 1681 | KKR | Root of |
|---|---|---|---|---|---|
| 1 | 0.215 | 0.215 | 0.215 | 0.215 | |
| 2 | 0.368 | 0.368 | 0.368 | 0.368 | |
| 3 | 0.413 | 0.413 | 0.413 | 0.413 | |
| 4 | 0.438 | 0.438 | 0.438 | 0.438 | |
| 5 | 0.523 | 0.523 | 0.523 | 0.523 | |
| 6 | 0.528 | 0.527 | 0.527 | 0.526 | |
| 7 | 0.645 | 0.643 | 0.642 | None | $J_0(kb)$, 0.639 |
| 8 | 0.670 | 0.670 | 0.669 | 0.669 | |
| 9 | 0.685 | 0.684 | 0.684 | 0.684 | |
| 10 | 0.705 | 0.704 | 0.704 | 0.704 | |

In the table, the mode $f_N$=0.642 is that of the complementary band because the surface integral equation gives the solution of the band problem as well as the complementary band problem. On the other hand, the KKR method (subsection 5) gives the solutions for the real band problem. For the case of PEC, the complementary band problem corresponds to the TM waveguide solution of $J_n(kb)$=0, where $J_n$ is Bessel function of nth order. This can also be established by using Eq. (35) to calculate the wave outside the cylinder and the wave turns out to be zero outside the cylinder.

Figure 16C:
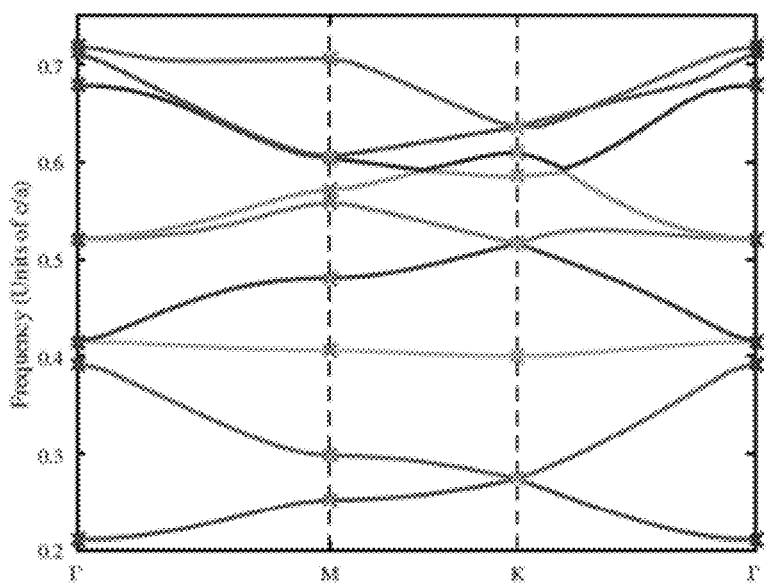

Next the band diagram is calculated for the first 9 bands, (not including the complementary band). The band diagram of the lattice structure are computed using the BBGFL approach and plotted in FIG. 16C using (M ≈ 600). In FIG. 16C shows band diagram of the hexagonal structure with background dielectric constant of 8.9 and PEC cylinders with radius b=0.2a. The lowest 9 bands (not including the complementary band) are plotted in the first irreducible Brillouin zone for the TM waves (Dirichlet boundary condition) shown as solid lines. Results are compared with KKR approach at Γ, M, and K points. KKR results are plotted as cross marks. The KKR results are also shown at selected points. The agreement of the results of BBGFL and that of KKR are excellent.

Case 2: b=0.4, ε=8.9$ε_0$, a=1

Figure 16D:
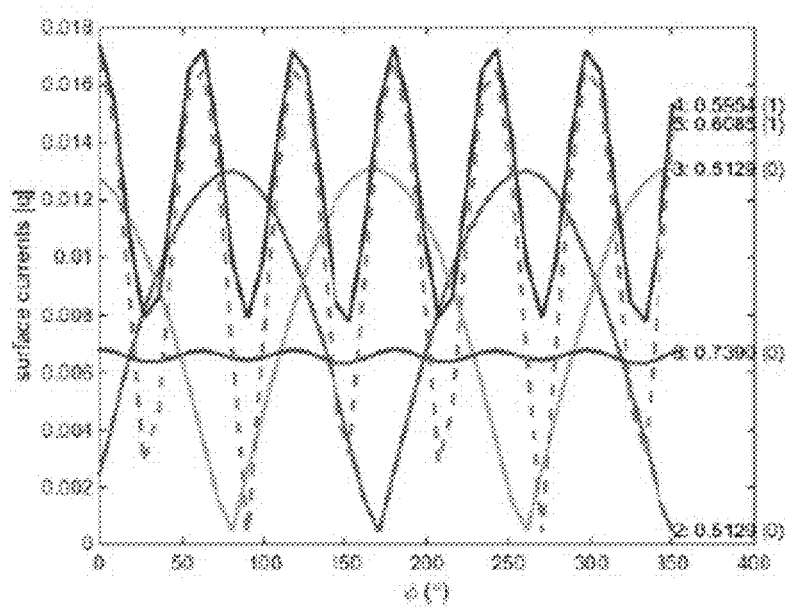

The area ratio of scatterers to background is $\pi b^2/\Omega_0$=58%. In Table 2, $f_N$ is listed for the first 10 eigenvalues with $\bar{k}_i$=0.1$\bar{b}_1$+0.05$\bar{b}_2$. The results with three different Nmax to truncate the Floquet modes are compared against the KKR solutions. The BBGFL solutions have both multi-band solutions and the complementary multi-band solutions. The results are in good agreement with that of KKR. The surface currents corresponding to 5 of the first 10 solutions are plotted in FIG. 16D. FIG. 16D shows surface currents of the band solutions: (e.g., 5:0.6085 means the normalized frequency of the fifth mode in ascending order is 0.6085). The 4th and 5th eigenvalues are band solutions, as indicated by "(1)" in the plot following the mode frequency. The rest 3 modes as indicated by "(0)" are that of complementary bands. Results are computed for $\bar{k}_i$=0.1$\bar{b}_1$+0.05$\bar{b}_2$. The geometry parameters are as specified for case 2. Results are computed with M ≈ 600.

Figure 16E:
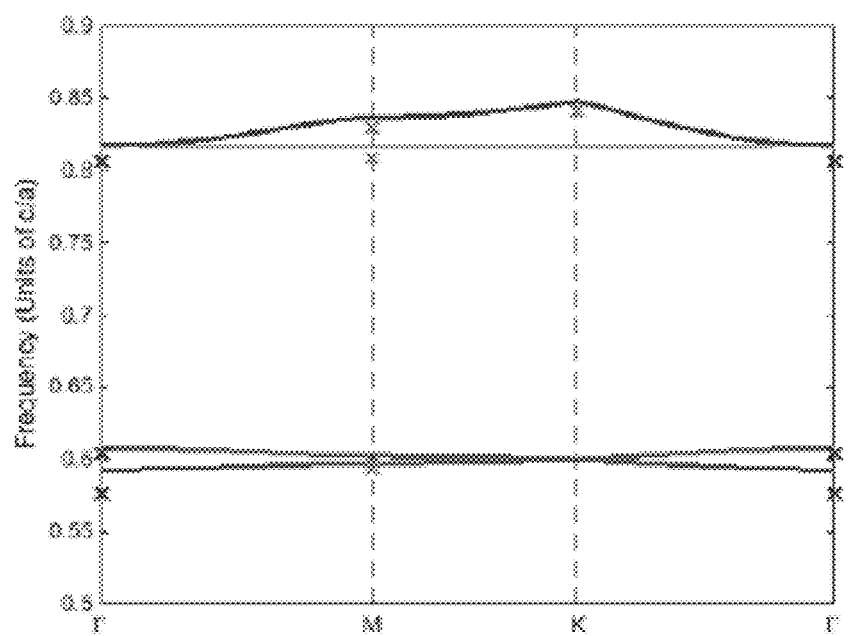

In FIG. 16E, the band diagram is drawn for the crystal structure with periodic PEC cylinders of radius b=0.4a. FIG. 16E shows band diagram of the hexagonal structure with background dielectric constant of 8.9 and PEC cylinders with radius b=0.4a. The lowest 4 bands (not including the complementary multi-bands) are plotted in the first irreducible Brillouin zone for TM waves (Dirichlet boundary condition) shown as solid lines. Only the four physical band out of the first 10 eigenvalues are shown. The KKR results are also computed at the Γ, M, and K points. Results are compared with KKR approach at Γ, M, and K points. KKR results are plotted as cross marks. The results are in good agreement.

Table 2 is a comparison of band eigenvalues $f_N$ computed from BBGFL using different number of Floquet modes. The results are compared against the KKR results. Results are computed for $\bar{k}_i$=0.1$\bar{b}_1$+0.05$\bar{b}_2$. The geometry parameters are as specified for case 2.

TABLE 2

| order | BBGFL $N_{max}$ = 3 M = 49 | BBGFL $N_{max}$ = 5 M = 121 | BBGFL $N_{max}$ = 20 M = 1681 | KKR | Root of |
|---|---|---|---|---|---|
| 1 | 0.322 | 0.322 | 0.322 | None | $J_0(kb)$, 0.321 |
| 2 | 0.513 | 0.512 | 0.512 | None | $J_1(kb)$, 0.511 |
| 3 | 0.513 | 0.513 | 0.512 | None | $J_1(kb)$, 0.511 |
| 4 | 0.598 | 0.594 | 0.593 | 0.589 | |
| 5 | 0.611 | 0.608 | 0.607 | 0.604 | |
| 6 | 0.689 | 0.687 | 0.687 | None | $J_2(kb)$, 0.685 |
| 7 | 0.690 | 0.687 | 0.687 | None | $J_2(kb)$, 0.685 |
| 8 | 0.742 | 0.739 | 0.738 | None | $J_0(kb)$, 0.736 |
| 9 | 0.828 | 0.817 | 0.815 | 0.809 | |
| 10 | 0.847 | 0.820 | 0.817 | | |

Table 3 shows the CPU time in seconds for computing results in FIGS. 16C and 16E. The time is recorded on an HP ProDesk 600 G1 desktop with Intel R Core™ i7-4790 CPU @3.60 GHz and 32 GB RAM. Note the time used to compute the complete band diagram is approximately 30 times the CPU time for one $\bar{k}_i$ since the exact CPU time varies from run to run.

TABLE 3

| Time in seconds | Compute $g_R(k_L, \bar{k}_i; \bar{\rho}_m, \bar{\rho}_n)$ and $Z_{mn}^{(L)}$, sec | Multi-bands eigen-matrix solution (33) for one $\bar{k}_i$, sec | Total multi-bands solution for one $\bar{k}_i$, sec | the complete band diagram using 30$\bar{k}_i$, sec |
|---|---|---|---|---|
| FIG. 16C | 3.836 | 0.714 | 4.550 | 138.715 |
| FIG. 16E | 3.744 | 0.728 | 4.472 | 142.435 |

In Table 3, the CPU is listed for the results of band diagrams in FIGS. 16C and 16E. Mat lab R was used in computing the band diagram. The solutions for each $\bar{k}_i$ is computed in the Brillouin zone. For each $\bar{k}_i$, the low wavenumber part o$g_R(k_L, \bar{k}_i; \bar{\rho}_m, \bar{\rho}_n)$f and $Z_{mn}^{(L)}$ are computed. Next, the multiband solutions is computed for the eigenvalues and eigenvectors of Eq. (33). The multiband solutions are computed simultaneously. Adding the two CPU gives the CPU of the multiband solutions for one $\bar{k}_i$. In FIGS. 16C and 16E, 30 $\bar{k}_i$ points is used in the Brillouin zone. The CPU is the product of that of one $\bar{k}_i$ and the number of points of $\bar{k}_i$. The comparison of CPU with KKR is approximate as KKR needs to search iteratively for each band solution, requiring many values of k search for one $k_i$. A crude estimate is that the BBGFL method is about 100 times faster than KKR. The procedure of calculation of $g_R(k_L, \bar{k}_i; \bar{\rho}, \bar{\rho}')$, is described in sub-section 6.

4. Conclusions

In this section, the BBGFL method is adapted to calculate band solutions of periodic structures in 2D problem with 2D periodicity. The case of Dirichlet boundary conditions is considered. The method is shown to be computationally efficient and accurate. The multiband solutions are calculated simultaneously rather than an iterative search on each root. The method is illustrated for the 2D hexagonal lattice. In the low wavenumber extraction, the choice of the low wavenumber $k_L$ is robust. The use of low wavenumber extraction makes the BBGFL method applicable to general lattices. The method extends to dielectric scatterers in a dielectric background for the 2D problem. The method extends to 3D problem with 3D periodicity. Since surface integral equation is solved using MoM, the BBGFL method can be applied to scatterers of arbitrary shapes.

5. KKR Method

In this sub-section, the governing equations for the KKR method is summarized for the case when the PEC cylinder is circular with radius b. Equation (8) is used for the band problem. The solution outside the cylinder is expressed as $$\psi(\bar{\rho}) = \sum_m c_m J_m(k\rho) \exp(im\phi) \quad (A1)$$

On the surface of the cylinder, the surface unknown is $$\hat{n} \cdot \nabla \psi(x,y) = \sum_m c_m k J'_m(kb) \exp(im\phi) \quad (A2)$$

The periodic Green's function is expressed as $$g_P(k, \bar{k}_i, \bar{\rho} - \bar{\rho}') = \quad (A3)$$
$$-\frac{1}{4} N_0(k|\bar{\rho} - \bar{\rho}'|) + \sum_m D_m J_m(k|\bar{\rho} - \bar{\rho}'|) \exp(im\phi_{\bar{\rho}\bar{\rho}'})$$

where $N_m$ is Neumann function of mth order.

Since $\rho'=b$ and $\rho < \rho'$, using addition theorem of cylindrical waves gives $$g_P(k, \bar{k}_i, \bar{\rho} - \bar{\rho}') = -\frac{1}{4} \sum_n J_n(k\rho) \exp(in\phi) N_n(kb) \exp(-in\phi') + \quad (A4)$$
$$\sum_{m'} D_{m'} \sum_n J_n(k\rho) \exp(in\phi) J_{n-m'}(kb) \exp(-i(n-m')\phi')$$

Substituting into Eq. (8), integrate over $\phi'$ and since the set $J_n(k\rho)\exp(in\phi)$ is complete, the matrix equation, $$\sum_m Q_{nm} c_m = 0 \quad (A5)$$

where $$Q_{nm} = D_{n-m}[-J_m(kb)kJ'_m(kb)] + \frac{\delta_{nm}}{4} N_m(kb) kJ'_m(kb) \quad (A6)$$

Let $$\bar{c} = \bar{P}\bar{d} \quad (A7)$$

where $$P_{mm'} = \frac{1}{-J_m(kb)kJ'_m(kb)} \delta_{mm'} \quad (A8)$$

Then $$\bar{\Lambda}\bar{d} = 0 \quad (A9)$$

where $$\Lambda_{nm} = D_{n-m} - \frac{\delta_{nm}}{4} \frac{N_m(kb)}{J_m(kb)} \quad (A10)$$

The band solution is given by $$\det \bar{\Lambda}(k) = 0 \quad (A11)$$

The solution requires an iterative search, with band solution of one k at a time. Unlike the surface integral equation, the KKR solution has that of the band problem of Eq. (8), and not Eq. (9) of the complementary band problem.

6. Calculation of $g_R(k_L, \bar{k}_i; \bar{\rho}, \bar{\rho}')$

The low wavenumber part of the impedance matrix is $Z_{mn}^{(L)}$. In computing $Z_{mn}^{(L)}$, from Eq. (15a) and Eq. (15b) that the response part, $g_R(k_L, \bar{k}_i; \bar{\rho}, \bar{\rho}')$, of the periodic Green's function is calculated once at the low wavenumber $k_L$. Note that $g_R(k_L, \bar{k}_i, \bar{\rho}, \bar{\rho}')$ is a smooth function and depends on $\bar{\rho} - \bar{\rho}'$.

$\bar{\rho} \neq 0$, $$g_P(k, \bar{k}_i; \bar{\rho}) = \frac{1}{\Omega_0} \sum_{\alpha=1}^{M_L} \frac{\exp(i\bar{k}_{i\alpha} \cdot \bar{\rho})}{|k_{i\alpha}|^2 - k_L^2} \quad (B1)$$

Then using Eq. (A3) and Eq. (B1) and integrating $g_P(k, \bar{k}_i; \bar{\rho})$ over a circle of radius $|\bar{\rho}| = R_1$, the expression of the coefficients $D_n(k, \bar{k}_i)$ $$D_n(k, \bar{k}_i) = \quad (B2)$$
$$\frac{1}{J_n(kR_1)} \left[ \frac{i^n}{\Omega_0} \sum_{\alpha=1}^{M_L} J_n(|k_{i\alpha}|R_1) \frac{\exp(-in\phi_{k_{i\alpha}})}{|k_{i\alpha}|^2 - k_L^2} + \frac{1}{4} N_0(kR_1)\delta_{n0} \right]$$

where $\phi_{k_{i\alpha}}$ is the polar angle of the vector $\bar{k}_{i\alpha}$ and R1 is an arbitrary radius. After $D_n(k, \bar{k}_i)$ coefficients are obtained, the $g_R(k, \bar{k}_i; \bar{\rho})$ is calculated by $$g_R(k, \bar{k}_i; \bar{\rho}) = \sum_n C_n(k, \bar{k}_i) \frac{J_n(k\rho)}{J_n(kR_2)} \exp(in\phi) \quad (B3)$$

where $$C_n(, \bar{k}_i) = (D_n(k, \bar{k}_i) - \tfrac{1}{4}\delta_{n0}) J_n(kR_2) \quad (B4)$$

In Eq. (B3) and Eq. (B4), $R_2$ is chosen to have better normalization of the coefficients $C_n(k, \bar{k}_i)$.

In the BBGFL procedure, Eq. (B2), Eq. (B3) and Eq. (B4) are calculated only once at the wavenumber $k_L$. Choose $M_L = (401)^2$.

Note that $M_L$ is different from M. The quantity M is the truncation of BBGFL which is small. On the other hand $M_L$ is used to evaluate the periodic Green's function at $|\bar{\rho} - \bar{\rho}'| = R_1$ and $k = k_L$. Thus, $M_L$ is much larger than M. Since the surface integral equation is solved on the surface of the scatterer so that $0 \le |\bar{\rho} - \bar{\rho}'| \le 2b$ in the MoM implementation, choosing R1=R2=2b. For the coefficients, calculate $C_n(k_L, \bar{k}_i)$ and $D_n(k_L, \bar{k}_i)$ for $|n| \le 4$.

Section B—Calculations of Band Diagrams and Low Frequency Dispersion Relations of 2D Periodic Dielectric Scatterers Using Broadband Green's Function with Low Wavenumber Extraction (BBGFL)

Briefly, the broadband Green's function with low wavenumber extraction (BBGFL) described in this section is applied to the calculations of band diagrams of two-dimensional (2D) periodic structures with dielectric scatterers. Periodic Green's functions of both the background and the scatterers are used to formulate the dual surface integral equations by approaching the surface of the scatterer from outside and inside the scatterer. The BBGFL are applied to both periodic Green's functions. By subtracting a low wavenumber component of the periodic Green's functions, the broadband part of the Green's functions converge with a small number of Bloch waves. The method of Moment (MoM) is applied to convert the surface integral equations to a matrix eigenvalue problem. Using the BBGFL, a linear eigenvalue problem is obtained with all the eigenmodes computed simultaneously giving the multiband results at a point in the Brillouin zone Numerical results are illustrated for the honeycomb structure. The results of the band diagrams are in good agreement with the planewave method and the Korringa Kohn Rostoker (KKR) method. By using the lowest band around the $\Gamma$ point, the low frequency dispersion relations are calculated which also give the effective propagation constants and the effective permittivity in the low frequency limit.

Additional details can be found in L. Tsang and S. Tan, "Calculations of band diagrams and low frequency dispersion relations of 2D periodic dielectric scatterers using broadband Green's function with low wavenumber extraction (BBGFL)," Optics Express, 24(2), 945-965 (2016), which is herein incorporated by reference.

Equations in Section B have been numbered starting at equation (1) for ease of discussion. Each reference in this section to an equation number is a reference to another equation in this same section and not to Sections A or C or D or E, unless otherwise noted.

1. Introduction

The common approaches to calculate the bands include the planewave method and the Korringa Kohn Rostoker (KKR) method. The planewave method casts the problem into a linear eigenvalue problem and provides multiple band solutions simultaneously for a point in the Brillouin zone. However, in the planewave method, the permittivity (or potential) profile is expanded in Fourier series. For the case of abrupt profiles of large contrasts between background and scatterer, many terms are required in the Fourier series expansion. An artificially smeared dielectric function was also employed. The convergence issue of the planewave method has been reported. The KKR method is a multiple scattering approach by forming the surface integral equations with periodic Green's function and the equation is solved by cylindrical or spherical waves expansions. The method is convenient for scatterers with shapes of separable geometries, such as circular cylinders or spheres. In the KKR/multiple scattering method, the eigenvalue problem is nonlinear requiring the root seeking procedure. One needs to repeat the non-linear root seeking one by one to find multiple band solutions. Numerical approaches such as the finite difference time domain method (FDTD) and finite element method (FEM) have also been used.

Embodiments in this section describe the periodic Green's function to formulate the dual surface integral equations. The periodic Green's function has slow convergence. If the periodic Green's function is used for the surface integral equation to calculate the eigenvalues, the equation is nonlinear and an iterative search needs to be performed with one band at a time. Recently, the Broadband Green's Function with Low wavenumber extraction (BBGFL) has been applied to wave propagation in waveguide/cavity of arbitrary shape. By using a single low wavenumber extraction, the convergence of the modal expansion of the Green's function is accelerated. Also the singularity of the Green's function has been extracted. The method has been shown to be efficient for broadband simulations of wave propagation in waveguides/cavity. It was noted that the expression of modal expansion of Green's function in a waveguide is similar to the Floquet expansion of Green's function in a periodic structure in Section A above. In Section A the BBGFL was adapted to calculate band diagrams in periodic structures where the scatterers obey Dirichlet boundary conditions. A low wavenumber extraction was used to accelerate the convergence of the periodic Green's function. The BBGFL is used to formulate the surface integral equations. Next applying the Method of Moments (MoM) gives a linear eigenvalue equation that gives all the multi-band solutions simultaneously for a point in the first Brillouin zone. This is labeled as "broadband simulations" as the multi-band solutions are calculated simultaneously rather than searching the band solution one at a time. The BBGFL method was shown to be accurate and computationally efficient. The choice of the low wavenumber was shown to be robust as the choice of the low wavenumber can be quite arbitrary. The application of MoM makes the method applicable to arbitrary shapes. It is noted that the Boundary Integral Resonant Mode Expansion (BIRME) method was used to find the modes of an arbitrary shaped waveguide with PEC or perfect magnetic conductor (PMC) boundary conditions, using the Greens functions of a rectangular waveguide or circular waveguide. In BIRME, a DC extraction is used for the Greens function. Embodiments described in this section calculate band diagrams of periodic structures with general shapes of the unit cells and with dielectric scatterers embedded. Also, a low wavenumber extraction is used and the choice of the low wavenumbers is shown to be robust.

This section expands on Section A above for periodic dielectric scatterers The case of dielectric scatterers have much wider applications in devices of photonic crystals and metamaterials. For the case of dielectric scatterers, the dual surface integral equations are derived. A distinct feature in the formulation is that the periodic Green's function of the scatterers is used, in addition to using the periodic Green's function of the background. The application of the broadband periodic Green's function separates out the wavenumber dependence of Green's function, and allows the conversion of the non-linear root searching problem into a linear eigenvalue analysis problem. The low wavenumber extractions are applied to both periodic Green's functions for fast Floquet mode convergence and extraction of Green's function singularities. The use of MoM makes the method applicable to scatterers of arbitrary shape. In sub-section 2, the dual surface integral equation is formulated using the extinction theorems and the periodic Green's functions. In sub-section 3, the BBGFL is applied to the surface integral equations and derive the linear eigenvalue problem. In sub-section 4, numerical results are illustrated for the band solution of circular air voids forming a honeycomb structure. The results are in good agreement with the plane wave method and the KKR method. The quick rejection of spurious modes by using extinction theorems is also described. In sub-section 5, the lowest band around the $\Gamma$ point is used to calculate the low frequency dispersion curves, the effective permittivity, and the effective propagation constants, all of which have wide applications in devices of metamaterials.

2. Extinction Theorem and Surface Integral Equations

Figure 17A:
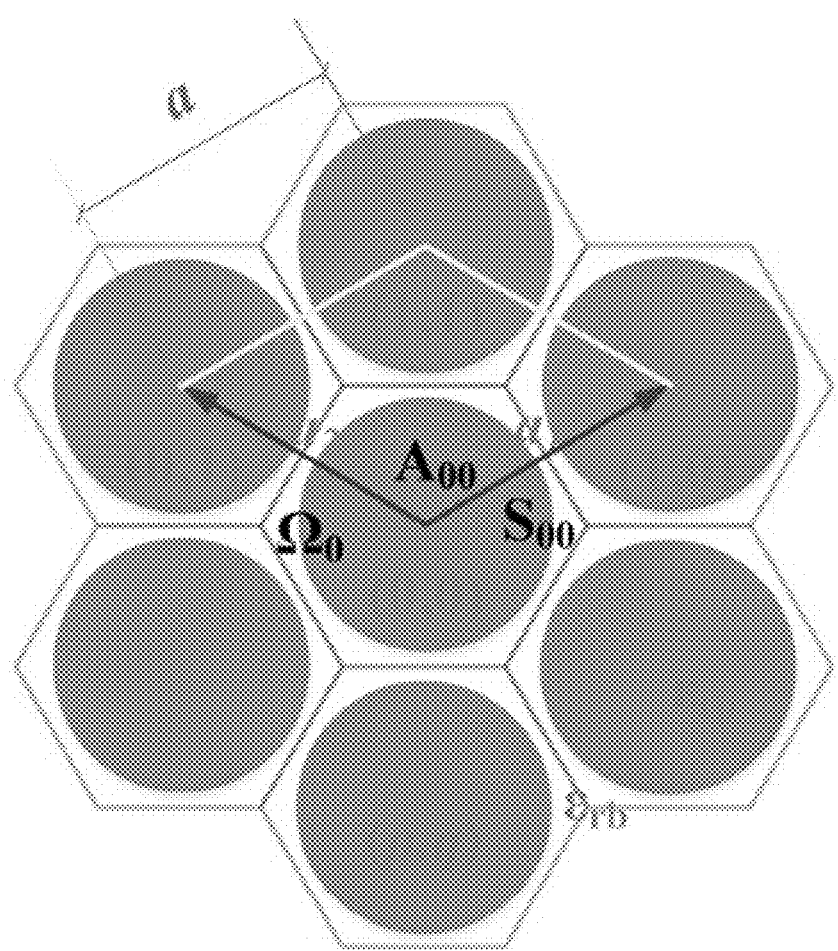
FIGS. 17A-17H illustrate various diagrams associated with calculations of band diagrams and low frequency dispersion relations of 2D periodic dielectric scatterers using BBGFL.

Consider a periodic array in the xy plane of 2D dielectric scatterers embedded in a 2D lattice as illustrated in FIG. 17A. Let the primitive lattice vectors be $\bar{a}_1$ and $\bar{a}_2$ with lattice constant a and the primitive cell area $\Omega_0 = |\bar{a}_1 \times \bar{a}_2|$. The scatterer has dielectric constant $\varepsilon_{rp}$ and the background host $\varepsilon_{rb}$. Let $S_{pq}$ denote the boundary of the scatterer in the (p, q)-th cell and $A_{pq}$ is the domain of the scatterer in the (p, q) cell bounded by $S_{pq}$. Thus, FIG. 17A shows geometry of the 2D scattering problem in 2D lattice. 2D dielectric scatterers form a periodic array with primitive lattice vectors $\bar{a}_1$ and $\bar{a}_2$ with lattice constant a. The (0, 0)-th scatterer has boundary $S_{00}$ and cross section $A_{00}$ The field outside the scatterer is denoted as $\psi$ and inside as $\psi_1$, where $\psi$ represents $E_z$ for TMz polarization and $H_z$ for TEz polarization. TMz means that the magnetic field is perpendicular to the z direction while TEz means that the electric field is perpendicular to the z direction. The extinction theorems state that $$\sum_{p,q} \int_{S_{pq}} dl' [\psi(\bar{\rho}')\hat{n}' \cdot \nabla' g(\bar{\rho}, \bar{\rho}') - g(\bar{\rho}, \bar{\rho}')\hat{n}' \cdot \nabla' \psi(\bar{\rho}')] = 0 \quad (1a)$$

if $\bar{\rho}$ is inside any scatterer, and $$-\int_{S_{pq}} dl' [\psi_1(\bar{\rho}')\hat{n}' \cdot \nabla' g_1(\bar{\rho}, \bar{\rho}') - g_1(\bar{\rho}, \bar{\rho}')\hat{n}' \cdot \nabla' \psi_1(\bar{\rho}')] = 0 \quad (1b)$$

if $\bar{\rho}$ is not in $A_{pq}$.

In (1a) and (1b) $g(\bar{\rho}, \bar{\rho}') = i/4 H_0^{(1)}(k\rho)$ and $g_1(\rho, \rho') = i/4 H_0^{(1)}(k_1\rho)$ are the 2D free space Green's functions in the background and in the scatterer, respectively. The wavenumbers are $$k = \frac{\omega}{c}\sqrt{\varepsilon_{rb}}, \text{ and } k_1 = \frac{\omega}{c}\sqrt{\varepsilon_{rp}}$$

in the background and in the scatterer, respectively, where $\omega$ is the angular frequency and c is the speed of light.

Applying the Bloch wave condition to Eq. (1a), the surface integral to be over $S_{00}$ of the (0,0) cell. If $\bar{\rho}$ is inside any scatterer, then $$\int_{S_{00}} dl' [\psi(\bar{\rho}')\hat{n}' \cdot \nabla' g_P(k, \bar{k}_i; \bar{\rho}, \bar{\rho}') - g_P(k, \bar{k}_i; \bar{\rho}, \bar{\rho}')\hat{n}' \cdot \nabla' \psi(\bar{\rho}')] = 0 \quad (2a)$$

where $g_1(k, \bar{k}_i; \rho, \rho')$ is the periodic Green's function of the background and $\bar{k}_i$ is a point in the first Brillouin zone. In the KKR method, the integral equations in Eqs. (2a) and (1b) are used to calculate the band solutions meaning that the background Green's function is periodic while the scatterer Green's function is the free space Green's function. Instead of using (1b), periodic Green's function is also used for the scatterer and using extinction theorem, it can be shown that $$-\int_{S_{00}} dl' [\psi_1(\bar{\rho}')\hat{n}' \cdot \nabla' g_{1P}(k_1, \bar{k}_i; \bar{\rho}, \bar{\rho}') - g_{1P}(k_1, \bar{k}_i; \bar{\rho}, \bar{\rho}')\hat{n}' \cdot \nabla' \psi_1(\bar{\rho}')] = 0 \quad (2b)$$

if $\bar{\rho} \notin \cup A_{pq}$, i.e. $\bar{\rho}$ is in the background region. In (2b) $g_{1P}(k_1, \bar{k}_i; \bar{\rho}, \bar{\rho}')$ is the periodic Green's function of the scatterer. Thus, in the BBGFL formulations, result in periodic Green's functions for both integral equations. An interpretation is that the periodic Green's function is for an empty lattice, so that one can uses both $g_P$ and $g_{1P}$.

Let $\bar{k}_i$ be a wavevector in the first irreducible Brillouin zone $\bar{k}_i = \beta_1 \bar{b}_1 + \beta_2 \bar{b}_2$, $0 \leq \beta_1 \beta_2 \leq \frac{1}{2}$. $\bar{b}_1$ and $\bar{b}_2$ are the reciprocal lattice vectors $$\bar{b}_1 = 2\pi \frac{\bar{a}_2 \times \hat{z}}{\Omega_0}, \bar{b}_2 = 2\pi \frac{\hat{z} \times \bar{a}_1}{\Omega_0}.$$

Then in the spectral domain the periodic Green's functions for, respectively, background and scatterer are $$g_P(k, \bar{k}_i; \bar{\rho}, \bar{\rho}') = \frac{1}{\Omega_0} \sum_{mn} \frac{\exp(i\bar{k}_{imn} \cdot (\bar{\rho} - \bar{\rho}'))}{|\bar{k}_{imn}|^2 - k^2} \quad (3a)$$

$$g_{1P}(k_1, \bar{k}_i; \bar{\rho}, \bar{\rho}') = \frac{1}{\Omega_0} \sum_{mn} \frac{\exp(i\bar{k}_{imn} \cdot (\bar{\rho} - \bar{\rho}'))}{|\bar{k}_{imn}|^2 - k_1^2} \quad (3b)$$

where $R_{pq} = p\bar{a}_1 + q\bar{a}_2$, and $\bar{k}_{imn} = \bar{k}_i + m\bar{b}_1 + n\bar{b}_2$. $\bar{k}_{imn}$ is denoted by $\bar{k}_{i\alpha}$, where $\alpha$ is the short hand for the double index (m, n), of the Floquet mode.

The surface unknowns are $\psi(\bar{\rho}')$ and $\psi_1(\bar{\rho}')$, $\hat{n}' \cdot \nabla \psi(\bar{\rho}')$ and $\hat{n}' \cdot \nabla' \psi_1(\bar{\rho}')$. There are boundary conditions for the TM case and the TE case giving a net of two surface unknowns $\psi(\rho')$ and $\hat{n}' \cdot \nabla' \psi(\bar{\rho}')$. Let $\rho$ approach the boundary of $S_{00}$, the coupled surface integral equations in $\psi(\rho')$ and $\hat{n}' \cdot \nabla' \psi(\rho')$ are given as follows, $$\int_{S_{00}} dl' [\psi(\bar{\rho}')\hat{n}' \cdot \nabla' g_P(k, \bar{k}_i; \bar{\rho}, \bar{\rho}') - g_P(k, \bar{k}_i; \bar{\rho}, \bar{\rho}')\hat{n}' \cdot \nabla' \psi(\bar{\rho}')] = \quad (4a)$$

$$0, \bar{\rho} \to S_{00}^-$$

$$-\int_{S_{00}} dl' \left[ \psi(\bar{\rho}')\hat{n}' \cdot \nabla' g_{1P}(k_1, \bar{k}_i; \bar{\rho}, \bar{\rho}') - g_{1P}(k_1, \bar{k}_i; \bar{\rho}, \bar{\rho}') \frac{1}{s} \hat{n}' \cdot \nabla' \psi(\bar{\rho}') \right] = \quad (4b)$$

$$0, \bar{\rho} \to S_{00}^+$$

where $S_{00}^+$ and $S_{00}^-$ denote approaching from the outside and inside of $S_{00}$, respectively. In Eqs. (4a) and (4b) s=1 for TMz polarization and $$S = \frac{\varepsilon_{rb}}{\varepsilon_{rp}}$$

for TEz polarization.

Applying MoM with pulse basis functions and point matching, discretize $S_{00}$ into N patches. In matrix form, resulting in $$\bar{\bar{S}} \bar{p} - \bar{\bar{L}} \bar{q} = 0 \quad (5a)$$

$$\bar{\bar{S}}^{(1)} \bar{p} - \frac{1}{s} \bar{\bar{L}}^{(1)} \bar{q} = 0 \quad (5b)$$

where $\bar{S}$, $\bar{L}$, $\bar{S}^{(1)}$ and $\bar{L}^{(1)}$ are N×N matrices; and $\bar{p}$ and $\bar{q}$ are N×1 column vectors. Let m, n=1,2, . . . , N. The matrix elements are $$S_{mn} = \frac{1}{\Delta t_n} \int_{S_{00}^{(n)}} dl' \hat{n}' \cdot \nabla' g_P(k, \bar{k}_i; \bar{\rho}, \bar{\rho}'), \bar{\rho} \to \bar{\rho}_m^- \quad (6a)$$

$$L_{mn} = \frac{1}{\Delta t_n} \int_{S_{00}^{(n)}} dl' g_P(k, \bar{k}_i; \bar{\rho}_m, \bar{\rho}') \quad (6b)$$

$$S_{mn}^{(1)} = \frac{1}{\Delta t_n} \int_{S_{00}^{(n)}} dl' \hat{n}' \cdot \nabla' g_{1P}(k_1, \bar{k}_i; \bar{\rho}, \bar{\rho}'), \bar{\rho} \to \bar{\rho}_m^+ \quad (6c)$$

$$L_{mn}^{(1)} = \frac{1}{\Delta t_n} \int_{S_{00}^{(n)}} dl' g_{1P}(k_1, \bar{k}_i; \bar{\rho}_m, \bar{\rho}') \quad (6d)$$

$$p_n = \Delta t_n \psi(\bar{\rho}_n) \quad (7a)$$

$$q_n = \Delta t_n [\hat{n} \cdot \nabla \psi(\bar{\rho})]_{\bar{\rho}=\bar{\rho}_n} \quad (7b)$$

where $\bar{\rho}_n$ is the center and $\Delta t_n$ the arc length of the n-th patch $S_{00}^{(n)}$. $\bar{\rho} \to \bar{\rho}_m^-$ and $\bar{\rho} \to \bar{\rho}_m^+$ means $\bar{\rho}$ approaches $\bar{\rho}_m$ from inside and outside of $S_{00}$, respectively.

3. BBGFL in Surface Integral Equations

One goal is to find the wavenumbers that satisfy both the surface integral equations in Eq. (4). These wavenumbers are the band solutions, and the corresponding surface field $\psi$ and $\hat{n} \cdot \nabla \psi$ are the modal currents. This is an eigenvalue problem. The technique of BBGFL is described below.

3.1. Low Wavenumber Extraction in the Broadband Periodic Green's Function

In the BBGFL method, choose a single low wavenumber $k_L$, which is quite arbitrary, to decompose $g_P(k, \bar{k}_i, \bar{\rho}, \bar{\rho}')$ into $g_P(k_L, \bar{k}_i, \bar{\rho}, \bar{\rho}')$ and the difference $g_B(k, k_L, \bar{k}_i, \bar{\rho}, \bar{\rho}')$. They shall be labelled as the low wavenumber part and the broadband part, respectively.

$$g_P(k, \bar{k}_i, \bar{\rho}, \bar{\rho}') = g_P(k_L, \bar{k}_i, \bar{\rho}, \bar{\rho}') + G_B(k, k_L, \bar{k}_i, \bar{\rho}, \bar{\rho}') \quad (8a)$$

Using the spectral domain of $g_P(k_L, \bar{k}_i, \bar{\rho}, \bar{\rho}')$ from (3a), results in $$g_B(k, k_L, \bar{k}_i, \bar{\rho}, \bar{\rho}') = \frac{k^2 - k_L^2}{\Omega_0} \sum_\alpha \frac{\exp(i\bar{k}_{i\alpha} \cdot (\bar{\rho} - \bar{\rho}'))}{(|\bar{k}_{i\alpha}|^2 - k^2)(|\bar{k}_{i\alpha}|^2 - k_L^2)} \quad (8b)$$

Note that $g_P(k_L, \bar{k}_i, \bar{\rho}, \bar{\rho}')$ is independent of wavenumber k, and the series in $g_B(k, k_L, \bar{k}_i, \bar{\rho}, \bar{\rho}')$ converges as $|k_{i\alpha}|^{-4}$ instead of $|k_{i\alpha}|^{-2}$. For the case of dielectric scatterer, also decompose the periodic Green's function of the scatterer $g_{1P}(k, \bar{k}_i, \bar{\rho}, \bar{\rho}')$ into a low wavenumber part $g_{1P}(k_{1L}, \bar{k}_i, \bar{\rho}, \bar{\rho}')$ with $K_1 L$ and a broadband part $g_{1B}(k, k_L, \bar{k}_i, \bar{\rho}, \bar{\rho}')$ $$g_{1P}(k_1, \bar{k}_i, \bar{\rho}, \bar{\rho}') = g_{1P}(k_{1L}, \bar{k}_i, \bar{\rho}, \bar{\rho}') + g_{1B}(k_1, k_{1L}, \bar{k}_i, \bar{\rho}, \bar{\rho}') \quad (8c)$$

$$g_{1B}(k_1, k_{1L}, \bar{k}_i, \bar{\rho}, \bar{\rho}') = \frac{k_1^2 - k_{1L}^2}{\Omega_0} \sum_\alpha \frac{\exp(i\bar{k}_{i\alpha} \cdot (\bar{\rho} - \bar{\rho}'))}{(|\bar{k}_{i\alpha}|^2 - k_1^2)(|\bar{k}_{i\alpha}|^2 - k_{1L}^2)} \quad (8d)$$

Next express $g_B$ in the following form $$g_B(k, k_L, \bar{k}_i, \bar{\rho}, \bar{\rho}') = \frac{1}{\Omega_0} \sum_\alpha \frac{1}{\frac{1}{k^2 - k_L^2} - \frac{1}{|\bar{k}_{i\alpha}|^2 - k_L^2}} \quad (8e)$$

-continued $$\frac{\exp(i\bar{k}_{i\alpha} \cdot (\bar{\rho} - \bar{\rho}'))}{(|\bar{k}_{i\alpha}|^2 - k_L^2)^2}$$

$$= \sum_\alpha R_\alpha(k_L, \bar{\rho}) W_\alpha(k, k_L) R_\alpha^*(k_L, \bar{\rho}') \quad (8f)$$

Where $$R_\alpha(k_L, \bar{\rho}) = \frac{1}{\sqrt{\Omega_0}} \frac{\exp(i\bar{k}_{i\alpha} \cdot \bar{\rho})}{|\bar{k}_{i\alpha}|^2 - k_L^2} \quad (9a)$$

$$W_\alpha(k, k_L) = \frac{1}{\lambda(k, k_L) - D_\alpha(k_L)} \quad (9b)$$

$$\lambda(k, k_L) = \frac{1}{k^2 - k_L^2} \quad (9c)$$

$$D_\alpha(k_L) = \frac{1}{|\bar{k}_{i\alpha}|^2 - k_L^2} \quad (9d)$$

It follows that $$\hat{n}' \cdot \nabla' g_B(k, k_L, \bar{k}_i, \bar{\rho}, \bar{\rho}') = \sum_\alpha R_\alpha(k_L, \bar{\rho}) W_\alpha(k, k_L) Q_\alpha^*(k_L, \bar{\rho}') \quad (10)$$

where $$Q_\alpha(k_L, \bar{\rho}) = \hat{n} \cdot \nabla R_\alpha(k_L, \bar{\rho}) = [\hat{n} \cdot (i\bar{k}_{i\alpha})] R_\alpha(k_L, \bar{\rho}) \quad (11)$$

Both $g_B$ and $\hat{n}' \cdot \nabla g_B$ are smooth for arbitrary $\bar{\rho} - \bar{\rho}'$ and they converge everywhere including the self-point of $\bar{\rho} = \bar{\rho}'$. Because of fast convergence, it is possible to truncate the series with M Floquet modes. Note the two dimensional index in $\alpha$. (In one numerical implementation, each index is from −10 to 10, so that M=(21)²=441.)

With the decomposition $g_P(k_L, \bar{k}_i, \bar{\rho}, \bar{\rho}') + g_B(k, k_L, \bar{k}_i, \bar{\rho}, \bar{\rho}')$, the matrices $\bar{S}$ and $\bar{L}$ (Eq. 6) are also in two parts, which are the low wavenumber part and the broadband part $$\bar{S}(k) = \bar{S}(k_L) + \bar{R}(k_L) \bar{W}(k_L, k) \bar{Q}^\dagger(k_L) \quad (12a)$$

$$\bar{L}(k) = \bar{L}(k_L) + \bar{R}(k_L) \bar{W}(k_L, k) \bar{R}^\dagger(k_L) \quad (12b)$$

$\bar{R}$ and $\bar{Q}$ are N×M matrices. The superscript † means Hermitian adjoint. The matrices $\bar{S}(k_L)$, $\bar{L}(k_L)$, $\bar{R}(k_L)$, and $\bar{Q}(k_L)$ do not have wavenumber dependence. The only wavenumber dependence lies in the factor $\lambda(k, k_L)$ of the M×M diagonal matrix $\bar{W}(k_L, k)$ $$\bar{W}(k_L, k) = (\lambda(k, k_L) \bar{I} - \bar{D}(k_L))^{-1} \quad (13a)$$

where $\bar{I}$ is the M×M identity matrix and $\bar{D}$ is the M×M diagonal matrix, $$D_{\alpha\alpha} = D_\alpha(k_L) \quad (13b)$$

With the low wavenumber separation in $\bar{S}$ and $\bar{L}$, the matrix form of the surface integral equation Eq. (5a) becomes $$\bar{S}(k_L)\bar{p} - \bar{L}(k_L)\bar{q} + \bar{R}(k_L)\bar{W}(k_L, k)\bar{Q}^\dagger(k_L)\bar{p} - \bar{R}(k_L)\bar{W}(k_L, k)$$
$$\bar{R}^\dagger(k_L)\bar{q} = 0 \quad (14a)$$

Using the surface integral equations with periodic Green's functions of the scatterer $g_{1P}(k_1, \bar{k}_i; \bar{\rho}, \bar{\rho}')$ which is also decomposed into a low wavenumber part and a broadband part, from Eq. (5b)

$$\overline{S}^{(1)}(k_{1L})\overline{p} - \frac{1}{s}\overline{L}^{(1)}(k_{1L})\overline{q} + \overline{R}^{(1)}(k_{1L})\overline{W}^{(1)}(k_{1L},k_1)\overline{Q}^{(1)\dagger}(k_{1L})\overline{p} - \qquad (14b)$$

$$\frac{1}{s}\overline{R}^{(1)}(k_{1L})\overline{W}^{(1)}(k_{1L},k_1)\overline{R}^{(1)\dagger}(k_{1L})\overline{q} = 0$$

where $\overline{S}^{(1)}, \overline{L}^{(1)}, \overline{R}^{(1)}, \overline{Q}^{(1)}, \overline{D}^{(1)}$ and $\overline{W}^{(1)}$ have the same form of $\overline{S}, \overline{L}, \overline{R}, \overline{Q}, \overline{D}$ and $\overline{W}$, respectively, by changing $k$ to $k_1$, and $k_L$ to $k_{1L}$.

Also choosing $$k_{1L} = K_L \sqrt{\varepsilon_r} \qquad (15a)$$

where $\varepsilon_r = \varepsilon_{rp}/\varepsilon_{rb}$. Then $$\lambda(k_1, k_{1L}) = \frac{1}{\varepsilon_r}\lambda(k, k_L) \qquad (15b)$$

$$\overline{W}^{(1)}(k_{1L}, k_1) = \left(\frac{1}{\varepsilon_r}\lambda(k, k_L)\overline{I} - \overline{D}^{(1)}(k_L)\right)^{-1} \qquad (15c)$$

Sub-section 7 describes efficient methods for calculating the matrix elements of $\overline{S}, \overline{L}, \overline{S}^{(1)}$, and $\overline{L}^{(1)}$, at low wavenumbers of $k_L$ and $k_{1L}$.

3.2. Eigenvalue Problem

Next convert the matrix equation Eq. (14) into an eigenvalue problem. Let $$\overline{b} = \overline{W}\overline{R}^\dagger \overline{q} \qquad (16a)$$

$$\overline{c} = \overline{W}\overline{Q}^\dagger \overline{p} \qquad (16b)$$

$$\overline{b}^{(1)} = \overline{W}^{(1)}\overline{R}^{(1)\dagger}\overline{q} \qquad (16c)$$

$$\overline{c}^{(1)} = \overline{W}^{(1)}\overline{Q}^{(1)\dagger}\overline{p} \qquad (16d)$$

Then from Eq. (13a)

$$\overline{W}^{-1}\overline{b} = (\lambda \overline{I} - \overline{D})\overline{b} = \overline{R}^\dagger \overline{q} \qquad (17a)$$

$$\overline{W}^{-1}\overline{c} = (\lambda \overline{I} - \overline{D})\overline{c} = \overline{Q}^\dagger \overline{p} \qquad (17b)$$

Thus $$\lambda \overline{b} = \overline{D}\overline{b} + \overline{R}^\dagger \overline{q} \qquad (18a)$$

$$\lambda \overline{c} = \overline{D}\overline{c} + \overline{Q}^\dagger \overline{p} \qquad (18b)$$

Similarly, with Eq. (16c-d, 15c)

$$\lambda \overline{b}^{(1)} = \varepsilon_r \overline{D}^{(1)}\overline{b}^{(1)} + \varepsilon_r \overline{R}^{(1)\dagger}\overline{q} \qquad (18c)$$

$$\lambda \overline{c}^{(1)} = \varepsilon_r \overline{D}^{(1)}\overline{c}^{(1)} + \varepsilon_r \overline{Q}^{(1)\dagger}\overline{p} \qquad (18d)$$

Next, using the definitions of $\overline{b}, \overline{c}, \overline{b}^{(1)}, \overline{c}^{(1)}$, the matrix equation Eq. (14) becomes, $$\overline{S}\overline{p} - \overline{L}\overline{q} + \overline{R}\overline{c} - \overline{R}\overline{b} = 0 \qquad (19a)$$

$$\overline{S}^{(1)}\overline{p} - \frac{1}{s}\overline{L}^{(1)}\overline{q} + \overline{R}^{(1)}\overline{c}^{(1)} - \frac{1}{s}\overline{R}^{(1)}\overline{b}^{(1)} = 0 \qquad (19b)$$

Next express $\overline{p}, \overline{q}$ in $\overline{b}, \overline{c}, \overline{b}^{(1)}, \overline{c}^{(1)}$, $$\begin{bmatrix} \overline{p} \\ \overline{q} \end{bmatrix} = \overline{\overline{A}} \begin{bmatrix} \overline{b} \\ \overline{c} \\ \overline{b}^{(1)} \\ \overline{c}^{(1)} \end{bmatrix} \qquad (20)$$

where $$\overline{\overline{A}} \triangleq \begin{bmatrix} \overline{S} & -\overline{L} \\ \overline{S}^{(1)} & -\frac{1}{s}\overline{L}^{(1)} \end{bmatrix}^{-1} \begin{bmatrix} \overline{R} & -\overline{R} & \overline{O} & \overline{O} \\ \overline{O} & \overline{O} & \frac{1}{s}\overline{R}^{(1)} & -\overline{R}^{(1)} \end{bmatrix} \qquad (21)$$

where the $\overline{O}$'s are matrices zero elements with appropriate dimensions. Eliminating $\overline{p}$ and $\overline{q}$ using Eq. (18) and (20), results in the eigenvalue problem, $$\overline{P}\overline{x} = \lambda \overline{x} \qquad (22)$$

where $$\overline{P} = \begin{bmatrix} \overline{D} & \overline{O} & \overline{O} & \overline{O} \\ \overline{O} & \overline{D} & \overline{O} & \overline{O} \\ \overline{O} & \overline{O} & \varepsilon_r \overline{D}^{(1)} & \overline{O} \\ \overline{O} & \overline{O} & \overline{O} & \varepsilon_r \overline{D}^{(1)} \end{bmatrix} + \begin{bmatrix} \overline{O} & \overline{R}^\dagger \\ \overline{Q}^\dagger & \overline{O} \\ \overline{O} & \varepsilon_r \overline{R}^{(1)\dagger} \\ \varepsilon_r \overline{Q}^{(1)\dagger} & \overline{O} \end{bmatrix} \overline{\overline{A}} \qquad (23a)$$

$$\overline{x} = [\overline{b}^T \ \overline{c}^T \ \overline{b}^{(1)T} \ \overline{c}^{(1)T}]^T \qquad (23b)$$

The matrix dimension of the eigenvalue problem in (23a) is 4M×4M. In the above equation, only $\lambda$ depends on wavenumber while all the other matrices are independent of wavenumber. Thus the eigenvalue problem is linear with all the eigenvalues and eigenvectors solved simultaneously giving the multi-band solutions.

Knowing the eigenvalues, the mode wavenumbers $k^2$ are obtained from the relation of $$\lambda = \frac{1}{k^2 - k_L^2}, \qquad \text{(Eq. (9c))}.$$

The modal surface currents distributions $\overline{p}$ and $\overline{q}$ are calculated from the eigenvectors through Eq. (20). Knowing $\overline{p}$ and $\overline{q}$, the modal field distribution $\psi$ and'$_1$ can also be computed everywhere in the lattice by Eq. (2). The authenticity of the eigenmodes can also be checked by the extinction theorem (Eq. (2)) away from the boundaries.

4. Numerical Results

Triangular lattices with lattice constant a as shown in FIG. 17A is considered. The dielectric background has permittivity $\varepsilon_b$, and the scatterers are circular air voids of radius b drilled in the background with $\varepsilon_p = \varepsilon_0$, where $\varepsilon_0$ is the free space permittivity. Consider two cases with case 1 b=0.2a, $\varepsilon_b = 8.9\varepsilon_0$ and filling ratio of 14.5% and case 2 of b=0.48a, $\varepsilon_b = 12.25\varepsilon_0$ and filling ratio of 83.6%. The solutions using BBGFL method are calculated. The solutions using the plane wave method and the KKR method are calculated and the results of BBGFL compared with these two methods.

Sub-section 7 describes the calculations of $g_P$ and $g_{1P}$ at the respective single low wavenumbers of $k_L$ and $k_{1L}$ that includes the calculations of $D_n$. The lattice vectors are given by $$\bar{a}_1 = \frac{a}{2}(\sqrt{3}\,\hat{x} + \hat{y})$$

$$\bar{a}_2 = \frac{a}{2}(-\sqrt{3}\,\hat{x} + \hat{y})$$

and the reciprocal lattice vectors are $$\bar{b}_1 = 2\pi/a(1/\sqrt{3}\,\hat{x}+\hat{y})$$

$$\bar{b}_2 = 2\pi/a(-1/\sqrt{3}\,\hat{x}+\hat{y})$$

The Γ, M, and K points are $$\Gamma: \bar{k}_i = 0\bar{b}_1 + 0\bar{b}_2 = 0$$

$$M: \bar{k}_i = \frac{1}{2}\bar{b}_1 + 0\bar{b}_2 = \frac{\pi}{a}\left(\frac{1}{\sqrt{3}}\hat{x}+\hat{y}\right)$$

$$K: \bar{k}_i = \frac{1}{3}\bar{b}_1 + \frac{1}{3}\bar{b}_2 = \frac{4\pi}{3a}\hat{y}$$

Plotting the band solutions with $\bar{k}_i = \beta_1 \bar{b}_1 + \beta_2 \bar{b}_2$ following Γ→M→K→Γ. The normalized frequency $f_N(k)$ is defined as $$f_N(k) = \frac{ka}{2\pi}\sqrt{\frac{\varepsilon_0}{\varepsilon_b}}$$

In the following computations, choose the low wavenumber $k_L$ such that $f_N(k_L)=0.2$. The choice of $k_L$ is quite arbitrary as $k_L$ values in a range will work. This makes BBGFL method robust. In the examples, the maximum number of two-dimensional (2D) Bloch waves in BBGFL is 441 corresponding to $-10 \leq m, n \leq 10$, so that the highest m, n index is 10. This leads to an eigenvalue problem of maximum dimension 4M=1764.

Case 1: b=0.2a, $\varepsilon_b=8.9\varepsilon_0$, $\pi b^2/\Omega_0=14.5\%$

Figure 17B:
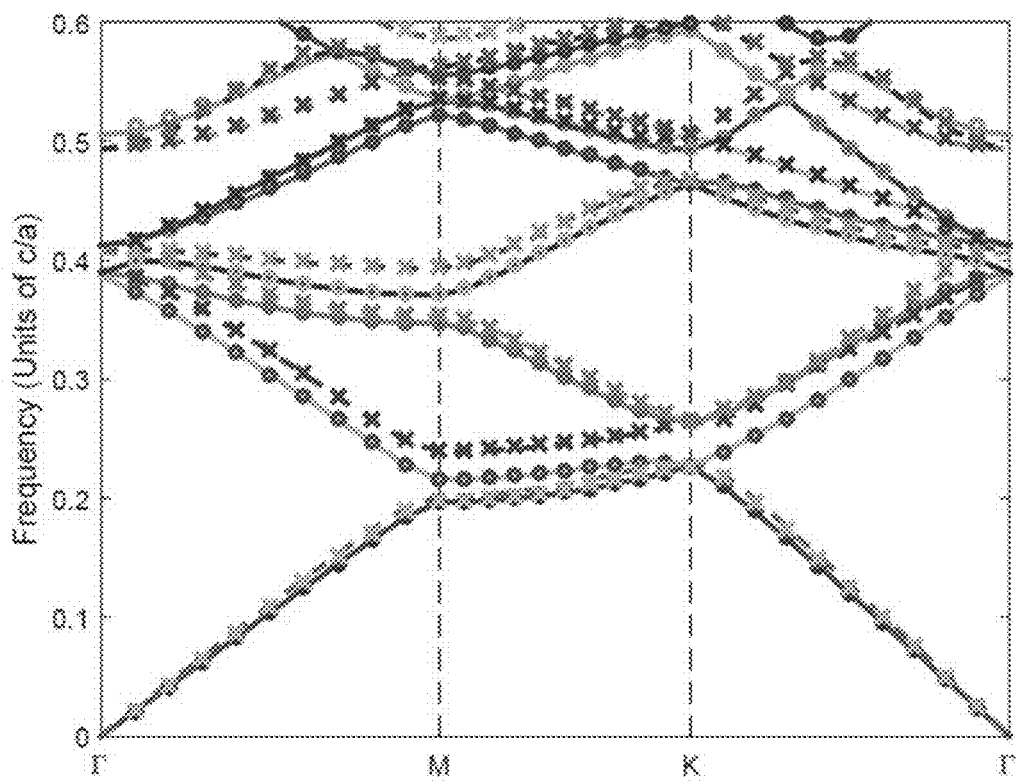

The band diagram is plotted in FIG. 17B, with MoM discretization N=80, and $D_n$ (as defined in Eq. (27)) at order 4 to compute $g_P$ and $\hat{n}'\cdot\nabla g_P$ at the single low wavenumber $k_L$. FIG. 17B shows band diagram of the hexagonal structure with background dielectric constant of 8.9 and air voids of radius b=0.2a. The results of BBGFL are shown by the solid curves for TMz polarization and by the dashed curves for the TEz polarization. The circles and crosses are the results of planewave method for the TMz and TEz polarizations, respectively.

Figure 17C:
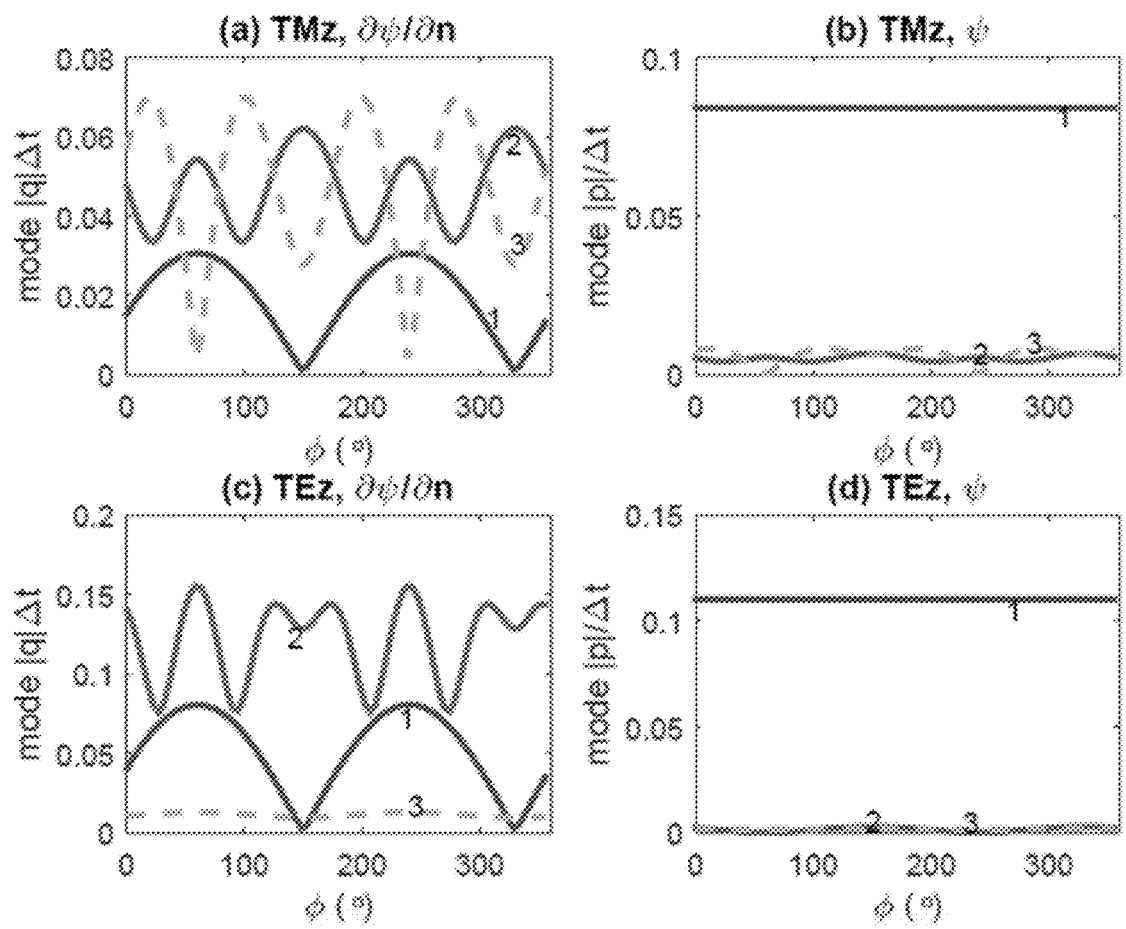

Compute solutions using the plane wave method with 1681 Bloch waves. In this example, 441 Bloch waves are used in the BBGFL method. The agreements between the two methods are excellent. In FIG. 17C, the surface modal currents, unnormalized, are plotted for the first few modes near Γ point with $\bar{k}_i=0.05\bar{b}_1$. FIG. 17C shows modal surface currents distribution near Γ point at $\bar{k}_i=0.05\bar{b}_1$ corresponding to the first few modes of the hexagonal structure with background dielectric constant of 8.9 and air voids of radius b=0.2a. (a) TMz, surface electric current $J_z \propto \partial\psi/\partial n$ s; (b) TMz, surface magnetic current $M_t \propto \psi$; (c) TEz, surface magnetic currents $M_z \propto \partial\psi/\partial n$; (d) TEz, surface electric current $J_t \propto \psi$. The corresponding normalized mode frequencies are 1:0.0208, 2:0.3736, 3:0.3864 for TMz wave, and 1:0.02224, 2:0.3847, 3:0.404 for TEz wave, respectively.

In Table 1, the convergence of the lowest mode with respect to the number of Bloch waves used in BBGFL using different low wavenumber $k_L$ are tabulated for TMz polarization with $\bar{k}_i=0.05\bar{b}_1$, where 0.020798 is the first band solution. It is noted that the choice of $k_L$ is robust, and fewer Floquet modes are needed as one chooses a lower $k_L$.

TABLE 1

| $f_N$ | M = 9 | M = 49 | M = 121 | M = 441 |
|---|---|---|---|---|
| $f_N(k_L) = 0.001$ | 0.020798 | 0.020798 | 0.020798 | 0.020798 |
| $f_N(k_L) = 0.1$ | 0.020780 | 0.020798 | 0.020798 | 0.020798 |
| $f_N(k_L) = 0.2$ | 0.020806 | 0.020797 | 0.020797 | 0.020798 |
| $f_N(k_L) = 0.5$ | 0.020888 | 0.020792 | 0.020794 | 0.020798 |

Case 2: b=0.48a, $\varepsilon_b=12.25\varepsilon_0$, $\pi b^2/\Omega_0=83.6\%$

Figure 17D:
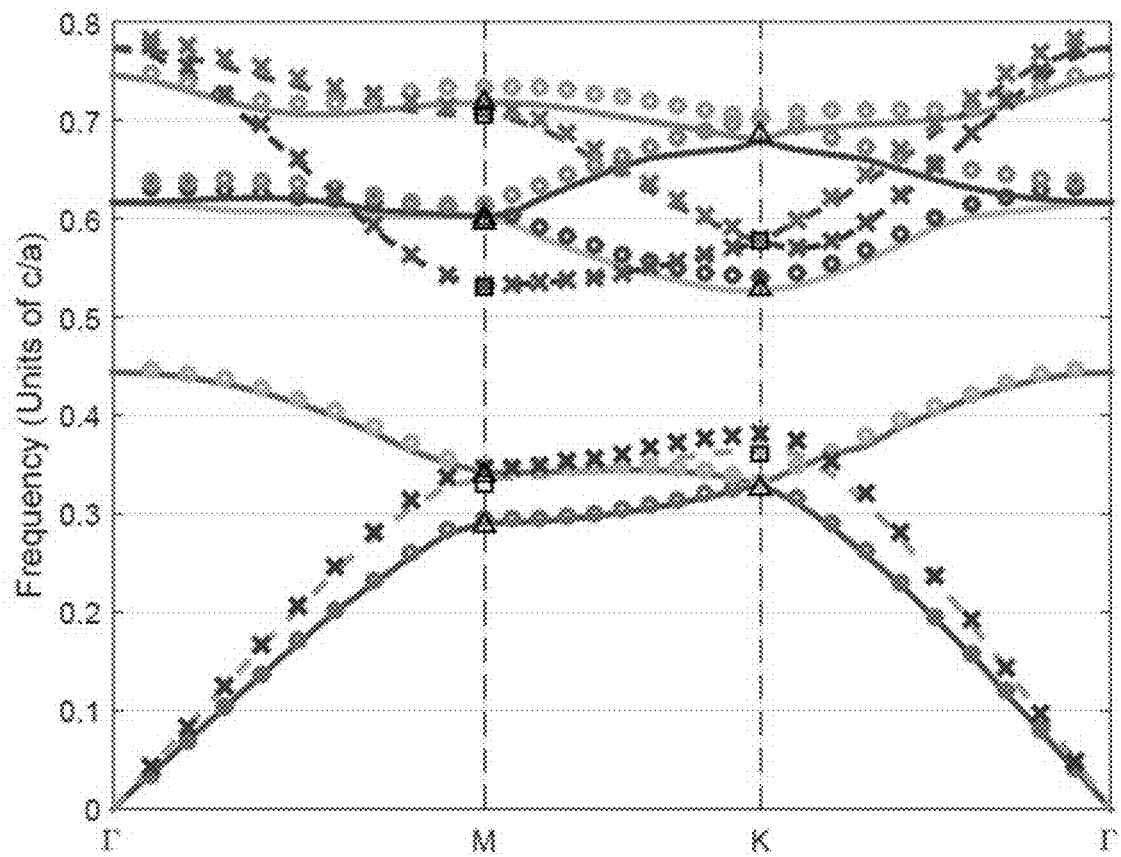

The parameters for this case are the same as in. The area ratio of scatterers to background is high at 83.6%. The dielectric constant ratio of $\varepsilon_b/\varepsilon_p$ is as high as 12.25. In this case, the field varies more rapidly along the perimeter of the scatterer than the previous case and choose the MoM discretization to be N=180, and $D_n$ (as defined in Eq. (27)) is selected at order 8 to compute $g_P$ and $\hat{n}'\cdot\nabla g_P$ at the single low wavenumber $k_L$. The band diagram is plotted in FIG. 17D. FIG. 17D shows band diagram of the hexagonal structure with background dielectric constant of 12.25 and air voids of radius b=0.48a. The results of BBGFL are shown by the solid curves for TMz polarization and by the dashed curves for the TEz polarization. The circles and crosses are the results of planewave method for the TMz and TEz polarizations, respectively. The triangles and squares are the results of the KKR method for the TMz and TEz polarizations, respectively.

Figure 17E:
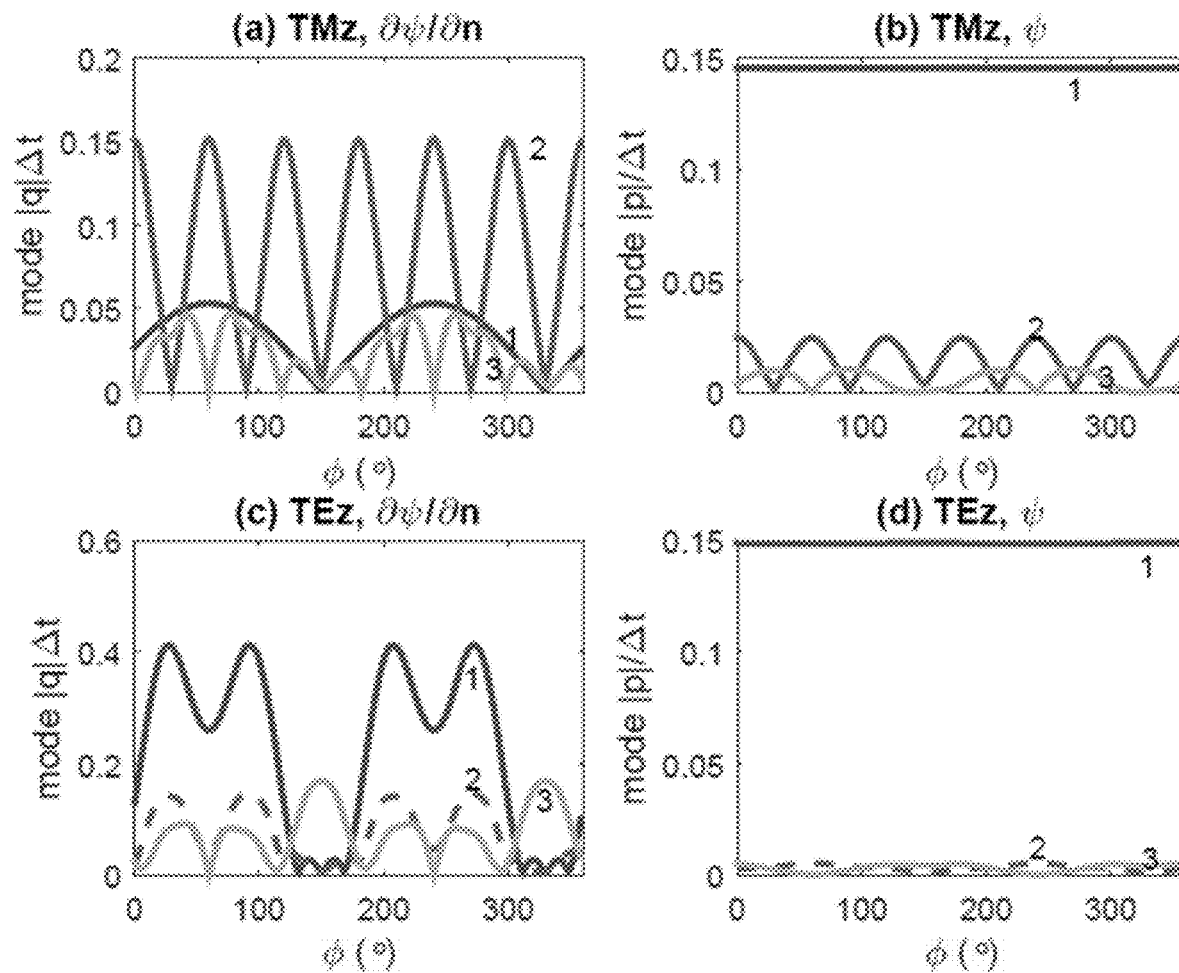

For the planewave method 6561 Bloch waves are used, which is significantly larger than M=441 Floquet modes for BBGFL. The KKR solution of the first few modes at the points of M, and K are also given. The band gap between the third and fourth bands is noted. The agreements between the three methods are in general good. Note that the planewave method predicts slightly larger higher order modes than the BBGFL. The differences decrease as more Bloch waves are included in the planewave expansion. Note that the planewave method results shown are not exactly the same as the results reported in, possibly due to the different treatment of the Fourier series expansion of the dielectric function. Embodiments do not apply any smearing function to the permittivity profile ε(r), and directly compute the Fourier transform of $\varepsilon^{-1}(\bar{r})$. For the KKR method, more terms in the $D_n$ series are needed as frequency increases. In FIG. 17E, the unnormalized surface modal currents are plotted for the first few modes near Γ point with $\bar{k}_i=0.05\bar{b}_1$. The modal currents tend to have more variations as the modal wavenumbers increase. FIG. 17E shows modal surface currents distribution near Γ point at $\bar{k}_i=0.05\bar{b}_1$ corresponding to the first few modes of the hexagonal structure with background dielectric constant of 12.25 and air voids of radius b=0.48a. (a) TMz, surface electric currents $J_z \propto \partial\psi/\partial n$; (b) TMz, surface magnetic current $M_t \propto \psi$; (c) TEz, surface magnetic currents $M_z \propto \partial\psi/\partial n$; (d) TEz, surface electric current $J_t \propto \psi$. The corresponding normalized mode frequencies are 1:0.03437, 2:0.4425, 3:0.6154 for TMz wave, and 1:0.04145, 2:0.7669, 3:0.7710 for TEz wave, respectively.

The eigenvalues of the BBGFL approach include spurious modes. All the spurious modes are quickly rejected based on the following simple calculations. The spurious modes do not satisfy the extinction theorem as given in Eq. (2). If the field inside the scatterers is evaluated using $g_P$, or evaluate the field outside the scatterers using $g_{1P}$, non-zero values result for the spurious modes. These modes can be identified by several points calculations inside or outside the scattering using the surface integrals. Some of the spurious modes do not satisfy one of the two surface integral equations Eq. (4), and for these modes, their modal currents and $\partial \psi / \partial n$ on the boundary are essentially zeros and trivial. For the rest of the spurious modes, they satisfy the surface integral equations Eq. (4), but do not obey the extinction theorem Eq. (2), and these modes are shown to be nearly invariant with respect to $\overline{k}_i$, with values close to the roots of $J_n(kb)$, where $J_n$ is the n-th order Bessel function.

The CPU time is recorded when running the BBGFL code in Mat lab R2014b to compute the band diagram on an HP ProDesk 600 G1 desktop with Intel Core i7-4790 CPU @3.60 GHz and 32 GB RAM. Since the computation for different $\overline{k}_i$ are independent, the CPU time for one $\overline{k}_i$ will be described. For case 2 with the larger N and higher order of $D_n$, it takes a total of ~96 sec to complete the mode analysis at one $\overline{k}_i$, of which ~11 s is spent on the eigenvalue analysis. More than 80% CPU time is spent on computing the matrices $\overline{S}$, $\overline{L}$, $\overline{S}^{(1)}$, and $\overline{L}^{(1)}$ at the single low wavenumbers $k_L$ and $k_{1L}$ respectively for background periodic Green's function and scatterer periodic Green's function. The calculation of $D_n$ (and $D_n^{(1)}$ by changing k to $k_1$) as defined in sub-section 7 to facilitate the computation of $g_P$ and $g_{1P}$ takes ~24 s, and the calculation of the low wavenumber matrices using $D_n$ takes ~27 s on the boundary. Another ~28 s are needed for solutions away from the boundary as needed in checking the extinction theorem. The time recorded is for one polarization, and for the second polarization the added time is very small since only the eigenvalue problem is to be resolved. The approach is much more efficient than the KKR approach, which is based on the evaluation of $D_n$ at every frequency that needed to be used to search the band solution k, with one band at a time. The BBGFL can also be more efficient than the planewave method when the planewave method requires significantly larger number of Bloch waves as in the second case with large dielectric contrast and large filling ratio. Note that for the case of infinite contrast of perfect electric conductor (PEC), the section above shows that BBGFL also works.

5. Low Frequency Dispersion Relations, Effective Permittivity and Propagation Constants In this sub-section, the low frequency dispersion relations is illustrated, which are useful for the design of devices in photonics and metamaterials.

In metamaterials, the scatterers and the lattice spacings are subwavelengths. Effective permittivities and effective propagation constants have been calculated for random media of dielectric mixtures. In random medium, the positions of scatterers are random creating random phase in propagating waves. Every realization has different positions of scatterers although each realization has the same statistics and the field solutions of different realizations are different. The waves are decomposed into coherent waves and incoherent waves. The coherent wave has definite amplitude and phase while the incoherent waves have random amplitudes and phases giving speckle. In low frequency, the coherent waves dominate while at higher frequencies, the incoherent waves dominate. In random medium, the effective permittivity and the effective propagation constant are that of the coherent waves. On the other hand, the geometry in a periodic structure is deterministic with a single solution. The quasistatic method has been used to calculate the effective permittivity of a periodic medium. It is interesting to note that at very low frequency, the effective permittivities as derived for random medium and for periodic medium are the same. In the following, effective permittivity and effective propagation constant with are associated with the low frequency dispersion relation of the lowest band in the vicinity of the Γ point.

Figure 17F:
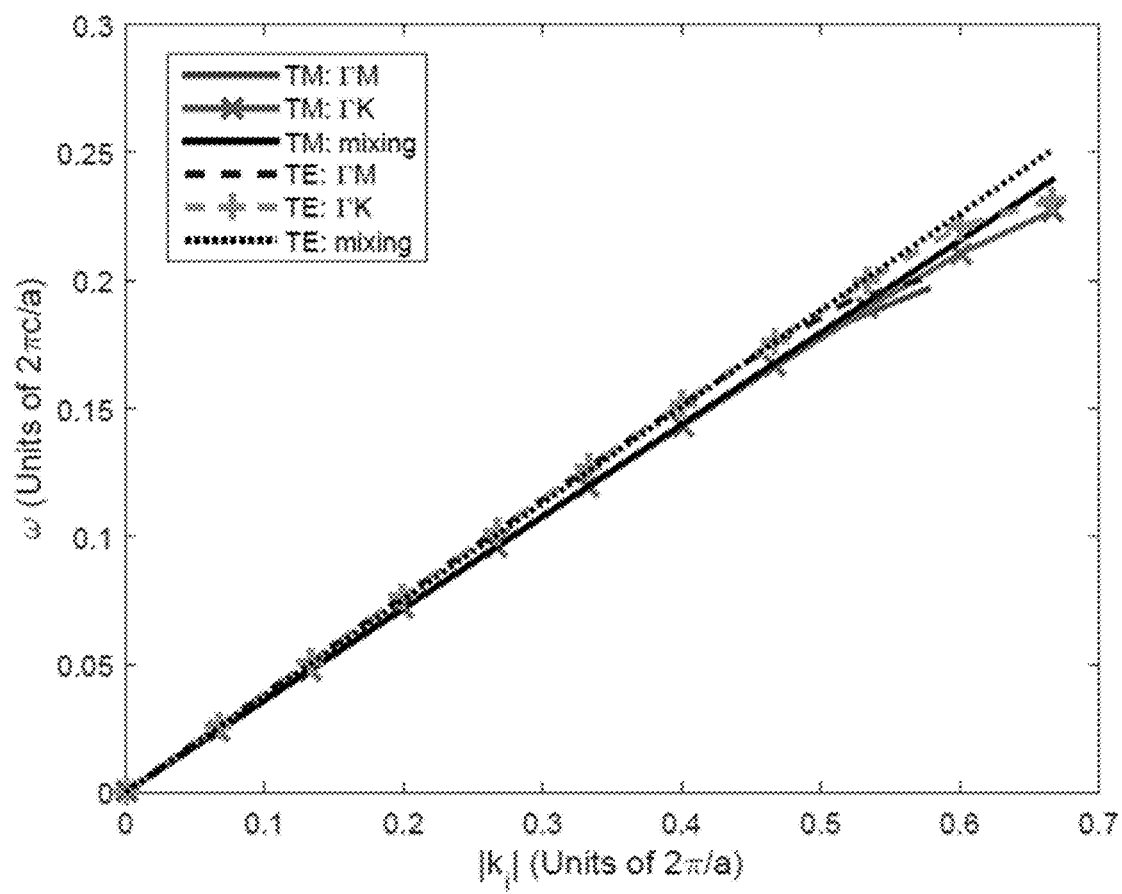
Figure 17G:
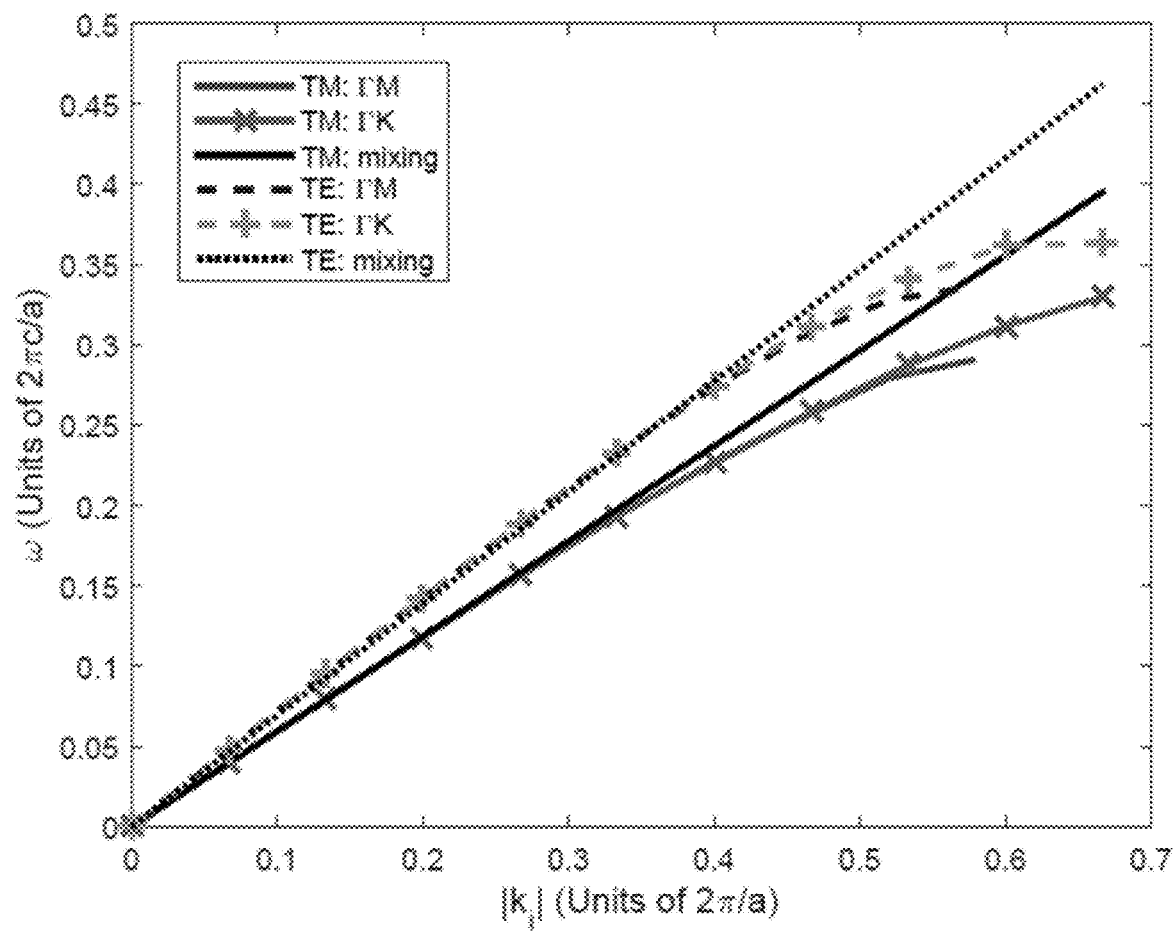

FIGS. 17F and 17G plot the ω-k lowest band near the Γ point for case a and case b, respectively. These will be labeled as low frequency dispersion curves. The dispersion relation curves are plotted for $\overline{k}_i$ moving along the line of ΓM, and along the line of ΓK in the first Brillouin zone, respectively. The points M and K represents the largest anisotropy in the first irreducible Brillouin zone. Sub-section 8 derived the effective permittivity and effective propagation constants. The corresponding dispersion curves are straight lines and are also plotted in FIGS. 17F and 17G. FIG. 17F shows dispersion relationship of the hexagonal structure with background dielectric constant of 8.9 and air voids of radius b=0.2a. FIG. 17G shows dispersion relationship of the hexagonal structure with background dielectric constant of 12.25 and air voids of radius b=0.48a.

The low frequency dispersion relations of the lowest band are close to the effective permittivity curves at low frequency and deviate as $|\overline{k}_i|$ increases. At higher frequencies, towards the M and K points, they show significant departures when $\overline{k}_i$ are close to M and K point. Thus, as frequency increases, the effective propagation constants and effective permittivity are dispersive and anisotropic. The dispersion relations are plotted for both TM polarization and TE polarization. For the same ω, TM wave in general has a slightly larger k. The difference between the two polarization increases as the permittivity contrast and the scatterer filling ratio increases.

Figure 17H:
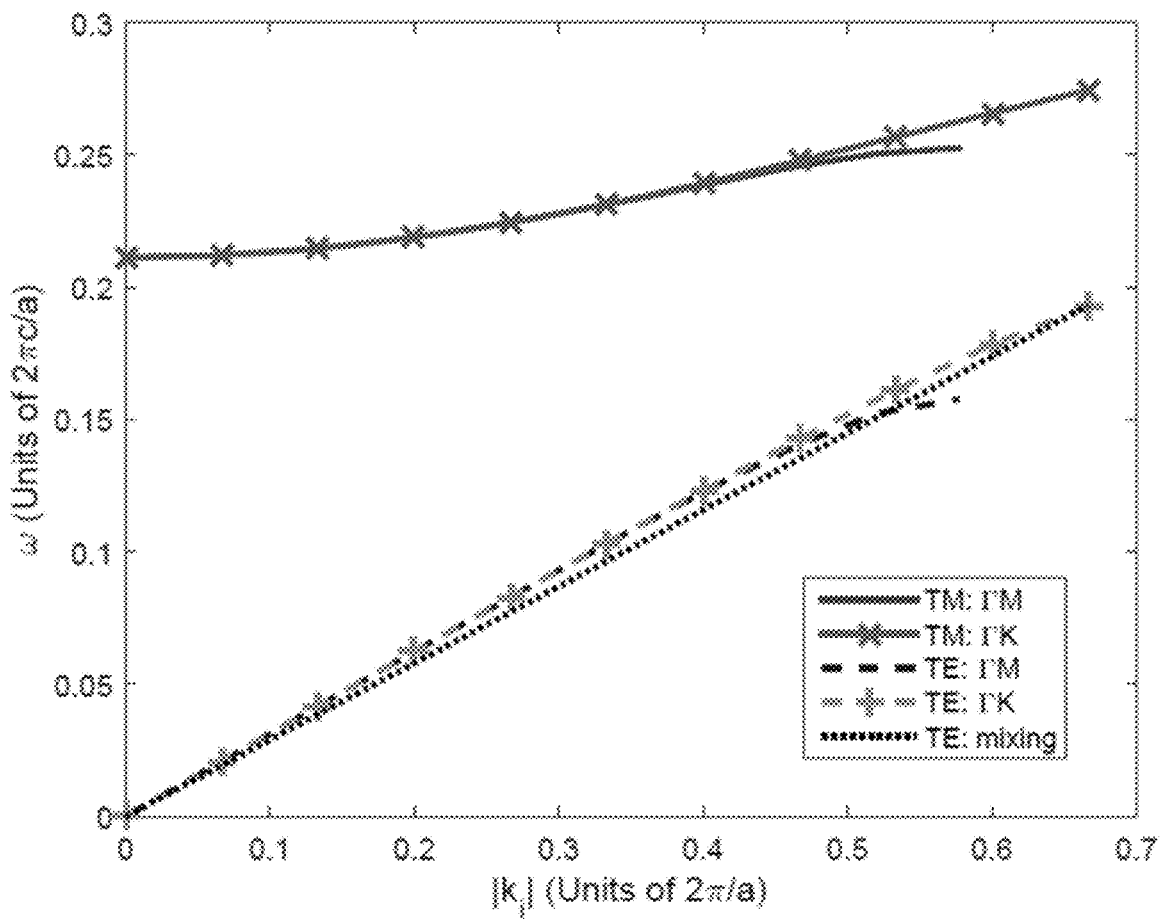

The BBGFL method also works for infinite permittivity contrast as in the case of PEC. FIG. 17H plots the ω-k dispersion relation for the PEC scatterer case, with the PEC cylinder radius b=0.2a, and the background permittivity $\varepsilon_b=8.9\varepsilon_0$. FIG. 17H shows dispersion relationship of the hexagonal structure with background dielectric constant of 8.9 and PEC cylinders of radius b=0.2a. The behavior of the TE wave is similar to that of the dielectric case. But for the TM wave, as indicated by the quasistatic mixing formula that the mixture does not have a finite quasistatic effective permittivity. The ω-k dispersion relation from the lowest band has similar behavior to that of the plasma.

The periodic structure behaves like a plasma for the TM wave that the wave could only propagate when its frequency is larger than the corresponding plasma frequency.

6. Conclusions

Embodiments in this section extend the BBGFL approach described in the previous section, used for Dirichlet boundary conditions, to calculate band solutions and the low frequency dispersion relations of dielectric periodic structures in 2D problem with 2D periodicity. In the BBGFL approach, the dual surface integral equations are solved with MoM using the broadband periodic Green's function of both the background and the scatterer. The Broadband periodic Green's functions are fast convergent because of low wavenumber extraction. Because MoM is applied, the method is applicable to arbitrary scatterer shapes and arbitrary filling ratio and permittivity contrasts. The BBGFL approach has the form of a linear eigenvalue problem. The method is shown to be efficient and accurate. The choice of the low frequency wavenumber has been shown to be robust because MoM is applied. The method, in principle, is applicable to arbitrary scatterer shapes and arbitrary filling ratio and permittivity contrasts.

7. Evaluation of Periodic Green's Function and the Matrix Elements of $\overline{S}$ and $\overline{L}$ at the Single Low Wavenumber Compute $S_{mn}$, $L_{mn}$ and $S_{mn}^{(1)}$, $L_{mn}^{(1)}$ as defined in Eq. (6), at the respective single low wavenumbers of $k_L$ and $k_{1L}$. The spatial and spectral series summations as given in Eq. (3) converge slowly especially when $\overline{\rho} \to \overline{\rho}'$. Thus, to subtract the primary contribution, separating $g_P(k_L, \overline{k}_i; \overline{\rho}, \overline{\rho}')$ into the primary part $g(k; \overline{\rho}, \overline{\rho}')$ and the response part $g_R(k, \overline{k}_i; \overline{\rho}, \overline{\rho}')$.

$$g_P(k, \overline{k}_i; \overline{\rho}) = g(k, \overline{\rho}) + g_R(k, \overline{k}_i; \overline{\rho}) \tag{24}$$

$$g(k, \overline{\rho}) = \frac{i}{4} H_0^{(1)}(k\rho) = \frac{i}{4} J_0(k\rho) - \frac{1}{4} N_0(k\rho) \tag{25}$$

where $J_0(w)$ and $N_0(w)$ are the zeroth order Bessel and Neumann function, respectively. Since there is no singularity in $g_R$, it can be expressed as $$g_R(k, \overline{k}_i; \overline{\rho}) = \sum_{n=-\infty}^{\infty} E_n J_n(k\rho) \exp(in\phi) \tag{26}$$

It follows that $$g_P(k, \overline{k}_i; \overline{\rho}) = -\frac{1}{4} N_0(k\rho) + \sum_{n=-\infty}^{\infty} D_n J_n(k\rho) \exp(in\phi) \tag{27}$$

where $$D_n = E_n + \frac{i}{4} \delta_{n0} \tag{28}$$

and $\delta_{n0}$ is the Kronecker delta function.

Expanding the Bloch wave $\exp(i\overline{k}_{i\alpha} \cdot \overline{\rho})$ into Bessel functions in the spectral domain expression of $g_P$ (Eq. (3)), $$g_P = \frac{1}{\Omega_0} \sum_{\alpha} \frac{1}{|\overline{k}_{i\alpha}|^2 - k^2} \sum_{n} i^n \exp(-in\phi_{i\alpha}) J_n(|\overline{k}_{i\alpha}|\rho) \exp(in\phi) \tag{29}$$

where $\phi_{i\alpha}$ is the polar angle of $\overline{k}_{i\alpha}$, and $\phi$ is the polar angle of $\overline{\rho}$.

Balancing the coefficients of $\exp(in\phi)$ in Eq. (27) and (29), it follows that $$D_n = \frac{1}{J_n(k\rho)} \left[ i^n \frac{1}{\Omega_0} \sum_{\alpha} \frac{\exp(-in\phi_{i\alpha}) J_n(|\overline{k}_{i\alpha}|\rho)}{|\overline{k}_{i\alpha}|^2 - k^2} + \frac{1}{4} N_0(k\rho) \delta_{n0} \right] \tag{30}$$

and for real $k$, $$D_{-n} = D^*_n \tag{31}$$

Note that $\rho$ is arbitrarily chosen in this expression. $\rho$ should avoid the zeros of $J_n(k\rho)$ and not be too close to 0. The number of Floquet modes used in the above expression is much larger than in evaluation of $g_B$ using Eq. (8, 10).

However, the series of $g_R$ in Eq. (26) converges in a few terms, usually $|n| \le 8$ for moderately low wavenumber $k_L$.

For the normal derivative $\hat{n}' \cdot \nabla' g_P(k, \overline{k}_i; \overline{\rho}, \overline{\rho}')$ using Eq. (24-26), results in $$\hat{n}' \cdot \nabla' g_P(k, \overline{k}_i; \overline{\rho}, \overline{\rho}') = \hat{n}' \cdot \nabla' g(k; \overline{\rho}, \overline{\rho}') + \hat{n}' \cdot \nabla' g_R(k, \overline{k}_i; \overline{\rho}, \overline{\rho}') \tag{32}$$

$$\hat{n}' \cdot \nabla' g(k; \overline{\rho}, \overline{\rho}') = \frac{i}{4} k H_1^{(1)}(k|\overline{\rho} - \overline{\rho}'|) \left( \hat{n}' \cdot \frac{\overline{\rho} - \overline{\rho}'}{|\overline{\rho} - \overline{\rho}'|} \right) \tag{33}$$

$$\hat{n}' \cdot \nabla' g_R(k, \overline{k}_i; \overline{\rho}, \overline{\rho}') = \hat{n}' \cdot \nabla' \sum_n E_n J_n(k|\overline{\rho} - \overline{\rho}'|) \exp(in\phi_{\overline{\rho}\overline{\rho}'}) \tag{34}$$

With addition theorem, $$J_n(k|\overline{\rho} - \overline{\rho}'|) \exp(in\phi_{\overline{\rho}\overline{\rho}'}) = \sum_{m=-\infty}^{\infty} J_m(k\rho) J_{m-n}(k\rho') \exp(im\phi - i(m-n)\phi') \tag{35}$$

Eq. (34) is readily evaluated, $$\hat{n}' \cdot \nabla' g_R(k, \overline{k}_i, \overline{\rho} - \overline{\rho}') = \tag{36}$$

$$\sum_n E_n \sum_{m=-\infty}^{\infty} J_m(k\rho) \exp(im\phi) \hat{n}' \cdot \left( \hat{\rho}' k J'_{m-n}(k\rho') + \hat{\phi}' \frac{1}{\rho'} J_{m-n}(k\rho')[-i(m-n)] \right) \exp(-i(m-n)\phi')$$

The summation over $m$ also has fast convergence. In practice, it suffices to use the same upper limit as $n$ of Eq. (26).

Note that $g_R(k, \overline{k}_i, \rho - \rho')$ and $\hat{n}' \cdot \nabla' g_P(k, \overline{k}_i, \overline{\rho} - \overline{\rho}')$ are all smooth functions for arbitrary $\overline{\rho} - \overline{\rho}'$. Using Eqs. (6), (24-26), (32), (33), and (36), $$S_{mn} = S_{mn}^{(P)} + S_{mn}^{(R)} \tag{37a}$$

$$L_{mn} = L_{mn}^{(P)} + L_{mn}^{(R)} \tag{37b}$$

where the superscripts (P) and (R) denote the contribution from the primary and the response part, respectively.

$$S_{mn}^{(P)} = \frac{1}{\Delta t_n} \int_{S_{00}^{(n)}} dl' \hat{n}' \cdot \nabla' g(k, \overline{\rho} - \overline{\rho}'), \overline{\rho} \to \overline{\rho}_m \tag{38a}$$

$$= \begin{cases} -\frac{1}{2\Delta t_n} & n = m \\ [\hat{n}' \cdot \nabla' g(k, \overline{\rho} - \overline{\rho}')]_{\overline{\rho} = \overline{\rho}_m, \overline{\rho}' = \overline{\rho}_n} & n \ne m \end{cases}$$

$$S_{mn}^{(R)} = \frac{1}{\Delta t_n} \int_{S_{00}^{(n)}} dl' \hat{n}' \cdot \nabla' g_R(k, \overline{k}_i, \overline{\rho}_m - \overline{\rho}') \tag{38b}$$

$$= [\hat{n}' \cdot \nabla' g_R(k, \overline{k}_i, \overline{\rho} - \overline{\rho}')]_{\overline{\rho} = \overline{\rho}_m, \overline{\rho}' = \overline{\rho}_n}$$

$$L_{mn}^{(P)} = \frac{1}{\Delta t_n} \int_{S_{00}^{(n)}} dl' g(k, \overline{\rho}_m - \overline{\rho}') \tag{38c}$$

$$= \begin{cases} \frac{i}{4} \left[ 1 + \frac{i2}{\pi} \ln\left( \frac{\gamma k}{4e} \Delta t_n \right) \right] & n = m \\ [g(k, \overline{\rho} - \overline{\rho}')]_{\overline{\rho} = \overline{\rho}_m, \overline{\rho}' = \overline{\rho}_n} & n \ne m \end{cases}$$

-continued $$L_{mn}^{(R)} = \frac{1}{\Delta t_n} \int_{S_{00}^{(n)}} dl' g_R(k, \bar{k}_i, \bar{p}_m - \bar{p}') \quad (38d)$$

$$= [g_R(k, \bar{k}_i, \bar{p} - \bar{p}')]_{\bar{p}=\bar{p}_m, \bar{p}'=\bar{p}_n}$$

where $\gamma=1.78107$ is the Euler's constant, and $e=2.71828$ is the natural number.

The expressions for the elements of $\overline{\overline{S}}^{(1)}$ and $\overline{\overline{L}}^{(1)}$ are of the same form by changing k to $k_1$, except that $$S_{mn}^{(1)(P)} = \frac{1}{2\Delta t}, \bar{p} \to \bar{p}_m^+ \quad (39)$$

Note that the matrices $\overline{\overline{L}}$ and $\overline{\overline{L}}^{(1)}$ are symmetric.

8. 2D Effective Permittivity from Quasistatic Mixing Formula

Consider scatterers with permittivity $\varepsilon_p$ embedded in background media with permittivity $\varepsilon$. The effective permittivity is derived from the Lorentz-Lorenz law, which states the macroscopic field $\bar{E}$ is the sum of the exciting field $\bar{E}^{ex}$ and the dipole field $\bar{E}_P$.

$$\bar{E}^{ex} = \bar{E} - \bar{E}_P \quad (40)$$

The effective permittivity $\varepsilon_{ef}$ f relates the macroscopic flux $\bar{D}$ and the macroscopic field $\bar{E}$, $$\bar{D} = \varepsilon_{eff} \bar{E} \quad (41)$$

Also, $$\bar{D} = \varepsilon \bar{E} + \bar{P} \quad (42)$$

And $$\bar{P} = n_0 \alpha \bar{E}^{ex} \quad (43)$$

where $n_0$ is the number densities of scatterers per unit area, and $\alpha$ is the polarizability of each scatter. Expressing $\bar{E}_P$ in terms of $\bar{P}$, $$\bar{E}_P = -\chi \frac{\bar{P}}{\varepsilon} \quad (44)$$

where $\chi$ is a coefficient to be calculated.

Then substituting Eq. (44) into Eq. (40), and Eq. (40) into Eq. (43) yield $$\bar{P} = \frac{n_0 \alpha \varepsilon}{\varepsilon - n_0 \alpha \chi} \bar{E} \quad (45)$$

Putting Eq. (45) into Eq. (42), and comparing with Eq. (41), obtains $$\varepsilon_{eff} = \varepsilon + \frac{n_0 \alpha \varepsilon}{\varepsilon - n_0 \alpha \chi} = \varepsilon \frac{1 - n_0 \alpha (1-\chi)/\varepsilon}{1 - n_0 \alpha \chi/\varepsilon} \quad (46)$$

Equation (46) is known as the Clausius-Mossotti relation. Consider 2D cylindrical scatterers with circular cross section of radius b and cross section area $A_0 = \pi b^2$, derive the expressions of $\alpha$ and $\chi$ by solving the 2D Laplace equation.

For TE polarization, $$\alpha = A_0 y 2\varepsilon \quad (47a)$$

$$\chi = \frac{1}{2} \quad (47b)$$

where $$y = \frac{\varepsilon_p - \varepsilon}{\varepsilon_p + \varepsilon} \quad (47c)$$

Thus, $$\varepsilon_{eff} = \varepsilon \frac{1 + n_0 A_0 y}{1 - n_0 A_0 y} = \varepsilon \frac{1 + f_v y}{1 - f_v y} \quad (48)$$

where the area filling ratio is $f_v = n_0 A_0$. Equation (48) is known as the Maxwell-Garnett mixing formula.

Note that when scatter is of PEC material, $\varepsilon_P \to \infty$, $y \to 1$, thus $\varepsilon_{eff} = \varepsilon(1+f_v)/(1-f_v)$ is finite.

For TM polarization, $$\alpha = A_0 (\varepsilon_P - \varepsilon) \quad (49a)$$

$$\chi = 0 \quad (49b)$$

Thus $$\varepsilon_{eff} = \varepsilon + n_0 A(\varepsilon_P - \varepsilon) = (1 - f_v)\varepsilon + f_v \varepsilon_P \quad (50)$$

Note that when the scatterers are PEC, $\varepsilon_P \to \infty$, $\varepsilon_{eff} \to \infty$. Thus, $\varepsilon_{eff}$ does not exist for TM wave with PEC scatterers. This is also clear from the dispersion relation of the lowest band case for the Dirichlet boundary condition that was treated previously.

Section C—Green's Functions, Including Scatterers, for Photonic Crystals and Metamaterials The Green's functions are physical responses due to a single point source in a periodic lattice. The single point source can also correspond to an impurity or a defect. In this section, the Green's functions, including the scatterers, for periodic structures such as in photonic crystals and metamaterials are calculated. The Green's functions are in terms of the multiband solutions of the periodic structures. The Green's functions are broadband solutions so that the frequency or wavelength dependences of the physical responses can be calculated readily. It is obtained by integrating the periodic Green's function including the scatterers in the Brillouin zone. Low wavenumber extraction methods are used to accelerate the convergence rate of the multiband expansions. The low wavenumber component represents the reactive near field. The band solutions of the periodic structure are obtained from a surface integral equation solution, which is effectively converted to a linear eigenvalue problem, giving multiple band solutions simultaneously. Numerical results are illustrated for the band modal fields, the periodic Green's functions and the single point source Green's functions for two-dimensional (2D) perfect-electric-conductor (PEC) scatterers in a 2D lattice.

Additional details can be found in S. Tan and L. Tsang, "Green's functions, including scatterers, for photonic crystals and metamaterials," Journal of the Optical Society of America B, vol. 34, No. 7, 1450-58 (2017), which is herein incorporated by reference.

Equations in Section C have been numbered starting at equation (1) for ease of discussion. Each reference in this section to an equation number is a reference to another equation in this same section and not to Sections A or B or D or E, unless otherwise noted.

1. Introduction

Waves in periodic structures are important in physics and engineering and in the design of photonic, electronic, acoustic, microwave and millimeter devices such as that in photonic crystals, phononic crystals and metamaterials. In such problems of wave functional materials, there exists a lattice with scatterers embedded periodically in the lattice. The design of the lattice periodicity and the inclusions in a unit cell creates unique band structures with new wave phenomena such as edge states and topological insulators. Besides the band structure, the band field solutions and the Green's functions are also important physical quantities. The Green's functions are physical responses of a point source. In this section, the Green's functions of a periodic structures including the scatterers which can be of arbitrary shape is calculated. The Green's function offers physical insights into the wave behavior in the passband and stopband of the photonic crystals and metamaterials. The Green's function represents the response of sources and also impurities and defects. It can be used to formulate surface integral equations to deal with finite size, defects, imperfection and impurities in the periodic lattice.

The methods of band calculations generally include the plane-wave method and the Korringa Kohn Rostoker (KKR) or multiple-scattering (MS) method, etc. The plane-wave method casts the problem into a linear eigenvalue problem and provides multiple band solutions simultaneously for a point in the Brillouin zone. However, in the plane-wave method, the permittivity (or potential) profile is expanded in Fourier series making it difficult to use when there are abrupt changes in permittivity such as with scatterers, which are perfect electric conductors (PECs). For dielectric scatters, smoothed and effective permittivities are introduced near the dielectric interfaces to improve the convergence. The KKR method formulates surface integral equations with periodic Green's function of an empty lattice. For spherical objects, the scattering T-matrix can be calculated analytically at a single wavenumber, and the scattering can be included in the boundary condition. The method can be convenient for scatterers with shapes of separable geometries such as circular cylinders or spheres. In the KKR/multiple scattering method, the eigenvalue problem is nonlinear using the root seeking procedure of calculating the modal wavenumber, one root at a time. For scatterers of arbitrary shape, numerical approaches such as the finite difference time domain method (FDTD) have been used.

Using the concept of modal expansion of the periodic Green's function, the method of broadband Green's function with low wavenumber extraction (BBGFL) gives an accelerated convergence of the multiple band expansions, as discussed elsewhere herein. Using BBGFL, surface integral equations are formulated and solved by the method of moment (MoM) so that the method is applicable to scatterers of arbitrary shape. The determination of modal band solutions in this method is a linear eigenvalue problem, so that the multi-band solutions are computed for a Bloch wavenumber simultaneously. This is in contrast to using the usual free-space Green's function or the KKR/multiple scattering method in which the eigenvalue problem is nonlinear. The modal field solutions are wavenumber independent. The BBGFL is applied to calculate band diagrams of periodic structures. The BBGFL method is applicable to both PEC and dielectric periodic scatterers, such as discussed above in sections A and B. The method is broadband so that the frequency or wavelength dependences can be calculated readily. Integral-differential eigensystem is derived for an auxiliary extended problem, which has smooth eigenfunctions.

This section discusses calculating the Green's function for periodic structures that includes infinite periodic scatterers and illustrates physically the responses due to point sources in the periodic structures. Such Green's functions also correspond to responses due to an impurity or defect in the periodic structures. The steps are 1) to solve for the band modal fields and normalize the band modal fields, 2) to calculate the periodic Green's function at a single low wavenumber $k_L$ from surface integral equation, 3) the periodic Green's function at any wavenumber k using the accelerated modal representation for each Bloch wavevector in the first Brillouin zone, and 4) to calculate the Green's function due to a single point source by integrating the periodic Green's function over the first Brillouin zone with respect to the Bloch wavenumber. The periodic Green's function is represented in terms of multi-band solutions and in applying the phased-array method to obtain the point source response. But surface integral equation is applied with the method of moment (MoM) to solve for the multiple band solutions instead of using plane wave expansion, making the approach applicable to high permittivity contrast, arbitrary shape scatterers and non-penetrable scatterers. The low wavenumber extraction technique is used to accelerate the convergence of the band modal representation, making a broadband response ready to obtain. The low wavenumber component represents reactive near field, which is the origin of slow convergence.

Figure 18A:
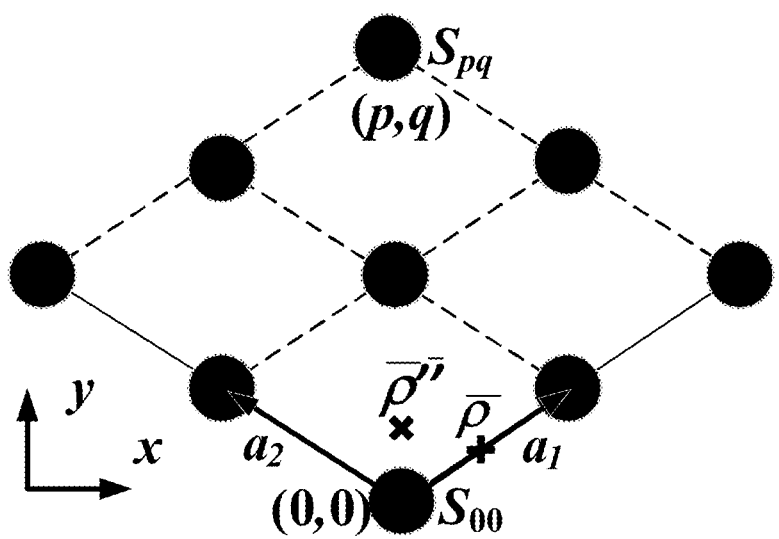
FIGS. 18A-18L illustrate various diagrams associated with broadband Green's functions including periodic scatters, calculated using the BBGFL.

2. Broadband Green's Function with Low Wavenumber Extraction (BBGFL) Based on Modal Representation Consider a 2D periodic lattice, as illustrated in FIG. 18A, in xy plane with z perpendicular to the plane. 2D vector $\bar{\rho}=x\hat{x}+y\hat{y}$ is used. The lattice vector is $\bar{R}_{pq}=p\bar{a}_1+q\bar{a}_2$, where $-\infty<p, q<\infty$. The lattice has periodic scatterers as in photonic crystals and metamaterials. Superscript "0" is used to denote Green's function for an empty lattice and superscript "S" to denote the Green's function and the band modal field with the scatterers. $\bar{k}_i$ is used to denote a wave vector in the first Brillouin zone. Let $\Omega_0=|\bar{a}_1\times\bar{a}_2|$ is the size of the unit cell. The reciprocal lattice vectors are $\bar{K}_{mn}=m\bar{b}_1+n\bar{b}_2$, where $$\bar{b}_1 = 2\pi\frac{\bar{a}_2 \times \hat{z}}{\Omega_0}, \text{ and } \bar{b}_2 = 2\pi\frac{\hat{z} \times \bar{a}_1}{\Omega_0}.$$

The point $\bar{k}_i$ in the first Brillouin zone is $\bar{k}_i(\beta_1, \beta_2)=\beta_1\bar{b}_1+\beta_2\bar{b}_2$, $0\leq\beta_1, \beta_2\leq1$.

The periodic Green's function is the response to an infinite array of periodic point sources with progressive phase shift, denoted by $\delta^\infty(\bar{k}_i; \bar{\rho}-\bar{\rho}')$, as given by $$\delta^\infty(\bar{k}_i; \bar{\rho} - \bar{\rho}') = \sum_{p=-\infty}^{\infty}\sum_{q=-\infty}^{\infty} \delta(\bar{\rho} - (\bar{\rho}' + \bar{R}_{pq}))\exp(i\bar{k}_i \cdot \bar{R}_{pq}) \quad (1)$$

Broadband Green's function is based on band modal representation. It is broadband because the modal field distributions are independent of wavenumber. The broadband Green's function has a simple dependence on wavenumber k, so that the Green's functions can be calculated at any k readily. The low wavenumber extraction at a single wavenumber $k_L$ accelerates the convergence of the band modal summation. With the extraction, the band modal summation converges when the field point coincides with the source point. The low wavenumber extraction uses a single method of moment (MoM) solution at that $k_L$. There are three BBGFLs in this section.

(a) The empty lattice periodic Green's function $g_P^0(k, \bar{k}_i; \bar{\rho}, \bar{\rho}')$ at $\bar{k}_i$ of the first Brillouin zone, but with low wavenumber extraction. The empty lattice $g_P^0(k, \bar{k}_i; \bar{\rho}, \bar{\rho}')$ is due to periodic sources of Eq. (1).

(b) The periodic Green's function including periodic scatters $g_P^S(k, \bar{k}_i; \bar{\rho}, \bar{\rho}')$ at $\bar{k}_i$ of the first Brillouin zone. The $g_P^S(k, \bar{k}_i; \bar{\rho}, \bar{\rho}')$ is also due to periodic sources of Eq. (1).

(c) The Green's function including the periodic scatterers $g^S(k; \bar{\rho}, \bar{\rho}')$. $g^S(k; \bar{\rho}, \bar{\rho}')$ is due to a single source at $\bar{\rho}'$, that is $\delta(\bar{\rho}-\bar{\rho}')$. Thus $g^S(k; \bar{\rho}, \bar{\rho}')$ is non-periodic.

This sub-section discusses the steps of how each of the three BBGFLs are calculated. More details are given in subsequent sub-sections.

2.1 The Empty Lattice Green's Function $g_P^0(k, \bar{k}_i; \bar{\rho}, \bar{\rho}')$.

In the spectral domain, it is $$g_P^0(k, \bar{k}_i; \bar{\rho}, \bar{\rho}') = \frac{1}{\Omega_0} \sum_\alpha \frac{\exp(i\bar{k}_{i\alpha} \cdot (\bar{\rho}-\bar{\rho}'))}{|\bar{k}_{i\alpha}|^2 - k^2} \quad (2)$$

where a combined Greek index $\alpha$ is used to represent the double index (m, n), and $\bar{k}_{i\alpha} = \bar{k}_i + \bar{K}_\alpha$.

This can be viewed as modal expansion where $|\bar{K}_{i\alpha}|$ is the modal frequency and the Bloch wave $$\tilde{\psi}_\alpha^0(\bar{k}_i, \bar{\rho}) = \frac{1}{\sqrt{\Omega_0}} \exp(i\bar{k}_{i\alpha} \cdot \bar{\rho})$$

is the normalized modal field. The modal field satisfies the orthonormal condition.

The above expansion is of poor convergence and does not converge at $\bar{\rho} = \bar{\rho}'$. A low wavenumber extraction is used by first calculating $g_P^0(k_L, \bar{k}_i; \bar{\rho}, \bar{\rho}')$, so that $$g_P^0(k, \bar{k}_i; \bar{\rho}, \bar{\rho}') = \quad (3)$$

$$g_P^0(k_L, \bar{k}_i; \bar{\rho}, \bar{\rho}') + \frac{k^2 - k_L^2}{\Omega_0} \sum_\alpha \frac{\exp(i\bar{k}_{i\alpha} \cdot (\bar{\rho}-\bar{\rho}'))}{(|\bar{k}_{i\alpha}|^2 - k^2)(|\bar{k}_{i\alpha}|^2 - k_L^2)}$$

which is the BBGFL for the empty lattice. It is called "broadband" because the summation has simple wavenumber dependence in $(k^2-k_L^2)/(|\bar{K}_{i\alpha}|^2-k^2)$ while $\exp(i\bar{k}_{i\alpha} \cdot (\bar{\rho}-\bar{\rho}'))$ does not have wavenumber dependence. Equation (3) has two parts, the low wavenumber extraction and the Bloch plane wave modal expansion. The modal expansion has convergence of $1/|\bar{K}_{i\alpha}|^4$. In truncating the series of Eq. (3), $|\bar{K}_{i\alpha}| \gg k$. The modal expansion converges even at $\bar{\rho} = \bar{\rho}'$. The procedure calculates $g_P^0(k_L, \bar{k}_i; \bar{\rho}, \bar{\rho}')$ once at $k = k_L$. This is decomposed into the free space Green's function $g^0$ and the response $g_R^0$, with $g_P^0(k_L, \bar{k}_i; \bar{\rho}, \bar{\rho}') = g^0(k_L; \bar{\rho}, \bar{\rho}') + g_R^0(k_L, \bar{k}_i; \bar{\rho}, \bar{\rho}')$. Details of calculating $g_R^0(k_L, \bar{k}_i; \bar{\rho}, \bar{\rho}')$ discussed elsewhere herein, such as sections A and B.

2.2 The Periodic Green's Function Including the Periodic Scatterers $g_P^S(k, \bar{k}_i; \bar{\rho}, \bar{\rho}')$ Using BBGFL $g_P^0(k, \bar{k}_i; \bar{\rho}, \bar{\rho}')$, a surface integral equation is used and solve with MoM to find the band modal solutions. Using BBGFL in MoM, a linear eigenvalue problem is obtained to calculate simultaneously the band solutions with all the band eigenvalues $k_\beta^S(\bar{k}_i)$ dependent on $\bar{k}_i$ and not on k. Sub-section 6 describes efficient methods of calculating band modal solution $\psi_\beta^S(\bar{k}_i, \bar{\rho})$ and perform the normalization of modal fields which is $$\int_{\Omega_{00}} d\bar{\rho}' \psi_\beta^{S*}(\bar{k}_i; \bar{\rho}) \psi_{\beta'}^S(\bar{k}_i; \bar{\rho}) = \delta_{\beta\beta'} \quad (4)$$

Next the normalized modal solutions $\psi_\beta^S(\bar{k}_i, \bar{\rho})$ is used to calculate the Green's function $g_P^S(k, \bar{k}_i; \bar{\rho}, \bar{\rho}')$, which includes the presence of the scatterers. Note that $k_\beta^S(\bar{k}_i)$ is real.

$$g_P^S(k, \bar{k}_i; \bar{\rho}, \bar{\rho}') = \sum_\beta \frac{\psi_\beta^S(\bar{k}_i; \bar{\rho}) \psi_\beta^{S*}(\bar{k}_i; \bar{\rho}')}{[k_\beta^S(\bar{k}_i)]^2 - k^2} \quad (5)$$

Equation (5) has a poor convergence. Thus, a single low wavenumber extraction $k_L$ is also used to obtain $$g_{P,B}^S(k, k_L, \bar{k}_i; \bar{\rho}, \bar{\rho}') = (k^2 - k_L^2) \sum_\beta \frac{\psi_\beta^S(\bar{k}_i; \bar{\rho}) \psi_\beta^{S*}(\bar{k}_i; \bar{\rho}')}{([k_\beta^S(\bar{k}_i)]^2 - k^2)([k_\beta^S(\bar{k}_i)]^2 - k_L^2)} \quad (6)$$

where subscript "B" stands for broadband. Then the BBGFL at a single $\bar{k}_i$ for periodic sources is $$G_P^S(k, \bar{k}_i; \bar{\rho}, \bar{\rho}') = g_P^S(k_L, \bar{k}_i; \bar{\rho}, \bar{\rho}') + g_{P,B}^S(k, k_L, \bar{k}_i; \bar{\rho}, \bar{\rho}') \quad (7)$$

Note that $g_{P,B}^S(k, k_L, \bar{k}_i; \bar{\rho}, \bar{\rho}')$ converges with respect to $1/[k_\beta^S(\bar{k}_i)]^4$ in contrast to $1/[k_\beta^S(\bar{k}_i)]^2$ as in Eq. (5). Relatively few modes are needed to construct the broadband Green's function. In truncating the series of Eq. (6), $[k_\beta^S(\bar{k}_i)] > 22$ k, i.e. the maximum $|k_\beta^S(\bar{k}_i)|$ included should be several times larger than the largest k of interest to ensure convergence. Sub-section 7 describes the method of calculating $g_P^S(k_L, \bar{k}_i; \bar{\rho}, \bar{\rho}')$ at a single $k_L$.

2.2 The Green's Function Including the Periodic Scatterers $g^S(k; \bar{\rho}, \bar{\rho}')$ Due to a Single Source at $\bar{\rho}'$ It will be shown in sub-section 3 below that $$g^S(k; \bar{\rho}, \bar{\rho}') = \int_0^1 d\beta_1 \int_0^1 d\beta_2 g_P^S(k, \bar{k}_i(\beta_1, \beta_2); \bar{\rho}, \bar{\rho}') \quad (8)$$

3. Green's Function $g^S(k; \bar{\rho}, \bar{\rho}')$ of a Single Point Source: Integration Over the Brillouin Zone The Green's function $g^S(k; \bar{\rho}, \bar{\rho}')$ due to a single point source $\delta(\bar{\rho}-\bar{\rho}')$ in the lattice including periodic scatterers can be obtained by integration of periodic Green's function $g_P^S(k, \bar{k}_i(\beta_1, \beta_2); \bar{\rho}, \bar{\rho}')$ of a periodic point source array of $\delta^\infty(\bar{\rho}-\bar{\rho}'; \bar{k}_i)$ as given in Eq. (1). Note that $\bar{k}_i$ is a function of $\beta_1$ and $\beta_2$ as defined in sub-section 2. In this sub-section the relations between $g^S(k; \bar{\rho}, \bar{\rho}')$ and $g_P^S(k, \bar{k}_i; \bar{\rho}, \bar{\rho}')$ are derived.

It can be shown show that $\delta(\bar{\rho}-\bar{\rho}')$ can be represented by integrating $\delta^\infty(\bar{k}_i; \bar{\rho}-\bar{\rho}')$ over the first Brillouin zone [9-14], $$\delta(\bar{\rho}-\bar{\rho}') = \int_0^1 d\beta_1 \int_0^1 d\beta_2 \delta^\infty(\bar{k}_i(\beta_1, \beta_2); \bar{\rho}-\bar{\rho}') \quad (9)$$

In showing the above, the property $\bar{a}_1 \cdot \bar{b}_j = 2\pi\delta_{ij}$ is used. It then follows that $$g^S(k; \bar{\rho}, \bar{\rho}'') = \int_0^1 d\beta_1 \int_0^1 d\beta_2 g_P^S(k, \bar{k}_i(\beta_1, \beta_2); \bar{\rho}, \bar{\rho}'') \quad (10)$$

$$= \int_0^1 d\beta_1 \int_0^1 d\beta_2 [g_P^S(k_L, \bar{k}_i(\beta_1, \beta_2); \bar{\rho}, \bar{\rho}'') + g_{P,B}^S(k, k_L, \bar{k}_i(\beta_1, \beta_2); \bar{\rho}, \bar{\rho}'')]$$

The integrand is a periodic function with respect to $\bar{k}_i$. The mid-point rectangular quadrature rule is applied for its numerical evaluation, $$g^S(k; \bar{\rho}, \bar{\rho}'') = (\Delta\beta)^2 \sum_{m=1}^{N_b} \sum_{n=1}^{N_b} [g_P^S(k_L, \bar{k}_i(\beta_m, \beta_n); \bar{\rho}, \bar{\rho}'') + g_{P,B}^S(k, k_L, \bar{k}_i(\beta_m, \beta_n); \bar{\rho}, \bar{\rho}'')] \quad (11)$$

where $\Delta\beta=1/N_b$, $\beta_n=(n-\frac{1}{2})\Delta\beta$, n=1, 2, . . . , $N_b$. 4. Results and Discussion
4.1. Green's Function $g_P^S(k, \bar{k}_i; \bar{\rho}, \bar{\rho}'')$ at a Single $k_L$ Results considering a periodic array of circular PEC cylinders are illustrated. The primary lattice vectors are defined by $$\bar{a}_1 = \frac{a}{2}(\sqrt{3}\hat{x}+\hat{y}), \text{ and } \bar{a}_2 = \frac{a}{2}(-\sqrt{3}\hat{x}+\hat{y}),$$

where a=1 is the normalized lattice constant. The cylinders have radii of b=0.2a centering at $\bar{R}_{pq}$ as defined in subsection 2. The background region out of the cylinders has permittivity of $\varepsilon_b=8.9\varepsilon_0$. The source point is at $$\bar{\rho}'' = \frac{1}{3}(\bar{a}_1 + \bar{a}_2), \quad k_L = \frac{2\pi}{a} f_{nL} \sqrt{\frac{\varepsilon_b}{\varepsilon_0}}$$

is chosen where $f_{nL}=0.001$. The normalized frequency $f_n$ is defined as $$f_n = \frac{ka}{2\pi} \sqrt{\frac{\varepsilon_0}{\varepsilon_b}}.$$

Figure 18B:
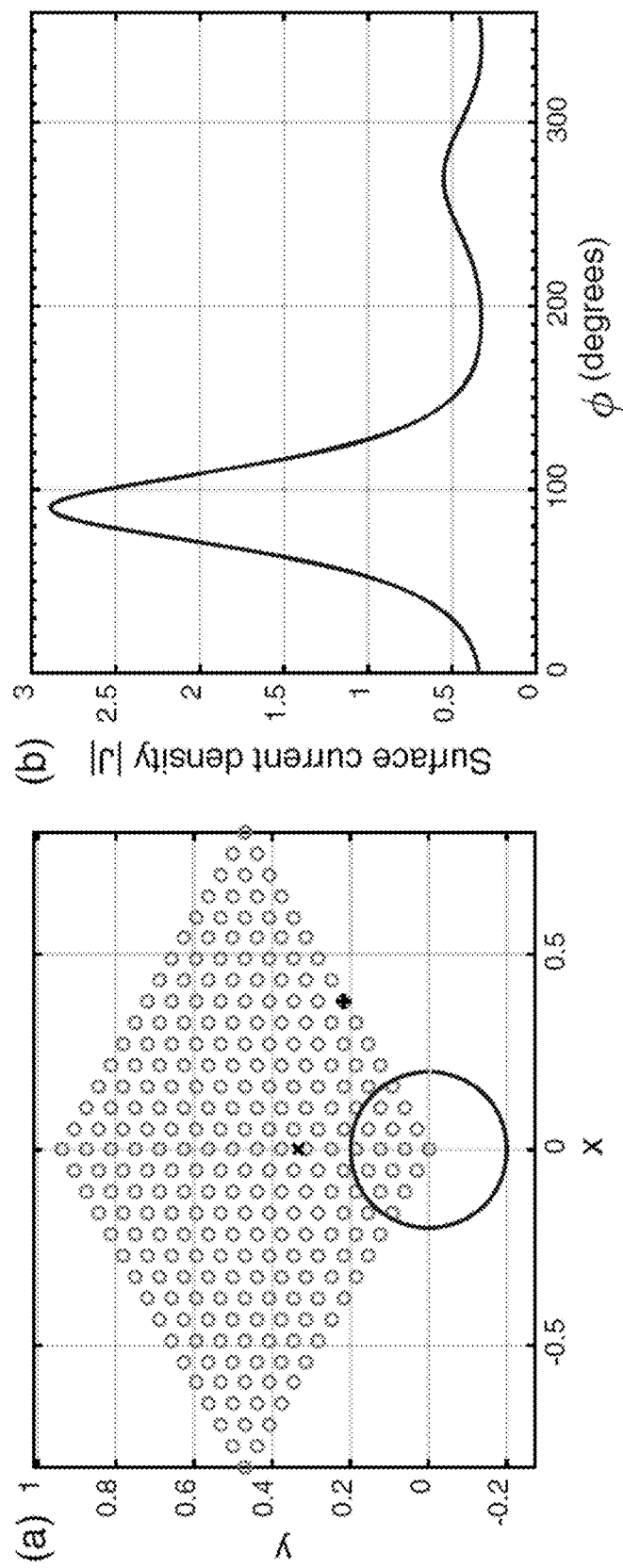

The Brillouin zone vector $\bar{k}_i(\beta_1, \beta_2)$ is as defined in subsection 2. $\beta_1=0.1$, $\beta_2=0.05$ is chosen. The position of the cylinder and the source point in the unit lattice are illustrated in FIG. 18B(a). A special field point is also chosen at $$\bar{\rho} = \frac{7}{16}\bar{a}_1$$

where the $\bar{k}_i$ dependence is examined. The surface currents on the cylinder at $f_{nL}$ are shown in FIG. 18B(b), which demonstrate a peak at $\phi=90°$, closest to the source point.

Figure 18C:
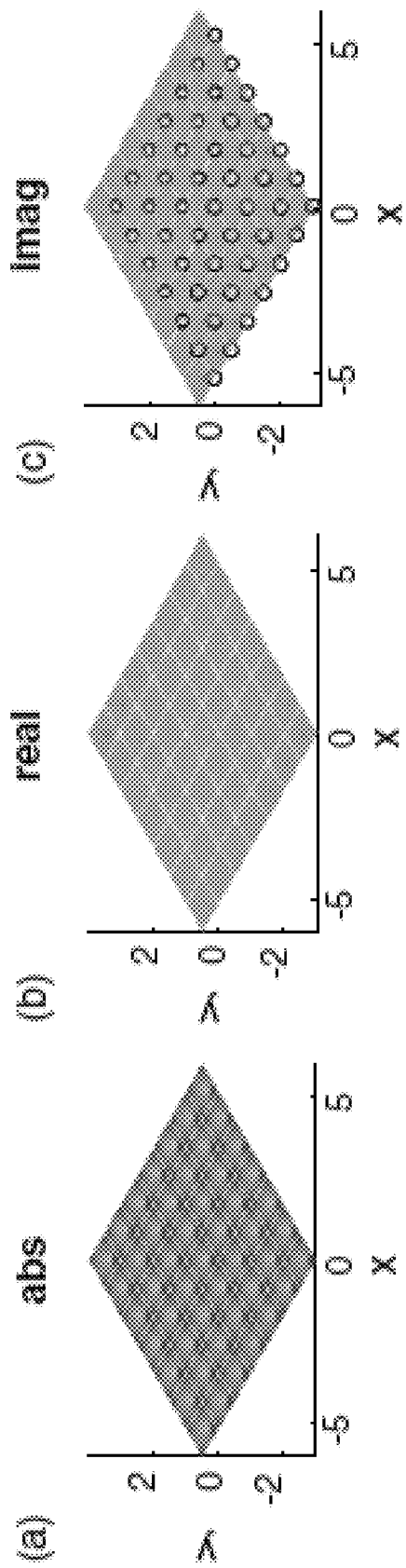

The field distribution of $g_P^S(k_L, \bar{k}_i; \bar{\rho}, \bar{\rho}'')$ over the lattice is shown in FIG. 18C. The field repeats itself under Bloch wave conditions. The repeating of the point sources is clear from the magnitude of the field distribution. The phase progression according to $\bar{k}_i$ is manifested in the real and imaginary part of the field distributions.

4.2. Results of Band Modal Fields $\psi_\beta^S(\bar{k}_i; \bar{\rho})$

Figure 18D:
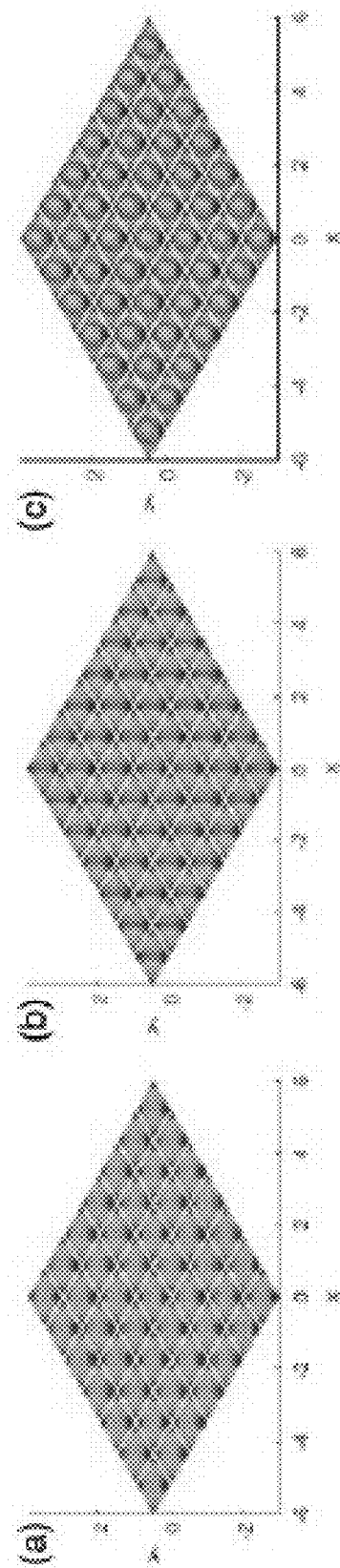

The same periodic array of PEC cylinders is used to illustrate the spatial variation of the modal fields. The same $\bar{k}_i$ and $k_L$ are also chosen. FIG. 18D shows the modal fields for the lowest three modes. The field solutions are extinguished inside the PEC cylinder. They exhibit more complicated pattern over the lattice as the normalized modal frequency increases. The field patterns are orthogonal to each other.

4.3. Illustration of Results of $g_P^S(k, \bar{k}_i; \bar{\rho}, \bar{\rho}'')$ at a General Wavenumber k This sub-section shows the results of $g_P^S(k, \bar{k}_i; \bar{\rho}, \bar{\rho}'')$ at a general wavenumber k, computed according to the broadband expression of Eq. (7) using the modal fields $\psi_\beta^S(\bar{k}_i; \bar{\rho})$ that are independent of k. The expression is applicable to all k. To test the correctness of the expression, the results are also compared by computing directly using the approach of sub-section 7 for a general k.

Figure 18E:
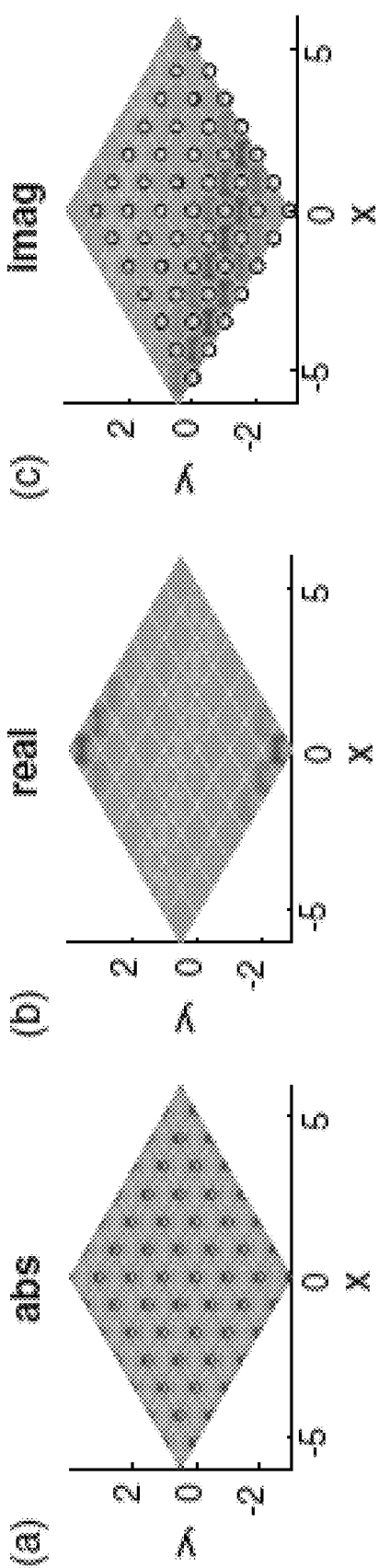

The results of $g_{P,B}^S(k, k_L, \bar{k}_i; \bar{\rho}, \bar{\rho}'')$ following Eq. (6) at $f_n=0.2$ using all the modes with $k_\beta \leq k_{max}$ are illustrated. Equation (6) suggests a convergence rate up to $1/k_\beta^4$ subject to $k_\beta \gg k$. The convergence is checked by taking $k_{max}=8k$ as benchmark, and calculating the relative error in evaluating $g_{P,B}^S$ as the number of modes included increases. The test confirms the rapid convergence of $g_{P,B}^S$. In this case truncating the series with $k_\beta/k \leq 3$ yields a relative error less than 1%. It is noted that the convergence rate in general slows down as k increases, and more modes are used in the series to ensure accuracy. The density of modes also increases as the frequency increases. In the following computations, set $k_{max}=8k$, which includes 49 modes for $f_n=0.2$. The results of $g_{P,B}^S$ are given in FIG. 18E. Comparing to the results of $g_P^S(k_L, \bar{k}_i; \bar{\rho}, \bar{\rho}'')$ as shown in FIG. 18C, the behavior of $g_{P,B}^S(k, k_L, \bar{k}_i; \bar{\rho}, \bar{\rho}'')$ is smooth and without singularity, unlike $g_P^S(k_L, \bar{k}_i; \bar{\rho}, \bar{\rho}'')$. FIG. 18E also shows that the spatial variation of $g_{P,B}^S$ is close to the modal field distribution of $\psi_\beta^S(\bar{k}_i; \bar{\rho})$ at $f_{n\beta}=0.216$ as shown in FIG. 18D. This is because $f_n$ is being close to $f_{n\beta}$ so that the contribution from the corresponding mode becomes dominant in shaping the broadband Green's function $g_{P,B}^S(k, k_L, \bar{k}_i; \bar{\rho}, \bar{\rho}'')$ at this k.

Figure 18F:
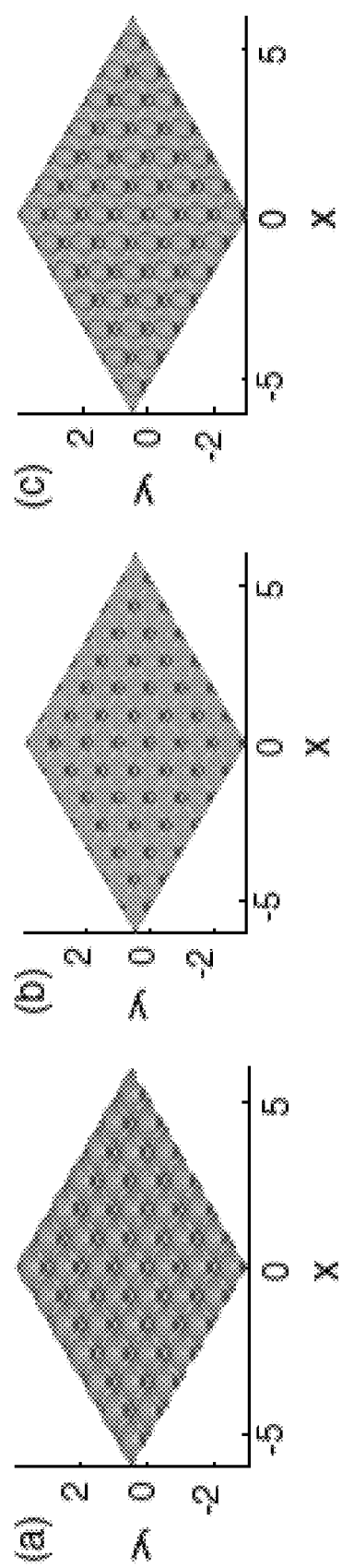

Equation (7) is then used to evaluate $g_P^S(k, \bar{k}_i; \bar{\rho}, \bar{\rho}'')$ at three different k's corresponding to $f_n=0.1$, 0.2, and 0.4, respectively. The spatial variation of $g_P^S(k, \bar{k}_i; \bar{\rho}, \bar{\rho}'')$ are plotted in FIG. 18F. The modes included are with $k_\beta \leq k_{max}=8k$. The results show that the Green's function at a specific $\bar{k}_i$ varies significantly with k.

The CPU times used to evaluate $g_P^S(k, \bar{k}_i; \bar{\rho}, \bar{\rho}'')$ following Eq. (7) are shown in Table 1 where the absolute time unit is ignored. The CPU times are decomposed into several steps. The modal analysis takes up 10.5 time units to solve Eq. (20) and obtain all the modal wavenumber $k_\beta^S$ and the eigenvectors $\bar{b}_\beta$. The eigenvector $\bar{b}_\beta$ is related to the modal field $\psi_\beta^S(\bar{k}_i; \bar{\rho})$ through Eq. (31). The calculation of $\psi_\beta^S(\bar{k}_i; \bar{\rho})$ using Eq. (31) on 100 field points $\bar{\rho}$ takes up 0.2425 time units. The calculation of $g_{P,B}^S(k, k_L, \bar{k}_i; \bar{\rho}, \bar{\rho}'')$ through Eq. (6) on 100 field points takes up 0.0905 time units. The evaluation of $g_P^S(k_L, \bar{k}_i; \bar{\rho}, \bar{\rho}'')$ at the single low wavenumber uses up 6.748 time units to assemble the impedance matrix and to solve for the surface currents. This part of CPU can be saved almost completely if the same $k_L$ is chosen as in the first step of modal analysis. Another 0.5414 time units are used to calculate $g_P^S(k_L, \bar{k}_i; \bar{\rho}, \bar{\rho}'')$ at 100 field points. Note that only the time fraction spent on calculating $g_{P,B}^S(k, k_L, \bar{k}_i; \bar{\rho}, \bar{\rho}'')$ duplicates when using Eq. (7) to evaluate $g_P^S(k, \bar{k}_i;$ $\overline{\rho}$, $\overline{\rho}''$) on multiple k's. This does not introduce considerable time increase as compared to using Eq. (32) and Eq. (33) to evaluate $g_P^S(k, \overline{k}_i; \overline{\rho}, \overline{\rho}'')$ at each k. Using Eq. (32) and Eq. (33) leads to linearly scaling CPU times with respect to the number of frequencies considered. The benefits of using Eq. (7) over Eq. (32) and Eq. (33) become more apparent as the number of frequencies to be examined increases. The gain in efficiency approaches ~80.5 for large enough number of frequencies.

TABLE 1

CPU time decomposition

| Procedure | CPU time | Comment |
|---|---|---|
| Modal analysis | 10.5 | Obtain $k_\beta^S$ and $\overline{b}_\beta$ |
| $\psi_\beta^S(\overline{k}_i; \overline{\rho})$ | 0.2425 | 100 pts |
| $g_{P,\beta}^S(k, k_L, \overline{k}_i; \overline{\rho}, \overline{\rho}'')$ | 0.0905 | 100 pts, $f_n = 0.2$ |
| $g_P^S(k_L, \overline{k}_i; \overline{\rho}, \overline{\rho}'')$ | 6.748 + 0.5414 | 100 pts, $f_{nL} = 0.001$ |

Figure 18G:
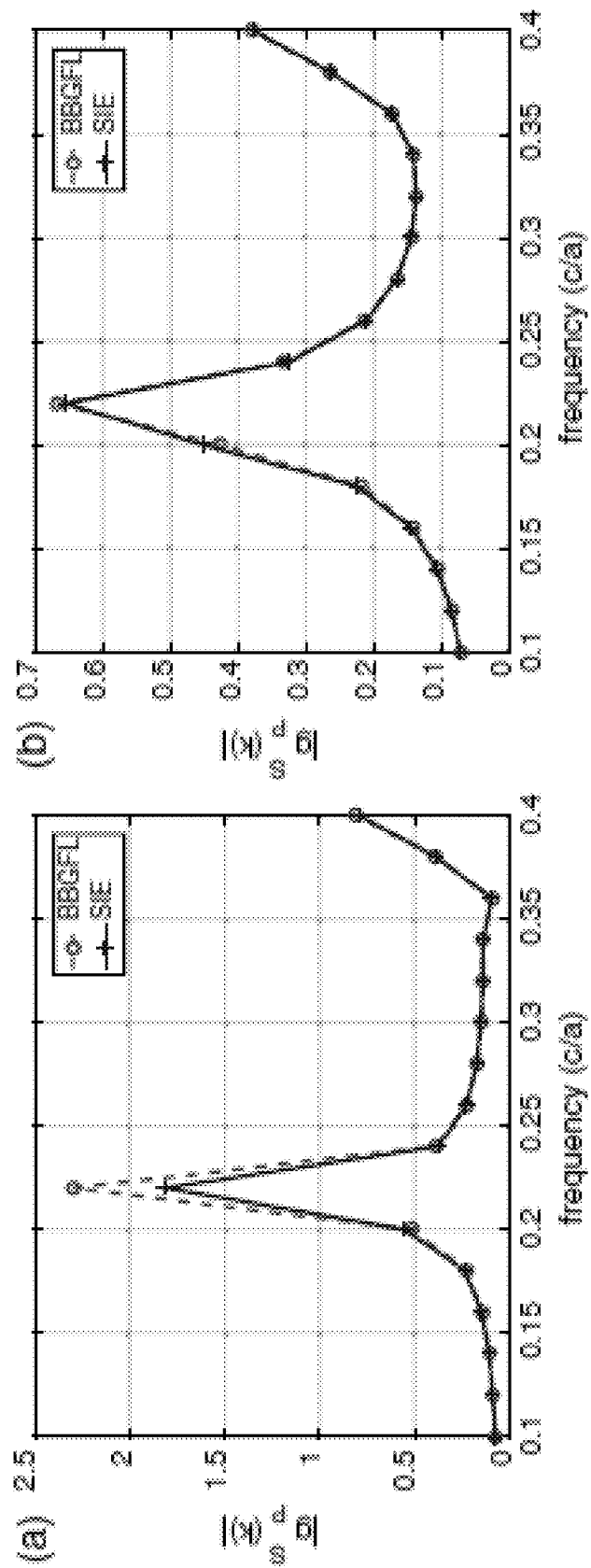

In FIG. 18G, $g_P^S(k, \overline{k}_i; \overline{\rho}, \overline{\rho}'')$ is plotted as a function of the normalized frequency $f_n$ at field point $$\overline{\rho} = \frac{7}{16}\overline{a}_1,$$

and source point $$\overline{\rho}'' = \frac{1}{3}(\overline{a}_1 + \overline{a}_2).$$

The results of two cases are shown: (a) lossless background with $\varepsilon_b = 8.9\varepsilon_0$, and (b) lossy background with $\varepsilon_b = 8.9(1+0.11i)\varepsilon_0$. In both cases a real low wavenumber $k_L$ corresponding to $f_{nL} = 0.001$ is used. The results of Eq. (7) with BBGFL are compared to the results of sub-section 7 by solving SIE directly. For the lossless case, the results agree well except close to $f_n = 0.22$, which is close to the modal frequency of $f_{n\beta} = 0.216$. The poles in the modal expansion of the Green's function as exhibited in the factor of $1/(k_\beta^2 - k^2)$ in Eq. (5) and Eq. (6) causes the decrease in accuracy. The errors can be due to numerical errors in evaluating the modal wavenumber $k_\beta$, which exaggerates the disagreement as $k \rightarrow k_\beta$. The errors can be also due to errors in evaluating the modal fields $\psi_\beta^S$ and due to insufficient modes included in the modal expansion of Eq. (6). The SIE results also become less accurate near resonance. The agreement is improved in the lossy case since by using a complex k, the resonance issue is avoided. The differences from the SIE results are also examined. The differences are generally within 5% except close to modal frequencies. The results of the lossy case are also more accurate.

4.4. Illustration of Results of the Green's Function $g^S(k; \overline{\rho}, \overline{\rho}'')$ of a Single Point Source The performance of BBGFL when used to calculate $g^S(k; \overline{\rho}, \overline{\rho}'')$ over a wide spectrum after integrating $g_P^S(k, \overline{k}_i; \overline{\rho}, \overline{\rho}'')$ over the Brillouin zone is discussed below.

Figure 18H:
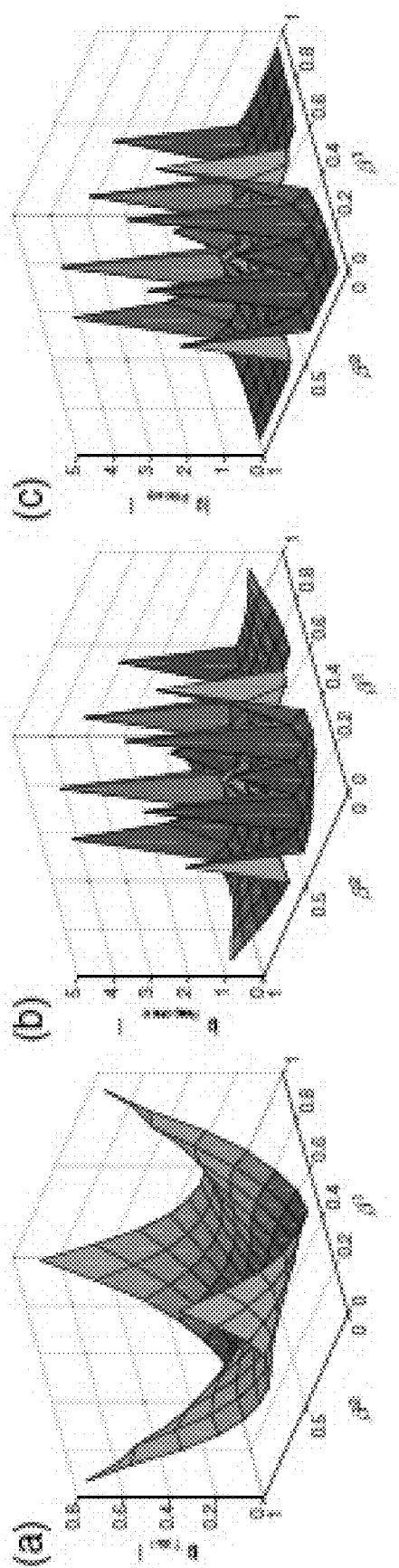
Figure 18I:
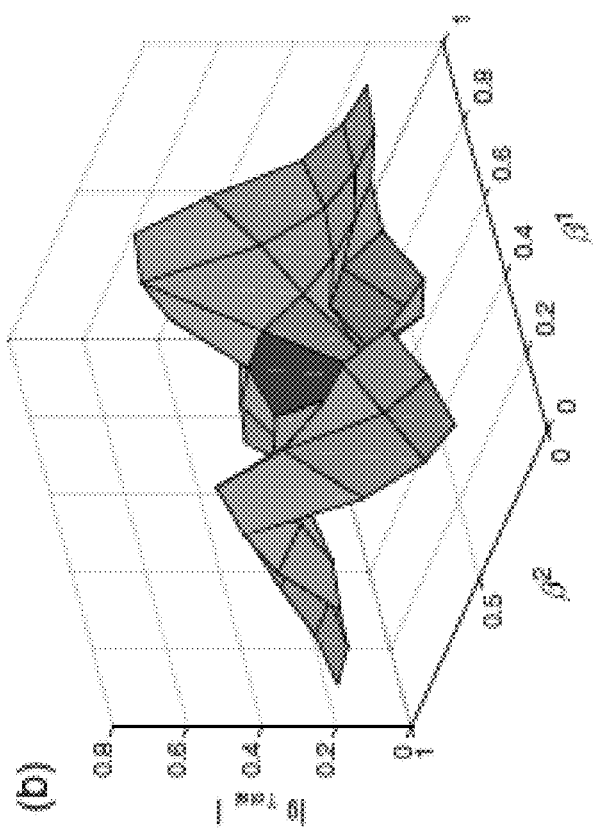
Figure 18I:
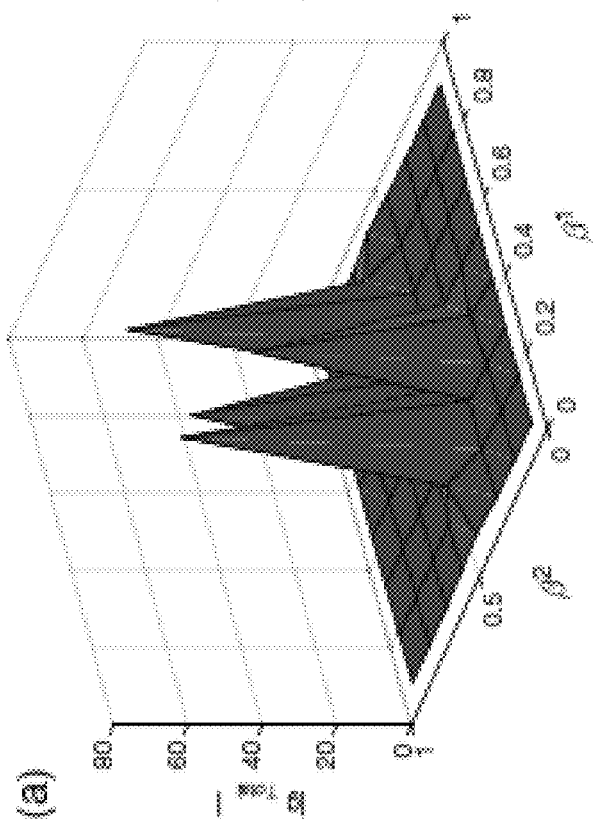

The integrand of (10) $g_P^S(k, \overline{k}_i(\beta_1, \beta_2); \overline{\rho}, \overline{\rho}'')$ as a function of $\overline{k}_i$ for stopband and passband is illustrated in FIGS. 18H and 18I, respectively. The integrand of $g_P^S(k, \overline{k}_i; \overline{\rho}, \overline{\rho}'')$ is decomposed into the primary contribution $g_P^0(k, \overline{k}_i; \overline{\rho}, \overline{\rho}'')$ and the response contribution $g_P^R(k, \overline{k}_i; \overline{\rho}, \overline{\rho}'')$. The results are evaluated at $f_n = 0.2$ in stopband, with source point $$\overline{\rho}'' = \frac{1}{3}(\overline{a}_1 + \overline{a}_2),$$

and field point $$\overline{\rho} = \frac{7}{16}\overline{a}_1.$$

A lossless background with $\varepsilon_b = 8.9\varepsilon_0$ is assumed. It is noted that in FIG. 18H(b) and 18H(c) that both the primary and response components change rapidly as a function of $\overline{k}_i$. The results are that the singular parts cancel each other, such that $g_P^S(k, \overline{k}_i; \overline{\rho}, \overline{\rho}'')$ is a smooth function of $\overline{k}_i$ as shown in FIG. 18H(a).

It is noted that $g_P^S(k, \overline{k}_i; \overline{\rho}, \overline{\rho}'')$ is smooth in FIG. 18H(a) because the frequency is in the stop band so that there are no poles/modes encountered over the entire Brillouin zone. In FIG. 18I, the passband results at $f_n = 0.26$ is shown. In FIG. 18I(a), the integrand of $g_P^S(k, \overline{k}_i; \overline{\rho}, \overline{\rho}'')$ is plotted with a lossless background $\varepsilon_b = 8.9\varepsilon_0$. The integrand is singular when the modes $k_\beta$ coincides with k. In FIG. 18I(b), $g_P^S(k, \overline{k}_i; \overline{\rho}, \overline{\rho}'')$ is shown with a lossy background $\varepsilon_b = 8.9(1+0.11i)\varepsilon_0$. The complex k avoids the real pole of $k_\beta$ giving smooth results.

Figure 18J:
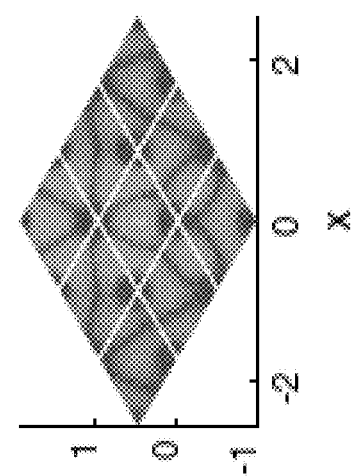
Figure 18J:
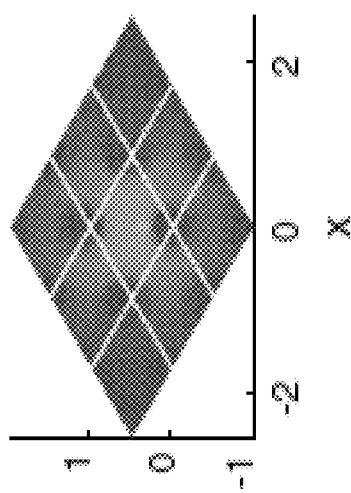
Figure 18J:
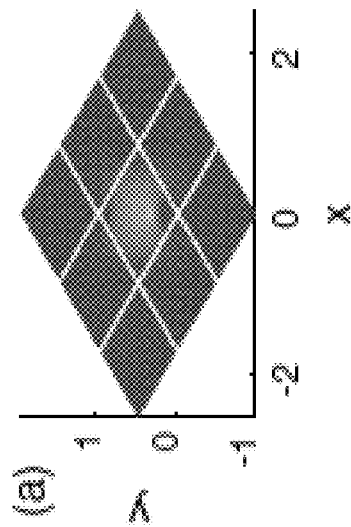

FIG. 18J shows the results of integration over the Brillouin zone and plot the spatial variations of $g^S(k; \overline{\rho}, \overline{\rho}'')$ in a lossless background at $f_n = 0.1$, $f_n = 0.2$, and $f_n = 0.4$, respectively. The results are calculated following Eq. (10) invoking the low wavenumber extraction technique. To simplify, a constant $f_{nL} = 0.001$ over the entire Brillouin zone is chosen, and the spreading of the fields at $f_n = 0.4$ is seen as it is in the passband.

Figure 18K:
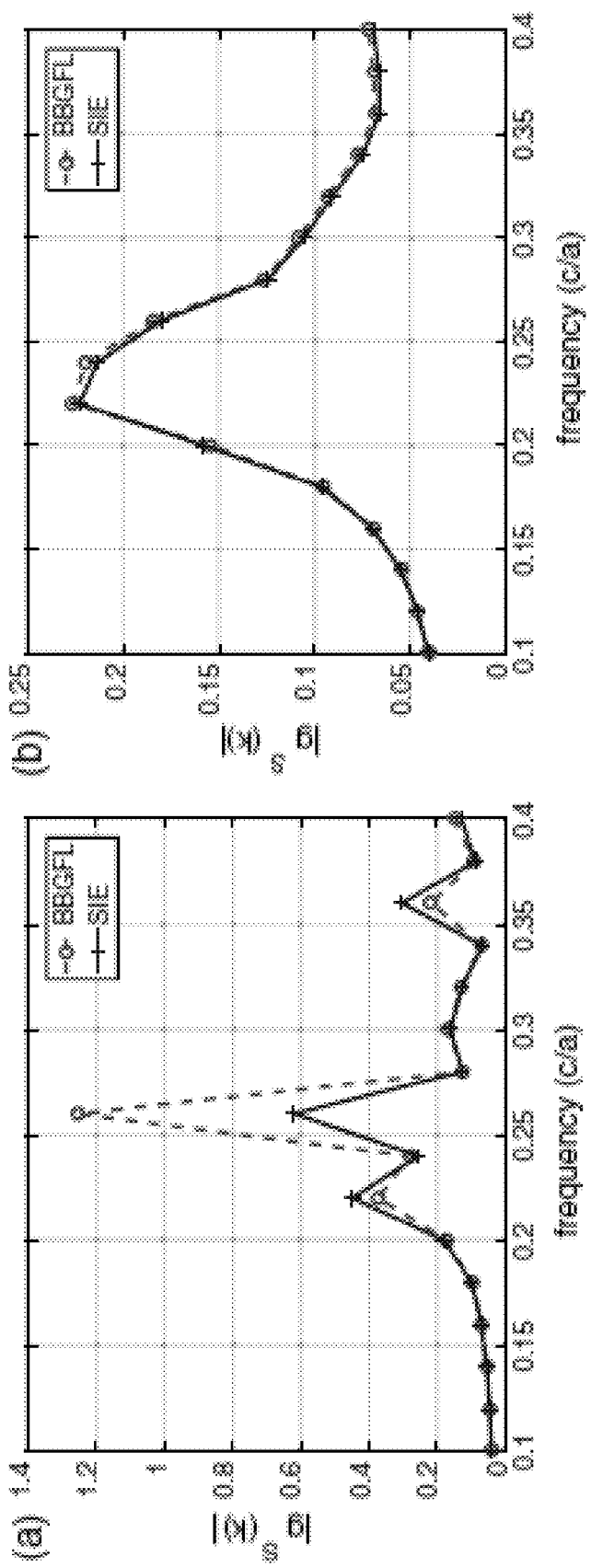

FIG. 18K plots $g^S(k; \overline{\rho}, \overline{\rho}'')$ as a function of the normalized frequency. The results are evaluated at source point $$\overline{\rho}'' = \frac{1}{3}(\overline{a}_1 + \overline{a}_2),$$

and field point $$\overline{\rho} = \frac{7}{16}\overline{a}_1.$$

The values of the Green's function obtained with BBGFL are compared to the results by substituting in Eq. (10) the $g_P^S(k, \overline{k}_i; \overline{\rho}, \overline{\rho}'')$ obtained by solving the integral equations of Eq. (33) and Eq. (32) for each k and $\overline{k}_i$. In FIG. 18K(a), assume a lossless background of $\varepsilon_b = 8.9\varepsilon_0$. Note that other than the peak value at $f_n = 0.26$, the agreement is good. The oscillation of the Green's function is closely related to the band diagrams of the periodic structure. It is suppressed in the stop band below $f_n = 0.2$, and becomes complex above that frequency. One should keep in mind the results based on direct SIE are also subject to errors when entering the passband due to the poles in $g_P^S$. In FIG. 18K(b), assume a lossy background permittivity of $\varepsilon_b = 8.9(1+0.11i)\varepsilon_0$. This yields a complex k, and avoids the poles in the modal expansion. The agreement for the lossy case is better.

Figure 18L:
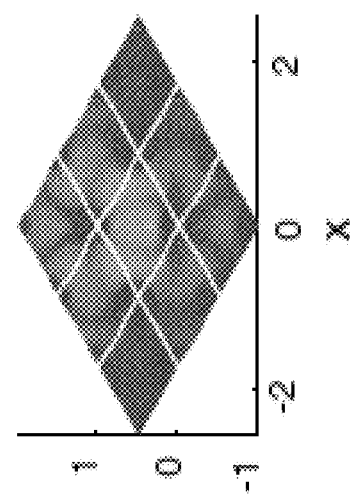
Figure 18L:
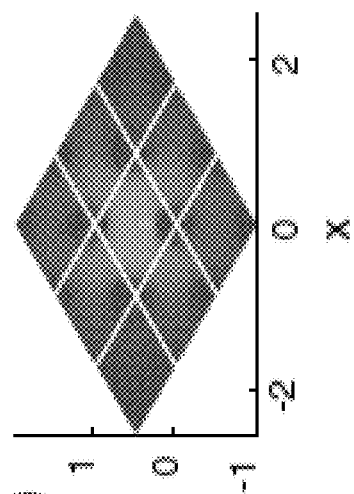
Figure 18L:
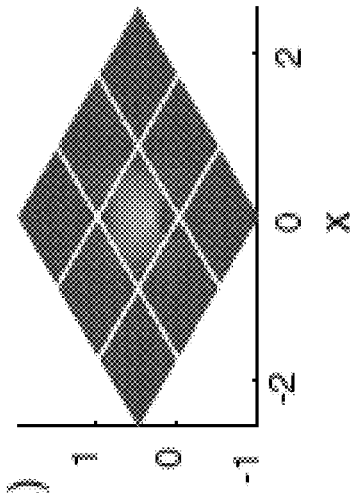

The spatial variations of $g^S(k; \bar{\rho}, \bar{\rho}'')$ with the lossy background are plotted in FIG. 18L at the three normalized frequencies of $f_n=0.1$, $f_n=0.2$, and $f_n=0.4$, respectively. Comparing with FIG. 18J, the spread-out of field in the passband of $f_n=0.4$ is reduced due to absorption loss.

5. Conclusions

In this section, the Green's functions is calculated and illustrated due to point sources inside a periodic array of scatterers. The forms of the Green's function are in terms of band solutions and are broadband so that they can be evaluated over wide spectra of frequencies or wavelengths. The Green's functions provide physical understanding of the propagation and scattering in periodic structures. Green's functions has been shown in the bandgap and in the passband. This Greens function is used to formulate integral equations that can be used to model excitations, impurities, displacement of scatterers, disorder, defects, and finite size periodic structures.

6. Band Analysis Using BBGFL: $k_\beta^S(\bar{k}_i)$ and $\psi_\beta^S(\bar{k}_i; \bar{\rho})$ 6.1 Calculation of $k_\beta^S(\bar{k}_i)$ and $\psi_\beta^S(\bar{k}_i; \bar{\rho})$ Using BBGFL The procedures discussed elsewhere herein, such as sections A and B, are summarized to characterize the modal wavenumber $k_\beta^S(\bar{k}_i)$ and modal field $\psi_\beta^S(\bar{k}_i; \bar{\rho})$ using BBGFL. Subscript $\beta$ is used to denote the modes including the periodic scatterers, while using $\alpha$ to denote the Bloch modes of the empty lattice. The case of PEC scatterers with TMz polarization is being used.

The surface integral equation to solve is $$\int_{S_{00}} d\bar{\rho}' [g_P^0(k, \bar{k}_i; \bar{\rho}, \bar{\rho}') J(\bar{\rho}')] = 0 \quad (12)$$

where $S_{00}$ is the boundary of the 00-th scatterer, and $J(\bar{\rho})$ is the surface currents. Substituting (3) into (12), $$\int_{S_{00}} d\bar{\rho}' g_P^0(k_L, \bar{k}_i; \bar{\rho}, \bar{\rho}') J(\bar{\rho}') + \sum_\alpha R_\alpha(\bar{\rho}) b_\alpha = 0 \quad (13)$$

Where $$b_\alpha = \int_{S_{00}} d\bar{\rho}' \frac{R_\alpha^*(\bar{\rho}')}{\lambda - \lambda_\alpha} J(\bar{\rho}') \quad (14)$$

$$R_\alpha(\bar{\rho}) = \lambda_\alpha \tilde{\psi}_\alpha^0(\bar{k}_i; \bar{\rho}) \quad (15)$$

and $\lambda(k, k_L)=1/(k^2-k_L^2)$, $\lambda_\alpha=1/(|\bar{k}_{i\alpha}|^2-k_L^2)$, and $\tilde{\psi}_\alpha^0(\bar{k}_i; \bar{\rho})=\exp(i\bar{k}_i\cdot\bar{\rho})/\sqrt{\Omega_0}$.

Applying method of moments (MoM) with pulse basis and point matching, Eq. (13) is converted into $$\bar{L}\bar{q}+\bar{R}\bar{b}=0 \quad (16)$$

where $q_n=\Delta t_n J(\bar{\rho}_n)$, $n=1, 2, \ldots, N$, $\Delta t_n$ and $\bar{\rho}_n$ is the arc length and center of each small patch, and N is the number of discretization in representing the boundary. $\bar{R}$ is a matrix of N×M, where M is the number of Bloch waves included in the broadband Green's function, which also determines the dimension of the eigenvalue problem to be solved. $R_{m\alpha}=R_\alpha(\bar{\rho}_m)$. $\bar{L}$ is a matrix of N×N, where $L_{mn}$ is the impedance matrix elements evaluated at $k_L$.

$$L_{mn} = \frac{1}{\Delta t_n} \int_{S_{00}^{(n)}} d\bar{\rho}' g_P^0(k_L, \bar{k}_i; \bar{\rho}, \bar{\rho}') \quad (17)$$

After discretization, Eq. (14) can be also converted into a matrix form, $$\bar{b}=(\lambda\bar{I}-\bar{D})^{-1}\bar{R}^\dagger\bar{q} \quad (18)$$

where $\bar{I}$ is an M×M identity matrix and $\bar{D}$ is a diagonal matrix with $D_{\alpha\alpha}=\lambda_\alpha$.

$\bar{q}$ can be represented in terms of b from Eq. (16), $$\bar{q}=-\bar{L}^{-1}\bar{R}\bar{b} \quad (19)$$

and then use Eq. (19) to eliminate $\bar{q}$ in Eq. (18), and convert it into a linear eigenvalue problem, $$\bar{A}\bar{b}=\lambda\bar{b} \quad (20)$$

where $\bar{b}$ appear as the eigenvectors, $\lambda=1/(k^2-k_L^2)$ is the eigenvalue corresponding to modal wavenumber $k_\beta^S(\bar{k}_i)$. The matrix $\bar{A}=\bar{D}-\bar{R}^\dagger\bar{L}^{-1}\bar{R}$ is of dimenstion M×M.

The modal field $\psi_\beta^S(\bar{k}_i; \bar{\rho})$ is then calculated through the extinction theorem, $$\int_{S_{00}} d\bar{\rho}' [g_P^0(k_\beta^S(\bar{k}_i), \bar{k}_i; \bar{\rho}, \bar{\rho}') J_\beta(\bar{\rho}')] = \quad (21)$$

$$\begin{cases} \psi_\beta^S(\bar{k}_i; \bar{\rho}) & \text{for } \bar{\rho} \text{ outside scatterer} \\ 0 & \text{for } \bar{\rho} \text{ inside scatterer} \end{cases}$$

where the modal currents $J_\beta(\bar{\rho})$ is readily obtained from Eq. (19). $\psi_\beta^S(\bar{k}_i; \bar{\rho})$ is unnormalized. $\psi_\beta^S(\bar{k}_i; \bar{\rho})=0$ for $\bar{\rho}$ inside scatter is used so that $\psi_\beta^S(\bar{k}_i; \bar{\rho})$ is defined everywhere.

By using BBGFL, the solution of the linear eigenvalue problem Eq. (20) yields all the eigenmodes and modal fields simultaneously.

6.2 Normalization of Band Modal Solutions

For the modal expansion of Eq. (5) to hold, the modal field $\psi_\beta^S(\bar{k}_i; \bar{\rho})$ satisfies the orthonormal condition of eq. (4). In this sub-section, the efficient procedure of making the modal solutions orthonormal is discussed.

Substituting Eq. (3) into Eq. (21), $$\psi_\beta^S(\bar{k}_i; \bar{\rho}) = \int_{S_{00}} d\bar{\rho}' g_P^0(k_L, \bar{k}_i; \bar{\rho}, \bar{\rho}') J_\beta(\bar{\rho}') + \sum_\alpha R_\alpha(\bar{\rho}) b_{\alpha\beta} \quad (22)$$

where $b_{\alpha\beta}$ is as defined in Eq. (14), denoting the $\alpha$-th component of the eigenvector $\bar{b}$ corresponding to the eigen mode of $k_\beta^S(\bar{k}_i)$.

equations that govern $\psi_\beta^S(92; \bar{k}_i)$, $\tilde{\psi}_\alpha^0(\bar{k}_i; \bar{\rho})$ and $g_P^0(k_L, \bar{k}_i; \bar{\rho}, \bar{\rho}')$, $$\psi_\beta(\bar{k}_i; \bar{\rho})=-[\nabla^2\psi_\beta(\bar{k}_i; \bar{\rho})]/[K_\beta^S(\bar{k}_i)]^2 \quad (23)$$

$$\nabla^2\tilde{\psi}_\alpha^0(\bar{k}_i; \bar{\rho})=-|\bar{k}_{i\alpha}|^2 \tilde{\psi}_\alpha^0(\bar{k}_i; \bar{\rho}) \quad (24)$$

$$\nabla^2 g_P^S(k_L, \bar{k}_i; \bar{\rho}, \bar{\rho}')=-\neq 7^\infty(\bar{k}_i; \bar{\rho}-\bar{\rho}')-k_L^2 g_P^S(k_L, \bar{k}_i; \bar{\rho}, \bar{\rho}') \quad (25)$$

Substitute Eq. (22) into the right hand side (RHS) of Eq. (23), and make use of Eq. (24) and Eq. (25), $$\psi_\beta^S(\bar{k}_i; \bar{\rho}) = \frac{k_L^2}{[k_\beta^S]^2}\int_{S_{00}} d\bar{\rho}' g_P^0(k_L, \bar{k}_i; \bar{\rho}, \bar{\rho}') J_\beta(\bar{\rho}') + \quad (26)$$

$$\frac{1}{[k_\beta^S]^2}\sum_\alpha \frac{|\bar{k}_{i\alpha}|^2 \tilde{\psi}_\alpha^0(\bar{k}_i; \bar{\rho})}{(|\bar{k}_{i\alpha}|^2-k_L^2)} b_{\alpha\beta}$$

Using the condition of $k_L > 0$, i.e., $k_L \ll k_\beta^S$ and $k_L \ll |\overline{k}_{i\alpha}|$, where both $k_\beta^S$ and $\overline{k}_{i\alpha}$ depends on $\overline{k}_i$, Eq. (26) simplifies to $$\psi_\beta^S(\overline{k}_i; \overline{\rho}) \to \frac{1}{[k_\beta^S]^2} \sum_\alpha \tilde{\psi}_\alpha^0(\overline{k}_i; \overline{\rho}) b_{\alpha\beta} \qquad (27)$$

The normalized modal field is then $$\tilde{\psi}_\beta^S(\overline{k}_i; \overline{\rho}) = \frac{\psi_\beta^S(\overline{k}_i; \overline{\rho})}{\sqrt{\int_{\Omega_{00}} d\overline{\rho} |\psi_\beta^S(\overline{k}_i; \overline{\rho})|^2}} \qquad (28)$$

After Eq. (27), and invoking the orthonormal condition of $\tilde{\psi}_\alpha^0(\overline{\rho}; \overline{k}_i)$, it follows that, $$\int_{\Omega_{00}} d\overline{\rho} \psi_\beta^{S*}(\overline{k}_i; \overline{\rho}) \psi_{\beta'}^S(\overline{k}_i; \overline{\rho}) = \frac{1}{[k_\beta^S k_{\beta'}^S]^2} \sum_\alpha b_{\alpha\beta}^* b_{\alpha\beta'} \qquad (29)$$

Assume that $\Sigma_\alpha b^*_{\alpha\beta} b_{\alpha\beta'} = \delta_{\beta\beta'}$ following the Sturm-Liouville theory. Also they can be orthonormalized through a Gram-Schmidt process. Thus $$\int_{\Omega_{00}} d\overline{\rho} \psi_\beta^{S*}(\overline{\rho}, \overline{k}_i) \psi_{\beta'}^S(\overline{\rho}, \overline{k}_i) = \frac{1}{[k_\beta^S]^4} \delta_{\beta\beta'} \qquad (30)$$

Thus the normalization is $$\tilde{\psi}_\beta^S(\overline{k}_i; \overline{\rho}) = [k_\beta^S]^2 \psi_\beta^S(\overline{k}_i; \overline{\rho}) \qquad (31)$$
$$= \sum_\alpha \tilde{\psi}_\alpha^0(\overline{k}_i; \overline{\rho}) b_{\alpha\beta}$$

$\psi_\beta^S$ is then used to denote $\tilde{\psi}_\beta^S$ and assume that it is normalized.

The normalized modal field can be calculated from either Eq. (22) and Eq. (28) or Eq. (31). Note Eq. (31) is valid for $k_L \to 0$.

7. Green's Function $g_P^S(k, \overline{k}_i; \overline{\rho}, \overline{\rho}'')$ at a Single Low Wavenumber $k_L$ Thee surface integral equations to calculate $g_P^S(k, \overline{k}_i; \overline{\rho}, \overline{\rho}')$ are now discussed. The surface integral equation is formulated for a general k. But in implementation, a single low wavenumber $k_L$ is solved.

Let that $\overline{\rho}''$ be the source point outside the scatterer, and $\overline{\rho}$ the field point outside the scatterer which can also approach the surface from outside the scatterer, FIG. 18A. The extinction theorem governing $g_P^S(k, \overline{k}_i; \overline{\rho}, \overline{\rho}'')$ is then given by $$g_P^S(k, \overline{k}_i; \overline{\rho}, \overline{\rho}'') - g_P^0(k, \overline{k}_i; \overline{\rho}, \overline{\rho}'') = \int_{S_{00}} d\overline{\rho}' [g_P^S(k, \overline{k}_i; \overline{\rho}, \overline{\rho}'') \hat{n}' \cdot \nabla' g_P^0(k, \overline{k}_i; \overline{\rho}, \overline{\rho}') - g_P^0(k, \overline{k}_i; \overline{\rho}, \overline{\rho}') \hat{n}' \cdot \nabla' g_P^S(k, \overline{k}_i; \overline{\rho}', \overline{\rho}'')] \qquad (32)$$

where $\int_{S_{00}} d\overline{\rho}'$ denotes the surface integral over the boundary $S_{00}$ of the 00-th scatterer, and $\hat{n}'$ is the outward normal to the boundary.

Dirichlet boundary condition, $g_P^S(k, \overline{k}_i; \overline{\rho}', \overline{\rho}'') = 0$ is used. This is the case when the electric field response is examined due to a $\hat{z}$-polarized line source outside of a periodic array of PEC scatterers. The fields are polarized TM to z.

By letting $\overline{\rho}$ approach the boundary $S_{00}$, the surface integral equation (SIE) is obtained, $$\int_{S_{00}} d\overline{\rho}' [g_P^0(k, \overline{k}_i; \overline{\rho}, \overline{\rho}') J(\overline{k}_i; \overline{\rho}'_i)] = g_P^0(k, \overline{k}_i; \overline{\rho}, \overline{\rho}''). \qquad (33)$$

The SIE Eq. (33) is to solve the surface current $J(\overline{k}_i; \overline{\rho}') = \hat{n}' \cdot \nabla' g_P^S(k, \overline{k}_i; \overline{\rho}', \overline{\rho}'')$ at a single low wavenumber $k = k_L$.

Notice that this is the same equation that governs the modal analysis problem as discussed elsewhere herein, such as sections A and B. One difference is replacing the right-hand side (excitation) with the direct incidence field from the periodic point source array $g_P^0(k, \overline{k}_i; \overline{\rho}, \overline{\rho}'')$. The pulse basis and point matching are applied in the MoM. The evaluation of the matrix elements and the right-hand side also follow directly the scheme discussed elsewhere herein, such as sections A and B. Note that solving surface integral equation can have multiple right-hand sides by varying $\overline{\rho}''$ as the MoM impedance matrix remains the same.

After the surface currents are obtained, Eq. (32) is used to obtain the low wavenumber Green's function $g_P^S(k, \overline{k}_i; \overline{\rho}, \overline{\rho}'')$ with $k = k_L$.

Note that both $g_P^0(k, \overline{k}_i; \overline{\rho}, \overline{\rho}'')$ and $g_P^S(k, \overline{k}_i; \overline{\rho}, \overline{\rho}'')$ satisfy the Bloch wave condition $$\psi(\overline{k}_i; \overline{\rho} + \overline{R}_{pq}) = \psi(\overline{k}_i; \overline{\rho}) \exp(i\overline{k}_i \cdot \overline{R}_{pq}). \qquad (34)$$

Section D—Scattering of Waves by a Halfspace of Periodic Scatterers Using Broadband Green's Function This section discusses an efficient full-wave solution for planewave scattering from a half-space of two-dimensional (2D) periodic scatterers is derived using broadband Green's function. The Green's function is constructed using band solutions of the infinite periodic structure, and it satisfies boundary conditions on all the scatterers. A low wavenumber extraction technique is applied to the Green's function to accelerate the convergence of the mode expansion. This facilitates the Green's function with low wavenumber extraction (BBGFL) to be evaluated over a broadband as the modal solutions are independent of wavenumber. Coupled surface integral equations (SIE) are constructed using the BBGFL and the free-space Green's function respectively for the two half-spaces with unknowns on the interface. The method is distinct from the effective medium approach, which represents the periodic scatters with an effective medium. This new approach provides accurate near field solutions around the interface with localized field patterns useful for surface plasmon polaritons and topological edge states examinations.

Equations in Section D have been numbered starting at equation (1) for ease of discussion. Each reference in this section to an equation number is a reference to another equation in this same section and not to Sections A or B or C or E, unless otherwise noted.

Figure 19A:
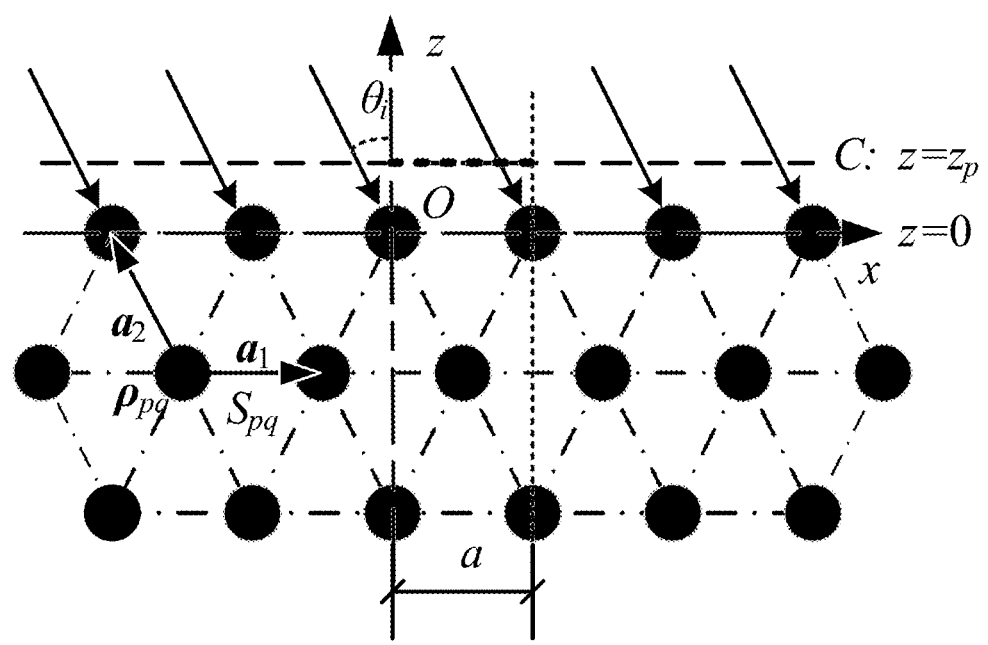
FIGS. 19A-19C illustrate various diagrams associated with calculations of wave scattering from a half-space of periodic scatterers using BBGFL.

Consider a two-dimensional (2D) photonic crystal as formed by repeating a circular cylinder in a hexagonal lattice. Also consider the case when the cylinders are made of perfect-electric-conductor (PEC). The cylinder axis is along $\hat{y}$ direction. The two lattice vectors are $\overline{a}_1 = a\hat{x}$, and $\overline{a}_2 = a(-1/2\hat{x} + \sqrt{3}/2\hat{z})$, where a is the lattice constant. $\Omega_0 = |\overline{a}_1 \times \overline{a}_2|$ is used to denote the unit cell area. $\overline{b}_1 = 2\pi/\Omega_0(\hat{y} \times \overline{a}_2)$ and $\overline{b}_2 = 2\pi/\Omega_0(\overline{a}_1 \times \hat{y})$ are used to denote the two reciprocal lattice vectors. The cylinder radius is b. The reference cell is centered at $\overline{\rho}_{00}$ with (x, z) = (0,0). The photonic crystal half-space, as illustrated in FIG. 19A, is formed by repeating the reference cell at $\overline{\rho}_{pq} + \overline{\rho}_{00} + \overline{R}_{pq}$, where $\overline{R}_{pq} = p\overline{a}_1 + q\overline{a}_2$, and p, q are integers with $q \leq 0$. The cylinders are embedded in a homogeneous background media of dielectric constant $\varepsilon_b$.

Consider scattering from such a half-space of periodic scatterers as excited by a planewave impinging upon the scatterers at an angle $\theta_i$. The planewave is propagating in the xOz plane with electric field polarized along $\hat{y}$.

The wave function $\psi$, representing the axial component of the electric field $E_y$, satisfies the homogeneous wave equation and the Dirichlet boundary conditions on the scatterers in the lower half-space.

$$(\nabla^2+k^2)\psi(\bar{\rho})=0 \tag{1}$$

$$\psi(\bar{\rho})=0, \bar{\rho} \text{ on } S_{pq}, q \leq 0 \tag{2}$$

where k is the free-space wavenumber in the background media; $S_{pq}$ denotes the boundary of the pq-th scatterer, and $q \leq 0$ in Eq. (2) denotes that the scatterers are in the lower half-space.

As the scatterers extend to infinity, for numerical methods of the finite difference method in the time domain (FDTD) or the finite element method (FEM), approximations are made to truncate the simulation domain along $\hat{z}$. Analytical approaches approximate the photonic crystal by a homogeneous half-space of effective permittivity. The problem becomes a plane wave reflection and transmission for a half-space of homogeneous medium. Such homogenization approach does not provide accurate solutions particularly the localized field distributions near the interface.

The broadband Green's function with low wavenumber extraction (BBGFL) that include the periodic scatterers, as described elsewhere herein, such as section D represents field responses due to point sources, and acts as propagators in integral equations (IE) that relates current sources to the fields.

To solve this problem, the usual approach of formulating surface integral equations (SIE) is to use the free-space Green's function, resulting in SIEs with the surface unknowns on the surface of all the scatterers in the lower half-space. Instead, a new Green's function $g^S$ is used, which is the Green's function of infinite periodic scatterers, that satisfies boundary conditions on all the scatterers, as discussed elsewhere herein, such as in Section D. The Green's function $g^S$ satisfy the wave equation, $$(\nabla^2+k^2)g^S(k;\bar{\rho},\bar{\rho}')=-\delta(\bar{\rho}-\bar{\rho}') \tag{3}$$

where $\bar{\rho}$ and $\bar{\rho}'$ denotes the field point and source point, respectively. With Dirichlet boundary condition, $$g^S(k;\bar{\rho},\bar{\rho}')=0, \bar{\rho} \text{ on } S_{pq}, \forall p, q \tag{4}$$

To use $g^S$ to formulate SIEs, a virtual boundary C separating the two half-spaces at $z=z_p$ is used, as denoted in FIG. 19A. The virtual boundary can be any curve that separates the scatterers in the upper half-space. For the region below the virtual boundary, Green's theorem is applied on $g^S$ and $\psi$. By making use of Eqs. (3) and (1), and the boundary conditions in Eqs. (4) and (2), the extinction theorem is obtained:

$$\int_C d\bar{\rho}' \left[ g^S \frac{\partial \psi}{\partial n} - \psi \frac{\partial g^S}{\partial n} \right] = \begin{cases} \psi(\bar{\rho}) & \bar{\rho} \in A \\ 0 & \bar{\rho} \notin A \end{cases} \tag{5}$$

where A denotes the bottom half-space excluding the scatterers, and n denotes the outward normal of region A.

Note that Eq. (5) applies to arbitrary shape of C and to any external excitation source. Considering a planewave $\psi_{inc}(x,z)=\exp(ik_{ix}x-ik_{iz}z)$, impinging upon a half-space of periodic array along $\hat{x}$ direction, the Bloch wave condition, $\psi(x+a,z)=\psi(x,z)\exp(ik_{ix}a)$, can be applied, which reduces Eq. (5) to Eq. (6), $$\int_0^a dx' \left[ g_{Px}^S \frac{\partial \psi}{\partial z'} - \psi \frac{\partial g_{Px}^S}{\partial z'} \right] = \begin{cases} \psi(x,z) & z<0 \text{ and } \bar{\rho} \notin S_{pq} \\ 0 & z>0 \text{ or } \bar{\rho} \in S_{pq} \end{cases} \tag{6}$$

where the integration is over one period of the virtual boundary C, and $g_{Px}^S$ is related to $g^S$ as follows, $$g_{Px}^S(k_{ix},k;\bar{\rho},\bar{\rho}') = \sum_n g^S(k;x,z;x'+na,z')\exp(ik_{ix}na) \tag{7}$$

Similarly, for the homogeneous top half-space above the virtual boundary, Green's theorem is applied on the free-space Green's function $g^0$ and $\psi$. With the Bloch wave condition, which arrives at the second extinction theorem, $$\psi_{inc}(\bar{\rho}) - \int_0^a dx' \left[ g_{Px}^0 \frac{\partial \psi}{\partial z'} - \psi \frac{\partial g_{Px}^0}{\partial z'} \right] = \begin{cases} \psi(x,z) & z>0 \\ 0 & z<0 \end{cases} \tag{8}$$

where $g_{Px}^0$ is related to $g^0$, $$g_{Px}^0(k_{ix},k;\bar{\rho},\bar{\rho}') = \sum_n g^0(k;x,z;x'+na,z')\exp(ik_{ix}na) \tag{9}$$

where $$g^0(k;\bar{\rho},\bar{\rho}') = \frac{i}{4}H_0^{(1)}(k|\bar{\rho}-\bar{\rho}'|)$$

and $H_0^{(1)}(\cdot)$ is the zeroth order Hankel function of the first kind.

Eq. (6) and Eq. (8) are the extinction theorems governing the wave function $\psi$ everywhere. By letting $z \to z_p$ (where $z_p^\pm$ denotes approaching $z_p$ from above and below the interface, respectively), a set coupled integral equation results, $$\psi_{inc}(x,z) - \int_0^a dx' \left[ g_{Px}^0 \frac{\partial \psi}{\partial z'} - \psi \frac{\partial g_{Px}^0}{\partial z'} \right] = 0, z \to z_p^- \tag{10}$$

$$\int_0^a dx' \left[ g_{Px}^S \frac{\partial \psi}{\partial z'} - \psi \frac{\partial g_{Px}^S}{\partial z'} \right] = 0, z \to z_p^+ \tag{11}$$

from which the surface fields ' and $\partial \psi/\partial n$ are to be solved through method of moments (MoM). The surface fields can then be used in Eq. (6) and Eq. (8) to solve the field everywhere. This provides exact near field solutions close to the interface, which is of interest in physical phenomena of surface plasmon plaritons and topological edge states, etc. Thus, the difference between formulating the dual integral with $g^S$ and $g^0$ versus formulating entirely with $g^0$ is that the unknowns are on C versus unknowns on all the scatterers.

The Green's function $g^S$ and $g_{Px}^S$ can then be represented as follows. First these two Green's function can be related to another Green's function $g_P^S$, and that $g_P^S$ can be efficiently constructed from few modes or band solutions, such as discussed above in Section D. $g_P^S$ is the solution to the wave equation due to a set of periodic point sources following the lattice vectors with progressive phase shift characterized by the Bloch wave vector $\bar{k}_b$, and it satisfies the boundary conditions on all the scatterers.

$$(\nabla^2 + k^2) g_{Px}^S(\bar{k}_b, k; \bar{\rho}, \bar{\rho}') = \sum_{p,q} \delta(\bar{\rho} - \bar{\rho}' - \bar{R}_{pq}) e^{i\bar{k}_b \cdot \bar{R}_{pq}} \quad (12)$$

$$g_{Px}^0(\bar{k}_b, k; \bar{\rho}, \bar{\rho}') = 0, \bar{\rho} \text{ on } S_{pq}, \forall p, q \quad (13)$$

Using Eqs. (3) and (12), it can be shown that $$g_{Px}^S(\bar{k}_b, k; \bar{\rho}, \bar{\rho}') = \sum_{p,q} g^S(k; \bar{\rho}, \bar{\rho}' + \bar{R}_{pq}) \exp(i\bar{k}_b \cdot \bar{R}_{pq}) \quad (14)$$

$$g^S(k; \bar{\rho}, \bar{\rho}') = \int_0^1 d\beta_1 \int_0^1 d\beta_2 g_P^S(\beta_1 \bar{b}_1 + \beta_2 \bar{b}_2, k; \bar{\rho}, \bar{\rho}') \quad (15)$$

Substituting Eq. (15) in Eq. (7), can show $$g_{Px}^S(k_{ix}, k; \bar{\rho}, \bar{\rho}') = \int_0^1 d\beta_2 g_P^S\left(\left(k_{ix} / \frac{2\pi}{a}\right) \bar{b}_1 + \beta_2 \bar{b}_2, k; \bar{\rho}, \bar{\rho}'\right) \quad (16)$$

Eqs. (14-16) show the relation between the three Green's functions of $g_P^S$, $g_{Px}^S$, and $g^S$. Once $g_P^S$ is known, $g_{Px}^S$ and $g^S$ can be readily constructed by integrating $g_P^S$ with respect to the Bloch wave vector $\bar{k}_b$ (controlling the phase shift) in the first Brillouin zone. Eq. (16) is used to calculate $g_{Px}^S$ in the SIE.

$g_P^S$ is represented in terms of band solutions of the entire infinite 2D periodic structures. The band solutions satisfy the homogeneous wave equation and are subject to the boundary conditions on the scatterers.

$$(\nabla^2 + k_\beta^2) \Psi_\beta^S(\bar{k}_b; \bar{\rho}) = 0 \quad (17)$$

$$\psi_\beta^S(\bar{k}_b; \bar{\rho}) = 0, \bar{\rho} \text{ on } S_{pq}, \forall p, q \quad (18)$$

where $k_\beta$ and $\psi_\beta^S$ are the modal wavenumbers and the modal wave functions, respectively, and both are independent of the wavenumber k. The modal wave functions are orthonormal, $$\iint_{\Omega_0} d\bar{\rho} \psi_\alpha^S(\bar{\rho}) \psi_\beta^{S*}(\bar{\rho}) = \delta_{\alpha\beta} \quad (19)$$

where $\alpha$ and $\beta$ are the modal indexes, the integration is carried on a unit cell, and $\delta_{\alpha\beta}$ denotes the Kronecker Delta function.

From Eqs. (12, 17, and 19), using the orthonormality and completeness of the modal functions, it can be shown that $$g_P^S(\bar{k}_b, k; \bar{\rho}, \bar{\rho}') = \sum_\beta \frac{\psi_\beta^S(\bar{k}_b; \bar{\rho}) \psi_\beta^{S*}(\bar{k}_b; \bar{\rho}')}{[k_\beta^S(\bar{k}_b)]^2 - k^2} \quad (20)$$

Eq. (20) represents $g_P^S$ in terms of modes. As the modes are independent of wavenumber k, it applies to arbitrary frequency. Eq. (20) is a general representation of the Green's function including the scatterers that applies to arbitrary shape of geometries. However, it has a second order convergence rate utilizing large number of modes, which can hinder its practical use in solving scattering problems. A low wavenumber extraction technique represents the Green's function as itself evaluated at a fixed low wavenumber $k_L$, plus a fast converging correction part in terms of modes, as discussed herein, such as in Section D. The choice of $k_L$ is robust.

$$g_P^S(\bar{k}_b, k; \bar{\rho}, \bar{\rho}') = \quad (21)$$

$$g_P^S(\bar{k}_b, k_L; \bar{\rho}, \bar{\rho}') + (k^2 + k_L^2) \sum_\beta \frac{\psi_\beta^S(\bar{k}_b; \bar{\rho}) \psi_\beta^{S*}(\bar{k}_b; \bar{\rho})}{([k_\beta^S(\bar{k}_b)]^2 - k^2)([k_\beta^S(\bar{k}_b)]^2 - k_L^2)}$$

In Eq. (21), the modal summation converges in the fourth order $[k_\beta^S]^{-4}$, much faster than $[_\beta^S]^{-2}$ in Eq. (20). In some other embodiments, another representation with even faster convergence rate of sixth order $[k_\beta^S]^{-6}$ is shown in Eq. (22).

$$g_P^S(\bar{k}_b, k; \bar{\rho}, \bar{\rho}') = \quad (22)$$

$$g_P^S(\bar{k}_b, k_L; \bar{\rho}, \bar{\rho}') + (k^2 + k_L^2) \left[ \frac{1}{2K} \frac{dg_P^S(\bar{k}_b, k_L; \bar{\rho}, \bar{\rho}')}{dk} \right]_{k=k_L} +$$

$$(k^2 - k_L^2)^2 \sum_\beta \frac{\psi_\beta^S(\bar{k}_b; \bar{\rho}) \psi_\beta^{S*}(\bar{k}_b; \bar{\rho})}{([k_\beta^S(\bar{k}_b)]^2 - k^2)([k_\beta^S(\bar{k}_b)]^2 - k_L^2)^2}$$

Very few and even fewer number of modes are needed in Eqs. (21 and 22), respectively, to accurately compute $g_P^S$ over a broadband of wavenumber k. In Eqs. (21 and 22), the low wavenumber components $g_P^S(k_L)$ and $[(1/2k)dg_P^S(k)/dk]_{k=k_L}$ are to be evaluated once at the single wavenumber $k_L$, and they can be solved from SIEs directly. The frequency independent modal wave number $k_\beta^S$ and the modal wave function $\psi_\beta^S$ are the band solutions of the periodic structure, and they can be calculated efficiently as follows. An SIE formulation is applied using the lattice Green's function $g_P^0(\bar{k}_b, k; \bar{\rho}, \bar{\rho}')$, which is the field response due to a periodic lattice of point sources with progressive phase shift. The point sources are radiating in free-space, so no boundary condition is utilized on the scatterer, i.e., $g_P^0$ satisfies the same equation as $g_P^S$ in Eq. (12) but does not satisfy the boundary condition in Eq. (13). $g_P^0$ is put in a broadband form with low wavenumber extraction (BBGFL) in terms of few number of Floquet planewaves, as illustrated in Eq. (23).

$$g_P^0(\bar{k}_b, k; \bar{\rho}, \bar{\rho}') = \quad (23)$$

$$g_P^0(\bar{k}_b, k_L; \bar{\rho}, \bar{\rho}') + \frac{k^2 + k_L^2}{\Omega_0} \sum_\alpha \frac{\exp(i\bar{k}_{b\alpha} \cdot (\bar{\rho} - \bar{\rho}'))}{([\bar{k}_{b\alpha}]^2 - k^2)([\bar{k}_{b\alpha}]^2 - k_L^2)}$$

where $\alpha$ is a combined index short for m, n, and $\bar{k}_{b\alpha} = \bar{k}_b + m\bar{b}_1 + n\bar{b}_2$. This representation converts the homogeneous SIE into a linear eigenvalue problem, yielding all the band solutions simultaneously, as discussed elsewhere herein, such as in Sections A and B. The BBGFL approach can be extended to characterize 3D periodic scatterers.

To compute $g_P^S$ at the single low wavenumber $k_L$, the extinction theorem is used:

$$g_P^S(\bar{k}_b, k; \bar{\rho}, \bar{\rho}'') = \qquad (24)$$

$$g_P^0(\bar{k}_b, k; \bar{\rho}, \bar{\rho}'') - \int_{S_{00}} d\bar{\rho}' [g_P^0(\bar{k}_b, k; \bar{\rho}, \bar{\rho}')\hat{n}' \cdot \nabla' g_P^S(\bar{k}_b, k; \bar{\rho}, \bar{\rho}'')]$$

for both $\bar{\rho}$ and $\bar{\rho}''$ outside of the scatterers. The integration is over the boundary of the reference scatterer $S_{00}$. The surface currents $\hat{n}' \cdot \nabla' g_P^S$ a is obtained by letting $\bar{\rho}$ approach the surface of the scatterer, leading to the SIE $$g_P^0(\bar{k}_b, k; \bar{\rho}, \bar{\rho}'') = \int_{S_{00}} d\bar{\rho}' [g_P^0(k; \bar{\rho}, \bar{\rho}')\hat{n}' \cdot \nabla' g_P^S(k; \bar{\rho}, \bar{\rho}')] \qquad (25)$$

To compute $dg_P^S(k)/dk$ at $k_L$, first take the derivative on Eq. (25), yielding $$\int_{S_{00}} d\bar{\rho}' \left[ g_P^0 \frac{d\hat{n}' \cdot \nabla' g_P^S}{dk} \right] = \frac{dg_P^0}{dk} - \int_{S_{00}} d\bar{\rho}' \left[ \frac{dg_P^0}{dk} \hat{n}' \cdot \nabla' g_P^S \right] \qquad (26)$$

The surface currents $\hat{n}' \cdot \nabla' g_P^S$ derived from Eq. (25) is substituted into Eq. (26) to solve for $d\hat{n} \cdot \nabla' g_P^S/dk$. The surface unknowns are then substituted into Eq. (27), i.e., the k derivative of Eq. (24), to compute $dg_P^S(k)/dk$ outside of the scatterers.

$$\frac{dg_P^S(\bar{k}_b, k; \bar{\rho}, \bar{\rho}'')}{dk} = \qquad (27)$$

$$\frac{dg_P^0}{dk} - \int_{S_{00}} d\bar{\rho}' \left[ \frac{dg_P^0}{dk} \hat{n}' \cdot \nabla' g_P^S \right] - \int_{S_{00}} d\bar{\rho}' \left[ g_P^0 \frac{d\hat{n}' \cdot \nabla' g_P^S}{dk} \right]$$

Method of moments (MoM) is applied to solve the coupled SIE (10) and (11) with surface unknowns $\psi$ and $\partial\psi/\partial z'$ on one period of the virtual boundary C. Pulse basis is used to represent the surface unknowns and apply point matching to convert the SIE into a matrix equation, $$\bar{\bar{L}}_{Px}^0 \bar{q} - \bar{\bar{S}}_{Px}^0 \bar{p} = \bar{b} \qquad (28)$$

$$\bar{\bar{L}}_{Px}^S \bar{q} - \bar{\bar{S}}_{Px}^S \bar{p} = 0 \qquad (29)$$

where $p_n = \Delta x_n \psi_n$, $q_n = \Delta x_n \partial \psi_n/\partial z'$, where $\Delta x_n$ is the length of the n-th segment, and $'_n$ and $\psi_n/\partial z'$ denote $\psi$ and $\psi/\partial z'$ evaluated at the center of the n-th segment $\bar{\rho}_n = (x_n, z_n)$, respectively; $b_m = \psi_{inc}(\bar{\rho}_m)$. The matrix elements are $$Z_{mn} = \frac{1}{\Delta x_n} \int_{S^{(n)}} dx' \zeta(k_{ix}, k; x_m, z; x', z') \qquad (30)$$

where Z and $\zeta$ are general notations representing $L_{Px}^0$ and $g_{Px}^0$, $S_{Px}^0$ and $\partial g_{Px}^0/\partial z'$, $L_{Px}^S$ and $g_{Px}^S$, $S_{Px}^S$ and $\partial g_{Px}^S/\partial z'$, respectively; $z \to z_p^-$ in $L_{Px}^0$ and $S_{Px}^0$, while $z \to z_p^+$ in $L_{Px}^S$ and $S_{Px}^S$; and the integration is over the n-th segment on the virtual boundary denoted by $S^{(n)}$.

To evaluate the impedance matrix elements in Eq. (30), the Bloch wave conditions of $g_{Px}$ (representing both $g_{Px}^0$ and $g_{Px}^S$) along $\hat{x}$ direction can be utilized to ensure that $|x-x'| \leq a/2$. The integrands in Eq. (30) are smooth and finite except when $(x, y) \to (x', z')$. $g_{Px}$ is decomposed into the free-space $g^0$ and the remaining $g^R$.

$$g_{Px}(k_{ix}, k; \bar{\rho}, \bar{\rho}') = g^0(k; \bar{\rho}, \bar{\rho}') + g^R(k_{ix}, k; \bar{\rho}, \bar{\rho}') \qquad (31)$$

The remaining response $g^R$ is a smooth function such that quadrature can be readily applied to evaluate the integrals. Treatments of the singularities of the free space Green's function $g^0$ are handled by standard procedures in MoM.

Equations (16), and (21) or (22), are used to compute $g_{Px}^0$. Finite difference can then be readily applied to compute $\partial g_{Px}^S/\partial z'$. To compute $g_{Px}^0$, an integral transformation is applied, leading to $g_{Px}^0 = g^0 + g_{Px}^{0+} + g_{Px}^{0-}$, where $g_{Px}^{0\pm}$ represent the spatial series in Eq. (9) with positive and negative index n, respectively. $g_{Px}^{0\pm}$ have close form representations in terms of rapidly converging integrals such that $\partial g_{Px}^0/\partial z'$ can be readily computed.

To illustrate the results, consider a special case for the geometry as depicted in FIG. 19A with b=0.2a, $\varepsilon_b$=8.9$\varepsilon_0$, $\theta_i$=30°, and the virtual boundary at $z_p = \sqrt{3}/4a$. The band diagram of such photonic crystal is discussed elsewhere herein, such as in Section A. The frequency of the planewave is at $f_n$=0.2 with unit c/a, where c is the light speed in vacuum, in the stop-band of the crystal.

Figure 19B:
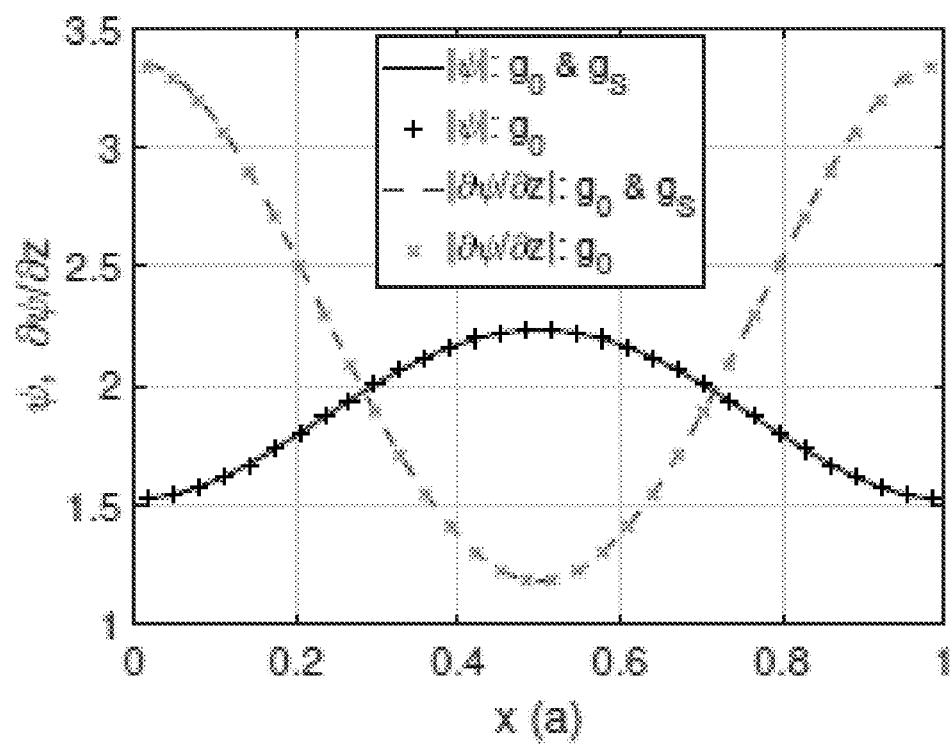

The surface fields $\psi$ and $\partial\psi/\partial z'$ on the virtual boundary C from the coupled SIEs of Eq. (10) and Eq. (11) are plotted in FIG. 19B. The solutions are compared with results from an independent approach by forming an SIE using $g_0$ on the boundary of all the scatterers and utilizing the periodic boundary condition along $\hat{x}$. In applying this independent approach, the half-space of scatterers is truncated at 3 layers along $\hat{x}$. This is justified by the fact that the wave rapidly dampens inside the crystal in the stop-band. The two set of results are in good agreement as demonstrated in FIG. 19B.

Figure 19C:
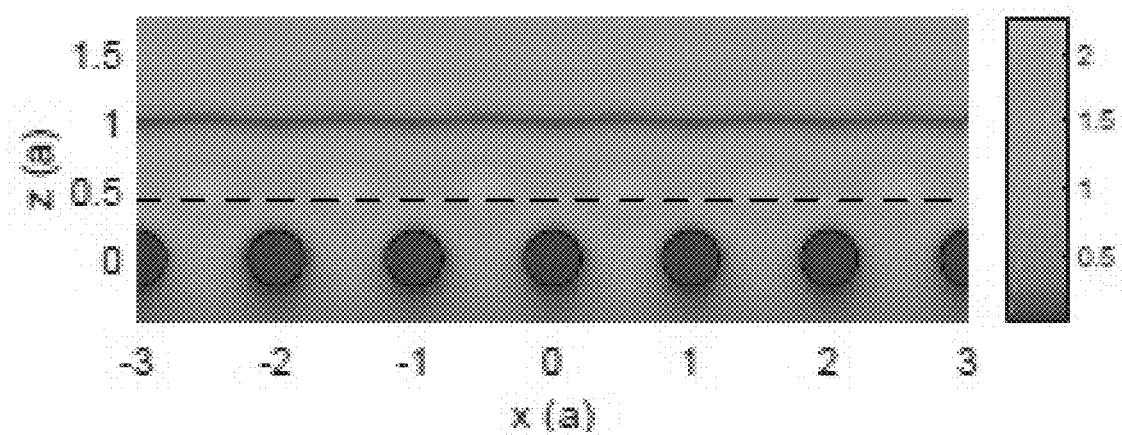

FIG. 19C is a plot of the near field pattern of $\psi$ around the interface of the crystal. It is clear that all energy are being reflected back into the top free-space. The magnitude of the field rapidly decays as it goes deep into the crystal. The field has detailed variations close to the interface representing evanescent modes. The fine-scale field variations quickly smooth out by moving away from the interface, rendering a typical plane wave front.

In summary, a novel methodology to calculate the full wave solution of a planewave interaction with a half-space of periodic scatterers is developed. A set of coupled SIEs are derived using the Green's function including the complete set of periodic scatterers. The Green's function is represented in terms of band solutions of the periodic structures, and is suitable for broadband calculations. Since the Green's function satisfies boundary conditions on all the scatterers, the SIEs are with unknowns on the interface separating the two half-spaces. Such formulation significantly reduces the number of unknowns by an order of magnitude, and the formulation can be readily extended to wave interaction with finite arrays or defects in the lattice.

Section E—Arbitrary Wire Medium Characterization Using 3D Broadband Green's Function with Higher Order Low Wavenumber Extractions Broadband Green's function with low wavenumber extraction (BBGFL) has been extended to represent the 3D lattice Green's function in terms of Floquet modes with simple wavenumber dependence that is efficient to be evaluated over a broadband of frequency. This is accomplished by the extraction of one or several low wavenumber components from the original lattice Green's function. The low wavenumber components represent complex and slowly convergent near field interaction. The extractions result in accelerated convergence of the modal summations. The technique is applied to calculate the band diagram of an arbitrary wire medium solved using the Method of Moments (MoM), and simulation results are compared to results from other techniques. The following illustrates wave phenomena associated with a disconnected wire medium.

Equations in Section E have been numbered starting at equation (1) for ease of discussion. Each reference in this section to an equation number is a reference to another equation in this same section and not to Sections A or B or C or D, unless otherwise noted.

1. Introduction

Green's function can be expressed exactly in terms of modal expansion for resonance problems associated with cavities and for periodic structures. The modal expansions are as shown in Eq. (1), $$g(k; \bar{r}, \bar{r}') = \sum_\alpha \frac{\psi_\alpha(\bar{r})\psi_\alpha^*(\bar{r}')}{k_\alpha^2 - k^2} \quad (1)$$

where k is the wavenumber, $\bar{r}$ and $\bar{r}'$ represents the field and source point, $\alpha$ denotes the modal index, $k_\alpha$ is the modal wavenumber, and $\psi_\alpha(\bar{r})$ is the normalized modal wave function that satisfies the boundary conditions on the scatterer or cavity. The modal representation provides a general framework without restrictions on the shape of the scatterer or cavity geometry. An advantage of Eq. (1), is that both $k_\alpha$ and $\psi_\alpha(\bar{r})$ are independent of k, rendering broadband applications of the Green's functions. This feature is unlike the usual free-space Green's function, layered medium Green's function, etc., that have the k dependence embedded in special functions. The limitations of the modal expansion in Eq. (1) are (a) Eq. (1) has only a second order nonuniform convergence of $k_\alpha^{-2}$ and does not converge at $\bar{r}=\bar{r}'$; and (b) the modal solutions need to be computed rapidly. BBGFL techniques can address these limitations by using (a) low wavenumber extractions to accelerate convergence, and (b) formulating eigenvalue problem such that the modal solutions are determined readily, as discussed in more detail herein.

This section describes the periodic Green's function $g_P(\bar{k}_i, k; \bar{r}, \bar{r}')$ associated with a three-dimensional (3D) lattice. $g_P(\bar{k}_i, k; \bar{r}, \bar{r}')$ represents the field response due to a repeating array of point sources located at $\bar{r}'$ and its lattice replicas $\bar{r}'+\bar{R}_I$ with progressive phase shift $\exp(i\bar{k}_i \cdot \bar{R}_I)$ determined by the Bloch wavevector $\bar{k}_i$. $\bar{R}_I$ is short for $\bar{R}_{m,n,l}=m\bar{a}_1+n\bar{a}_2+l\bar{a}_3$ where $\bar{a}_1$, $\bar{a}_2$, and $\bar{a}_3$ are the primary lattice vectors, and m, n, l are arbitrary integers. In spectral domain, $g_P(\bar{k}_i, k; \bar{r}, \bar{r}')$ can be represented as discussed elsewhere herein, such as in Section D $$g_P(\bar{k}_i, k; \bar{r}, \bar{r}') = \frac{1}{\Omega}\sum_\alpha \frac{\exp(i\bar{k}_{i\alpha} \cdot (\bar{r}-\bar{r}'))}{|\bar{k}_{i\alpha}|^2 - k^2} \quad (2)$$

where $\alpha$ is a combined index short for (m, n, l), $\Omega=\bar{a}_1 \cdot (\bar{a}_2 \times \bar{a}_3)$ is the unit lattice volume, and $\bar{k}_{i\alpha}=\bar{k}_{i,mnl}=\bar{k}_i+m\bar{b}_1+n\bar{b}_2+l\bar{b}_e$, where $$\bar{b}_1 = 2\pi\frac{\bar{a}_2 \times \bar{a}_3}{\Omega}, \bar{b}_2 = 2\pi\frac{\bar{a}_3 \times \bar{a}_1}{\Omega}, \text{ and } \bar{b}_3 = 2\pi\frac{\bar{a}_1 \times \bar{a}_2}{\Omega}$$

are the reciprocal lattice vectors. Equation (2) has the same form as Eq. (1) by replacing the modal wavenumber with $|\bar{k}_{i\alpha}|$ and replacing the modal wave function with the Floquet planewave $\exp(i\bar{k}_{i\alpha} \cdot \bar{r})$. It follows that Eq. (2) share the same advantage as Eq. (1) such as simple k dependence and suitable for broadband calculation. $g_P(\bar{k}_i, k; \bar{r}, \bar{r}')$ can also be used to reduce the number of unknowns in an integral formulation, such as discussed above in Sections A and B. However, Eq. (2) also has $2^{nd}$ order non-uniform convergence with respect to the Floquet modes and it is non-convergent at $\bar{r}=\bar{r}'$.

Various techniques can be used to improve the computation efficiency of $g_P(\bar{k}_i, k; \bar{r}, \bar{r}')$. The Ewald summation techniques and other similar techniques are among the possible approaches but are specific to the planewave function form of Eq. (2) rather than its general form in Eq. (1) and are at the expense of eliminating the simple wavenumber k dependence. Other techniques, such as those discussed above Sections A, B, and D, represent $g(k; \bar{r}, \bar{r}')$ of Eq. (1) in sums of a low wavenumber $k_L$ component $g(k_L; \bar{r}, \bar{r}')$ and a correction part $g_B(k, k_L; \bar{r}, \bar{r}')=g(k; \bar{r}, \bar{r}')-g(k_L; \bar{r}, \bar{r}')$, $$g_B(k, k_L; \bar{r}, \bar{r}') = \sum_\alpha \frac{(k^2-k_L^2)\psi_\alpha(\bar{r})\psi_\alpha^*(\bar{r}')}{(k_\alpha^2-k^2)(k_\alpha^2-k_L^2)} \quad (3)$$

where $g_B(k,k_L; \bar{r}, \bar{r}')$ has $4^{th}$ order convergence $k_\alpha^{-4}$ compared to $k_\alpha^{-2}$ as in Eq. (1). A physical explanation is that the low wavenumber component $g(k_L)$ represents slowly converging near field interactions, while the correction part $g_B(k, k_L)$ stands for fast convergent far field interactions. The quantity $g_B$ is named the broadband Green's function and the technique called broadband Green's function with low wavenumber extraction (BBGFL). Note that Eq. (3) preserves the advantage of Eq. (1) while convergence is accelerated. Also, the modal expansion of Eq. (3) also converges at the self-point of $\bar{r}=\bar{r}'$. The BBGFL technique can be applied to efficiently solve the resonant modes of irregular waveguide. Due to the simple wavenumber dependence in Eq. (3), the characterization of modes is converted into a linear eigenvalue problem, as discussed elsewhere herein, yielding all the modal solution simultaneously.

The BBGFL technique can also be adapted for the periodic Green's function, as discussed herein, such as Sections A, B, and D, converting Eq. (2) into $$g_P(\bar{k}_i, k; \bar{r}, \bar{r}') = g_P(\bar{k}_i, k_L; \bar{r}, \bar{r}') + \frac{1}{\Omega}\sum_\alpha \frac{(k^2-k_L^2)\exp(i\bar{k}_{i\alpha} \cdot (\bar{r}-\bar{r}'))}{(|\bar{k}_{i\alpha}|^2-k^2)(|\bar{k}_{i\alpha}|^2-k_L^2)} \quad (4)$$

Equation (4) has been applied in integral equations to solve for the band diagrams of two-dimensional (2D) periodic scatterers of both non-penetrable perfect electric conductors (PEC) and penetrable dielectric materials, as discussed elsewhere herein, such as Sections A and B. In both cases, the band diagram problem is converted to a linear eigenvalue problem of small to moderate dimension as determined by the number of terms included in the broadband part of the periodic Green's function. With Method of Moments (MoM), where the surface currents are represented using sub-sectional basis functions, the shape of the scatterers can be arbitrary, and the volume fraction of the scatter can also be arbitrary. The linear eigenvalue problem yields multiple band solution at a given $\overline{k}_i$ through computing the impedance matrix on the boundary of an elementary scatterer at the single low wavenumber $k_L$. The multiple band solution has subsequently been used to construct Green's function including the periodic scatterers, such as discussed above in Section D, and the Green's function including the periodic scatterer can then be used to solve scattering from half space of periodic scatterers or finite arrays of periodic scatterers, to deal with localized defects, and to treat topological edge states, etc.

The BBGFL approach is similar to the planewave expansion approach in forming a linear eigenvalue problem to derive the band solution, but it has the feature of low wavenumber extraction. Thus, BBGFL utilizes much less number of Floquet modes, and yields a much smaller eigenvalue problem. The BBGFL approach is also related to the hybrid planewave and integral equational based method, where a combined integral-differential eigen-system is derived to characterize the band solution.

The BBGFL technique is extended in this section for 3D vector wave equations. In 3D problem, an issue needs to be addressed due to the double gradient operator $\nabla\nabla$ in the dyadic Green's function. When the operator acts on the scalar Green's function in the form of Eq. (4), it raises a $|\overline{k}_{i\alpha}|^2$ factor in the numerator, which slows the convergence of $g_B$. As discussed in more detail below, an enhanced high order low wavenumber subtraction technique is utilized, improving the convergence rate of $g_B$ to $|\overline{k}_{i\alpha}|^{-6}$. This technique not only extends the BBGFL technique to 3D applications, but also further reduces the number of terms used in $g_B$ for existing 2D applications. The latter is useful in constructing the Green's function for arbitrary geometry from the numerically derived multiple band solutions.

The higher order low wavenumber extraction technique is demonstrated in characterizing the band diagram of an arbitrary wire medium. The wire medium is formed by repeating a wire segment in a 3D lattice. The thin wire approximation is applied so that the unknowns are in terms of the axial currents along the wire and a line integral equation is constructed where the BBGFL technique is used to represent the periodic Green's function. MoM is used to discretize the axial currents with pulse basis function, and an eigenvalue problem is derived to solve the band diagram. A special case of the wire medium where the elementary wire segment is along a lattice vector and extends the entire lattice constant is equivalent to a 1D wire medium. The 1D wire medium has been treated with effective medium theory where the medium is homogenized into a plasma. The effective medium theory is applicable at low frequency and applies to the lowest band. The analytical solution of the plasma frequency is used to validate the BBGFL technique. Unlike effective medium theory, the BBGFL can also calculate higher order band solutions that compares well with other approaches. The band structure of a disconnected wire medium is also described, which shows distinct behavior from a continuous wire medium.

2. Higher Order Low Wavenumber Extraction Technique for 3D Vector Wave Equation

In this subsection, a new representation of the lattice Green's function Eq. (2) is described with even faster convergence rate than Eq. (4). As suggested by Eq. (4), $g_b(k, k_L, K'_L)$ is defined as $$g_B(k, k_L, k'_L) \stackrel{\Delta}{=} [g_P(k) - g_P(k_L)] - \frac{k^2 - k_L^2}{k'^2_L - k_L^2}[g_P(k'_L) - g_P(k_L)] = \quad (5)$$

$$\frac{1}{\Omega}\sum_\alpha \frac{(k^2 - k_L^2)(k^2 - k'^2_L)\exp(i\overline{k}_{i\alpha} \cdot (\overline{r} - \overline{r}'))}{(|\overline{k}_{i\alpha}|^2 - k^2)(|\overline{k}_{i\alpha}|^2 - k_L^2)(|\overline{k}_{i\alpha}| - k'^2_L)}$$

where $k'_L$ is a second low wavenumber close to $k_L$, and the Green's functions' dependences on $\overline{k}_i$, $\overline{r}$ and $\overline{r}'$ are implicit in the first equal sign. Note that in Eq. (5), $g_B(k, k_L, k'_L)$ has $6^{th}$ order convergence $|\overline{k}_{i\alpha}|^{-6}$, and thus only very few Floquet modes are used.

To eliminate $k'_L$, let $k'_L$ approach $k_L$ in Eq. (5), and bring $g_P(k)$ to the left hand side, leading to $$g_P(k) = g_P(k_L) + (k^2 - k_L^2)\left[\frac{1}{2k}\frac{dg_P(k)}{dk}\right]_{k=k_L} + g_B(k, k_L) \quad (6)$$

Where $$g_B(k, k_L) \stackrel{\Delta}{=} \lim_{k'_L \to k_L} g_B(k, k_L, k'_L) = \frac{1}{\Omega}\sum_\alpha \frac{(k^2 - k_L^2)^2\exp(i\overline{k}_{i\alpha} \cdot (\overline{r} - \overline{r}'))}{(|\overline{k}_{i\alpha}|^2 - k^2)(|\overline{k}_{i\alpha}|^2 - k_L^2)^2} \quad (7)$$

Equation (6) is the representation of $g_P(k)$ using the enhanced higher order low wavenumber extraction technique with fast convergence rate that applies to 3D vector wave equations. The convergence rate can be further raised by extracting more terms of the spectral derivatives of the Green's function $g_P$ evaluated at the single low wavenumber $k_L$.

Specifically, choose $k_L=0$ in Eq. (6) and Eq. (7), leading to $$g_P(k) = g_P(0) + k^2\left[\frac{1}{2}\frac{d^2 g_P(k)}{dk^2}\right]_{k=0} + g_B(k) \quad (8)$$

Where $$g_B(k) \stackrel{\Delta}{=} \lim_{k_L \to 0} g_B(k, k_L) = \frac{1}{\Omega}\sum_\alpha \frac{k^4 \exp(i\overline{k}_{i\alpha} \cdot (\overline{r} - \overline{r}'))}{(|\overline{k}_{i\alpha}|^2 - k^2)|\overline{k}_{i\alpha}|^4} \quad (9)$$

The evaluation of $g_P(0)$ and $$\left[\frac{1}{2}\frac{d^2 g_P(k)}{dk^2}\right]_{k=0}$$

can be readily performed through Ewald summation as described in sub-section 6 below.

3. The Wire Medium Characterization Using BBGFL

Figure 20B:
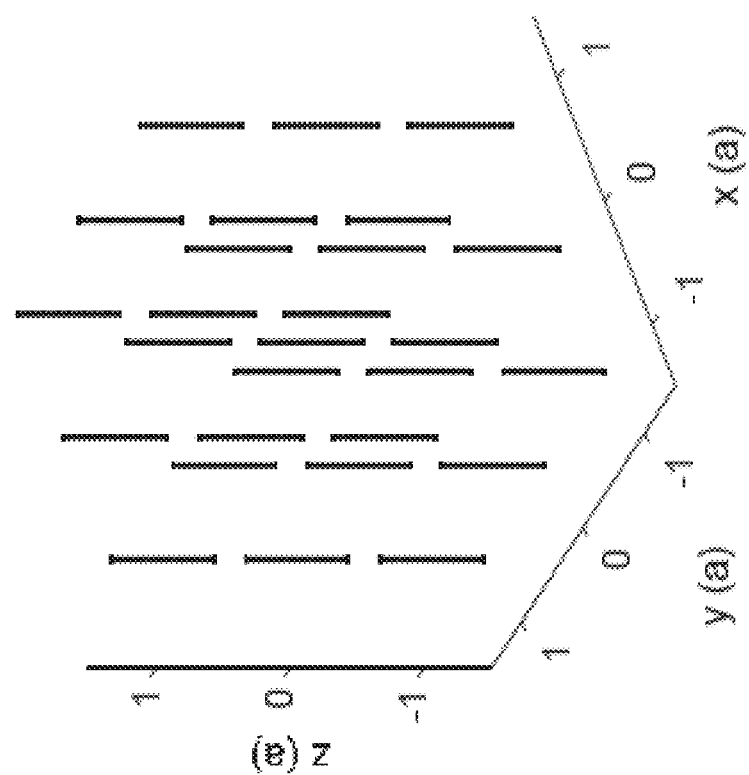
FIGS. 20A-20E illustrate various diagrams associated with arbitrary wire medium characterization using 3D broadband Green's function with higher order low wavenumber extractions.
Figure 20A:
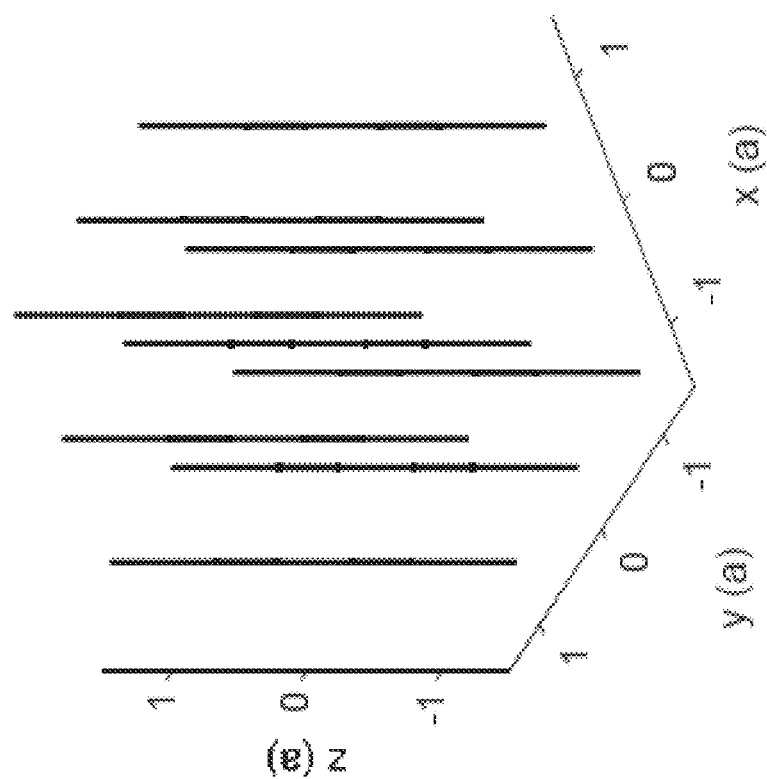

Consider the wire medium to be formed by repeating an elementary line segment in a cubic lattice with lattice constant a as depicted in FIGS. 20A-20B. Each line segment is a circular cylinder with radius $r_0$ and length L made of perfect electric conductor (PEC). When L≥a, the wire elements connect to form a one-dimensional wire medium as illustrated in FIG. 20A; when L<a, the wire elements are disconnected as shown in FIG. 20B.

3.1. Thin Wire Approximation and the Line Integral Equation

The band diagram of the wire medium can be characterized by seeking self-consistency between the modal currents and the modal fields. With no external excitations, the modal currents radiate the modal fields that satisfy boundary conditions on all the wire elements. The modal currents and modal fields satisfy the Bloch wave condition. When the radius of the wire is far less than the lattice constant, one can make the thin wire approximation, assuming the surface currents are along the wire axis and uniformly distributed across the circumference of the wire. With thin wire approximation, a line integral equation (LIE) can be constructed by forcing the axial component of the modal electric field to be zero at the center of the wire. The LIE is given as follows, $$\int_{(0)} dz' I_z(z') \left( k^2 + \frac{\partial^2}{\partial z^2} \right) \tilde{g}_P(\bar{k}_i, k; z, z') = 0 \quad (10)$$

where $I_z(z')$ represents the current along the wire, and $$\tilde{g}_P(\bar{k}_i, k; z, z') = \frac{1}{\Omega} \sum_\alpha \frac{\exp(ik_z^{i\alpha}(z-z')) J_0(|\bar{k}_\rho^{i\alpha}| r_0)}{|\bar{k}_{i\alpha}|^2 - k^2} \quad (11)$$

$\tilde{g}_P$ is related to the lattice Green's function $g_P$ as defined in Eq. (2) by integrating $\bar{r}'$ over the circumference of the wire.

$$\tilde{g}_P(\bar{k}_i, k; z, z') = \frac{1}{2\pi} \int_0^{2\pi} d\phi' g_P(\bar{k}_i, k; \bar{r}, \bar{r}')|_{\rho=0, \rho'=r_0} \quad (12)$$

The $J_0(\cdot)$ in Eq. (11) is the zero-th order Bessel function and it arises from integrating the exponential phase factor in Eq. (2) over the circular wire circumference. In Eq. (10), the integral is over an elementary wire component as indicated by $\int_{(0)} dz'$.

The band structure of the wire medium is characterized by the LIE of Eq. (10). The characterized modal wave number and modal currents $I_z(z')$ are solutions of Eq. (10). Note that the integral kernel of Eq. (10) is one component of the three dimensional (3D) dyadic Green's function. The method of moments (MoM) and the high order BBGFL technique are used to solve Eq. (10) as demonstrated as follows.

3.2. The Wire Medium Characterization using BBGFL

Note the similarity between Eq. (11) and Eq. (2). Thus, the high order BBGFL technique as illustrated in Eq. (8) applies to $\tilde{g}_P$ of Eq. (11). Explicitly, $$\tilde{g}_P(k) = \tilde{g}_P(0) + k^2 \left[ \frac{1}{2} \frac{d^2 \tilde{g}_P(k)}{dk^2} \right]_{k=0} + \quad (13)$$

$$\frac{1}{\Omega} \sum_\alpha \frac{k^4 \exp(ik_z^{i\alpha}(z-z')) J_0(|\bar{k}_\rho^{i\alpha}| r_0)}{(|\bar{k}_{i,\alpha}|^2 - k^2)|\bar{k}_{i,\alpha}|^4}$$

The representation of $\tilde{g}_P$ in Eq. (13) is used in Eq. (10), leading to $$0 = k^2 \int_{(0)} dz' I_z(z') \tilde{g}_P(\bar{k}_i, 0; z, z') + \int_{(0)} dz' I_z(z') \frac{\partial^2}{\partial z^2} \tilde{g}_P(\bar{k}_i, 0; z, z') + \quad (14)$$

$$k^4 \int_{(0)} dz' I_z(z') \left[ \frac{1}{2} \frac{d^2 \tilde{g}_P(\bar{k}_i, k; z, z')}{dk^2} \right]_{k=0} +$$

$$k^2 \int_{(0)} dz' I_z(z') \frac{\partial^2}{\partial z^2} \left[ \frac{1}{2} \frac{d^2 \tilde{g}_P(\bar{k}_i, k; z, z')}{dk^2} \right]_{k=0} +$$

$$\sum_\alpha k^2 (k^2 - (k_z^{i\alpha})^2) R_\alpha(z) b_\alpha$$

where $$R_\alpha(z) = \frac{1}{|\bar{k}_{i,\alpha}|^2} \frac{\exp(ik_z^{i\alpha} z)}{\sqrt{\Omega}} \sqrt{J_0(|\bar{k}_\rho^{i\alpha}| r_0)} \quad (15)$$

And $$b_\alpha = \frac{k^2}{(|\bar{k}_{i,\alpha}|^2 - k^2)} \int_{(0)} dz' I_z(z') R_\alpha^*(z') \quad (16)$$

where the superscript asterisk in $R^*_\alpha$ represents complex conjugate.

The solution of Eq. (14) to efficiently derive the band diagram of the wire medium is discussed in two cases: connected wire medium and disconnected wire medium.

3.3. The Connected Wire Medium

For the connected wire medium as depicted in FIG. 20A, the current along the wire axis is a constant multiplied by a phase factor, $$I_z(z') = I_0 \exp(ik_{iz} z') \quad (17)$$

Using Eq. (17) in Eq. (14) and setting z=0, a fast convergent scalar algebraic equation is obtained, $$0 = Ak^2 + B + Ck^4 + Dk^2 + \quad (18)$$

$$\frac{a}{\Omega} k^4 \sum_\alpha \frac{[k^2 - (k_z^{i\alpha})^2]}{(|\bar{k}_{i\alpha}|^2 - k^2)|\bar{k}_{i\alpha}|^4} \times J_0(|\bar{k}_\rho^{i\alpha}| r_0) \text{sinc}((k_{iz} - k_z^{i\alpha})a/2)$$

where sin c(w)=sin(w)/w, and A, B, C, and D are coefficients independent of the wavenumber k, $$A(\bar{k}_i) = \int_{-a/2}^{a/2} dz' e^{ik_{iz} z'} \tilde{g}_P(\bar{k}_i, k; z, z') \quad (19)$$

$$B(\bar{k}_i) = \int_{-a/2}^{a/2} dz' e^{ik_{iz} z'} \frac{\partial^2}{\partial z^2} \tilde{g}_P(\bar{k}_i, k; z, z')$$

$$C(\overline{k}_i) = \int_{-a/2}^{a/2} dz' e^{ik_{iz}z'} \left[ \frac{1}{2} \frac{d^2 \tilde{g}_P(\overline{k}_i, k; z, z')}{dk^2} \right]$$

$$D(\overline{k}_i) = \int_{-a/2}^{a/2} dz' e^{ik_{iz}z'} \frac{\partial^2}{\partial z^2} \left[ \frac{1}{2} \frac{d^2 \tilde{g}_P(\overline{k}_i, k; z, z')}{dk^2} \right]$$

The coefficients defined in Eq. (19) are evaluated with k=0, and z=0. In calculating these coefficients, Eq. (12) is used to represent $\tilde{g}_P$ with $g_P$ in terms of Ewald summation. One can show that B=D=0 when $\overline{k}_i \cdot \hat{z}=0$.

Note the solution of the nonlinear scalar equation Eq. (18) is efficient as the modal summation rapidly converges typically with the modal index $|m|, |n|, |l| \leq 2$, giving roughly 125 modes in a 3D lattice.

3.4. The Disconnected Wire Medium

For the disconnected wire medium as depicted in FIG. 20B, the wire element is discretized into N segments, each with length $\Delta z = L/N$, and the n-th segment centered at $z_n$. The currents along the wire are represented in terms of pulse basis.

$$I_z(z') = \sum_{n=1}^{N} I_n p_n(z') \quad (20)$$

where $p_n(z')$ is a pulse basis function. The choice of N is made such that $\Delta z$ is comparable to the wire radius $r_0$.

Using Eq. (20) to discretize Eq. (14) and applying point matching, a matrix representation of Eq. (14) is obtained, from which the modal currents can be represented in terms of the $b_\alpha$'s, $$\overline{q} = -\frac{1}{\lambda} \left[ \overline{\overline{S}} + \frac{1}{\lambda}(\overline{\overline{L}} + \overline{\overline{S}}_d) + \frac{1}{\lambda^2} \overline{\overline{L}}_d \right]^{-1} \overline{\overline{R}} \left[ \frac{1}{\lambda} \overline{\overline{I}} - \overline{\overline{T}} \right] \overline{b} \quad (21)$$

Where $$\lambda = \frac{1}{k^2} \quad (22)$$

$\overline{q}$ is a column vector of N×1 and the n-th element $q_n$ represents the integrated surface current, $$q_n = \Delta z I_z(z_n) \quad (23)$$

$\overline{b}$ is a column vector of M×1, with element $b_\alpha$ defined in Eq. (16), and M the number of terms included in the modal summation of Eq. (13). $\overline{\overline{L}}, \overline{\overline{S}}, \overline{\overline{L}}_d,$ and $\overline{\overline{S}}_d$ are N×N impedance matrices evaluated at $k_L=0$, $$L_{mn} = \frac{1}{\Delta z} \int_{z_n - \Delta z/2}^{z_n + \Delta z/2} dz' \tilde{g}_P(\overline{k}_i, 0; z, z') \Big|_{z=z_m} \quad (24)$$

$$S_{mn} = \frac{1}{\Delta z} \int_{z_n - \Delta z/2}^{z_n + \Delta z/2} dz' \frac{\partial^2}{\partial z^2} \tilde{g}_P(\overline{k}_i, 0; z, z') \Big|_{z=z_m}$$

$$L_{mn}^{(d)} = \frac{1}{\Delta z} \int_{z_n - \Delta z/2}^{z_n + \Delta z/2} dz' \frac{1}{2} \frac{d^2}{dk^2} \tilde{g}_P(\overline{k}_i, k; z, z') \Big|_{k=0; z=z_m}$$

$$S_{mn}^{(d)} = \frac{1}{\Delta z} \int_{z_n - \Delta z/2}^{z_n + \Delta z/2} dz' \frac{1}{2} \frac{d^2}{dk^2} \frac{\partial^2}{\partial z^2} \tilde{g}_P(\overline{k}_i, k; z, z') \Big|_{k=0; z=z_m}$$

The evaluation of the integrands of Eq. (24) is through the representation of $g_P$ in Eq. (12). The evaluation of $g_P$, $(\partial^2/\partial z^2) g_P$, $(d^2/dk^2) g_P$, and $(d^2/dk^2)(\partial^2/\partial z^2) g_P$ at $k_L=0$ is through Ewald's method that is described in sub-section 6 below.

The matrix $\overline{\overline{R}}$ in Eq. (21) is an N×M matrix, with $$R_{m\alpha} = R_\alpha(z_m) \quad (25)$$

The matrix $\overline{\overline{T}}$ is a diagonal matrix of M×M, with diagonal elements $$T_{\alpha\alpha} = (k_z^{i\alpha})^2 \quad (26)$$

Using Eq. (20) in Eq. (16), the matrix representation of Eq. (16) results $$\overline{b} = (\lambda \overline{\overline{I}} - \overline{\overline{D}})^{-1} \overline{\overline{D}} \overline{\overline{R}}^\dagger \overline{q} \quad (27)$$

where $\overline{\overline{R}}^\dagger$ denotes the Hermitian conjugate of $\overline{\overline{R}}$, and $\overline{\overline{D}}$ is a diagonal matrix of M×M, with $$D_{\alpha\alpha} = \lambda_\alpha = \frac{1}{|\overline{k}_{i\alpha}|^2} \quad (28)$$

Substituting Eq. (21) into Eq. (27) to eliminate $\overline{q}$ followed by some mathematical manipulations, an eigenvalue problem of $\overline{b}$ is obtained $$\lambda \overline{b} = \overline{\overline{D}} \left( \overline{\overline{I}} - \frac{1}{\lambda} \overline{\overline{R}}^\dagger \left[ \overline{\overline{S}} + \frac{1}{\lambda}(\overline{\overline{L}} + \overline{\overline{S}}_d) + \frac{1}{\lambda^2} \overline{\overline{L}}_d \right]^{-1} \overline{\overline{R}} \left( \frac{1}{\lambda} \overline{\overline{I}} - \overline{\overline{T}} \right) \right) \overline{b} \quad (29)$$

Note that the size of the eigenvalue problem is typically small and is M×M, as determined by the number of terms included in the modal summation part of Eq. (13). The eigenvalue $\lambda$ is related to the modal wavenumber k through Eq. (22). $\lambda$ is the wavenumber dependent factor in Eq. (29), while the impedance matrices $\overline{\overline{L}}, \overline{\overline{S}}, \overline{\overline{L}}_d,$ and $\overline{\overline{S}}_d$ are calculated once at $k=k_L$, and the matrices $\overline{\overline{R}}, \overline{\overline{D}},$ and $\overline{\overline{T}}$ are independent of k. The eigenvector $\overline{b}$ is related to the modal currents $\overline{q}$ through Eq. (21). The modal currents are then used to determine the modal field.

One method to solve the non-linear eigenvalue problem of Eq. (29) is to convert it into a homogeneous matrix equation $\overline{\overline{A}} \overline{b} = 0$, and then to enforce the determinant of the matrix to be zero, i.e., $\det(\overline{\overline{A}}) = 0$ with $$\overline{\overline{A}} = \overline{\overline{I}} + \frac{1}{\lambda}(\lambda \overline{\overline{I}} - \overline{\overline{D}})^{-1} \overline{\overline{D}} \overline{\overline{R}}^\dagger \times \left[ \overline{\overline{S}} + \frac{1}{\lambda}(\overline{\overline{L}} + \overline{\overline{S}}_d) + \frac{1}{\lambda^2} \overline{\overline{L}}_d \right]^{-1} \overline{\overline{R}} \left[ \frac{1}{\lambda} \overline{\overline{I}} - \overline{\overline{T}} \right] \quad (30)$$

4. Results and Discussions

In this sub-section, band diagrams of the wire media as depicted in FIGS. 20A and 20B, are calculated using the formulation developed in section III. Two cases are considered: the connected wire medium and the disconnected wire medium. In both cases, the radius of the wire is assumed to be $r_0 = 0.01a$. For the disconnected wire medium, the length of an elementary wire is $L = 0.8a$. The results of the band diagram are compared with results from other approaches.

4.1. The Connected Wire Medium

Figure 20C:
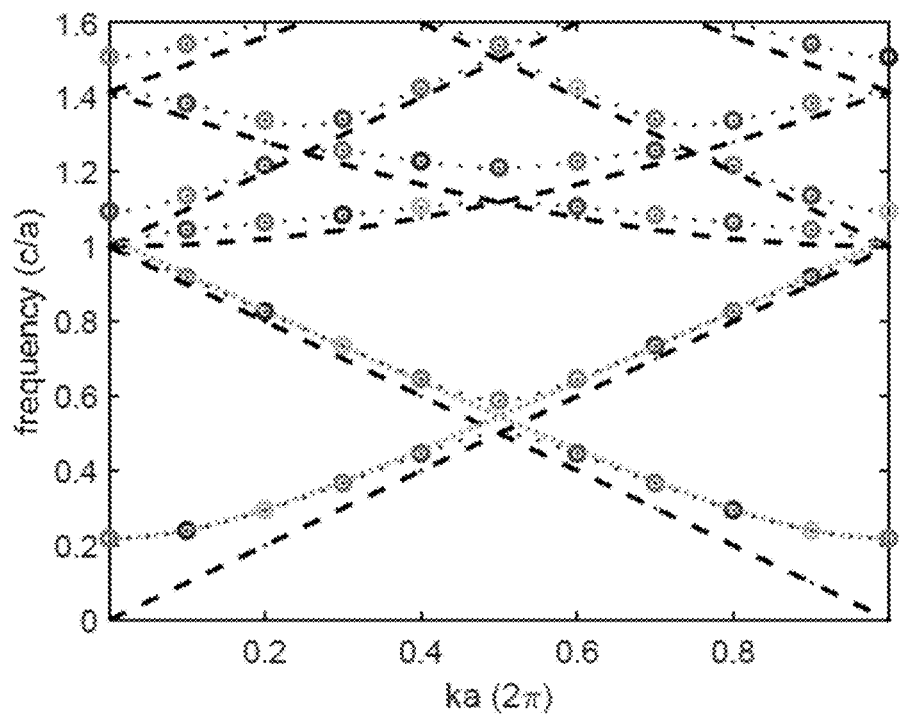

The band diagram of the connected wire medium as depicted in FIG. 20A is illustrated in FIG. 20C. This connected wire medium is known as the one-dimensional wire medium, and it exhibits behavior of a plasma at low frequency for electromagnetic waves with electric field polarized along the axis of the wire. In the simulation, the Bloch wave vector $\overline{k}_i$ is set along $\hat{x}$ direction. The BBGFL results are plotted in FIG. 20C in colored empty circles. The results agree well with the analytical solution of Belov's approach shown in red dots. The lowest bands are predicted well by the plasma dispersion] relation in the green dots except when $|\overline{k}_i|a$ approaches $\pi$. The light cones characterized by $k=|\overline{k}_{i\alpha}|$ are also depicted in black dashed curves as references.

4.2. The Disconnected Wire Medium

Figure 20D:
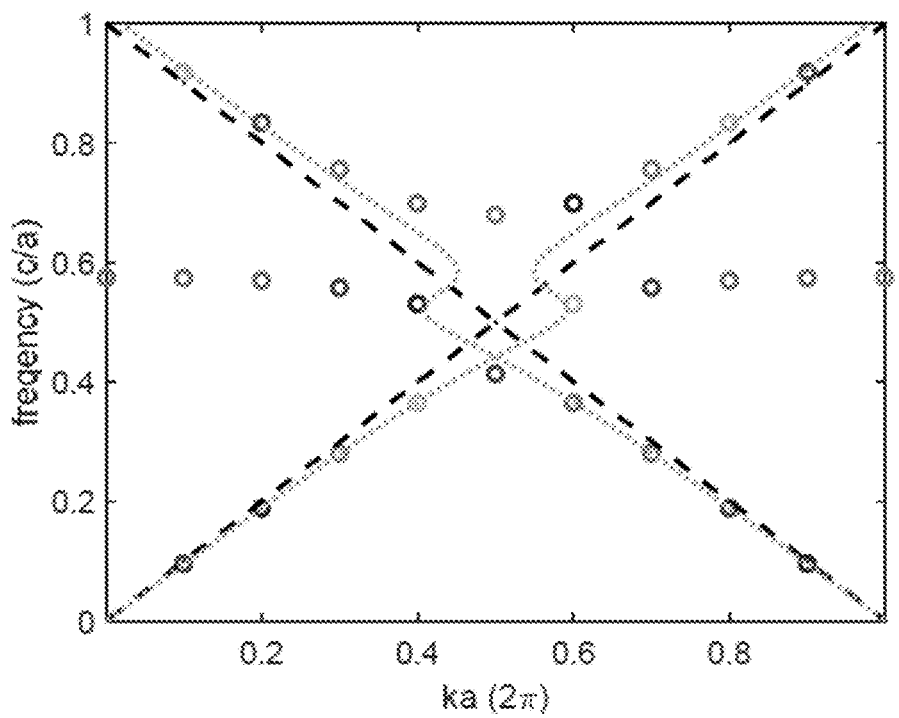

The advantage of the BBGFL approach is that it applies to arbitrary wire medium. In this second example, the band diagram associated with the disconnected wire medium as depicted in FIG. 20B is calculated. The BBGFL results are plotted in FIG. 20D in the colored empty circles. The results are distinct from the connected wire medium, as there is no plasma frequency associated with the disconnected wires. The medium is in passband at low frequency and behaves as an effective permittivity with the dispersion relation close to the light cone shown in the black dashed lines.

To gain insights in the BBGFL band diagram, the dispersion relation of the disconnected wire medium is computed using Foldy's approximation. Foldy's approximation relates the effective permittivity of a sparse random media with the averaged forward scattering amplitude of an individual scatterer in the random media, i.e., $$k_{\text{eff}} = k + n_0 \frac{2\pi}{k} \langle f(\hat{k}_s = \hat{k}_i; \hat{k}_i) \rangle \tag{31}$$

where $n_0$ is the number density of the scatterer, k is the wavenumber of the background media, $k_{\text{eff}}$ is the effective wavenumber of the random media, f denotes the scattering amplitude of an individual scatterer, and $\langle \cdot \rangle$ represents the statistical average over scatterer shape, size and orientation.

Figure 20E:
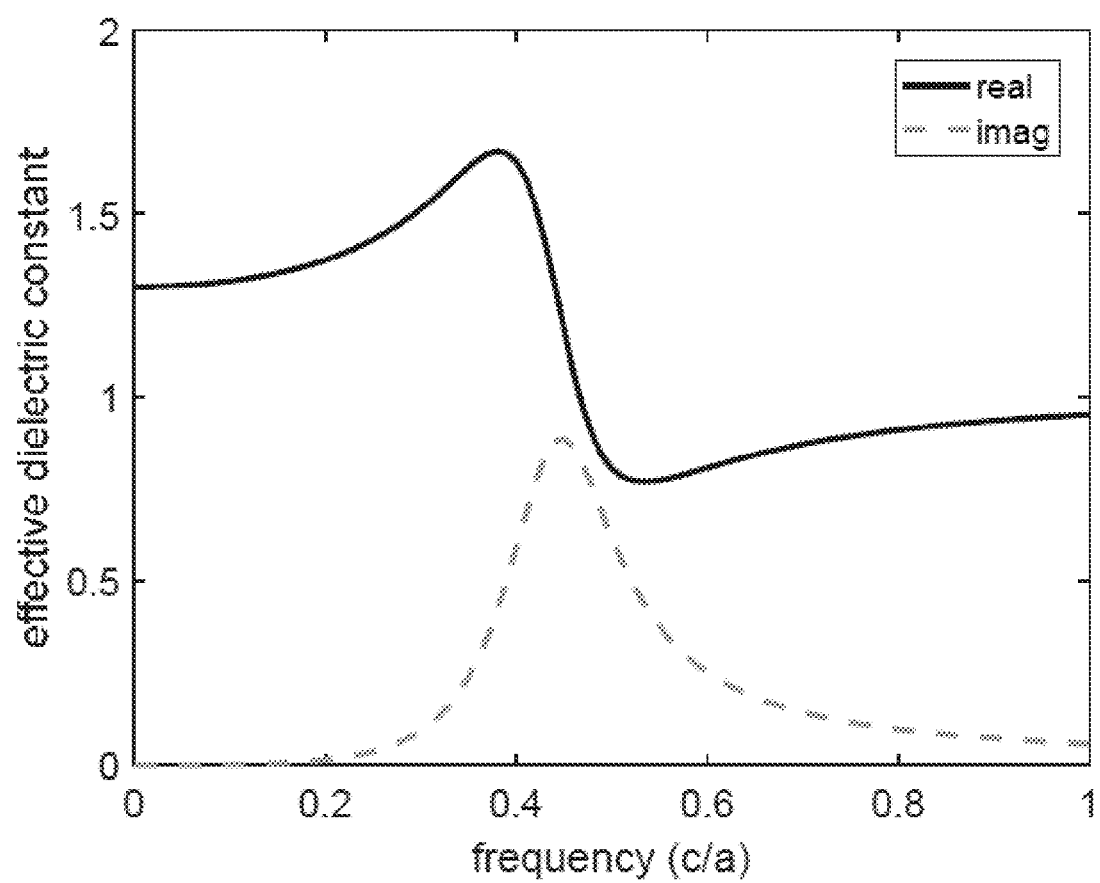

Foldy's approximation is applied to the periodic wire medium, with $\langle f \rangle$, the forward scattering amplitude of an elementary wire element, as no average is used. The real and imaginary part of the effective permittivity following Foldy's approximation is shown in FIG. 20E as a function of frequency, exhibiting a Drude like permittivity response with the resonance approaching $k_{\text{eff}}a=\pi$. The dispersion relation derived from the real part of $k_{\text{eff}}$ is also plotted in FIG. 20D in the dotted green curves, showing good agreements with the BBGFL results in the lowest band except when $ka \to \pi$. Interestingly, the band diagram indicts a stop band when Foldy's approximation predicts a resonance. The BBGFL results predicts an extra band with the normalized frequency between 0.5 and 0.6, which is not predicted by the effective medium homogenization results from Foldy's approximation.

5. Conclusions

The technique of BBGFL is extended to efficiently characterize the 3D problem of band diagram of an arbitrary wire medium. BBGFL is a method to represent Green's function using modal solutions that applies to arbitrary geometry. The low wavenumber extraction technique substantially improves the convergence rate of the modal expansion and it uses a few terms to be included. Higher order extractions are exercised in this section resulting in $6^{th}$ order convergence. The modal solutions are independent of wavenumbers, rendering BBGFL a broad band representation of the Green's function, suitable for wideband calculations. A line integral equation is derived to characterize the band diagram of the wire medium. The application of BBGFL in the integral equation converts it into an eigenvalue problem of small size, yielding all the band solutions simultaneously. The wire medium problem demonstrates the application of the BBGFL technique in 3D vector wave scattering problems for the first time. A disconnected wire medium is analyzed and it exhibits distinct behavior from its continuous counterpart. The BBGFL technique proposes itself as a promising approach to analyze periodic structures such as photonic crystals and metamaterials in both 2D and 3D applications, especially for broadband simulations.

6. Additional Details

The BBGFL technique in Eq. (6) and Eq. (8) uses the calculation of $g_P$ and $$\frac{1}{2k}\frac{dg_P}{dk}$$

at a given single low wavenumber $k_L$. For the wire medium problem, Eq. (19) and Eq. (24) involve the computation of $g_P$, $$\frac{\partial^2 g_P}{\partial z^2}, \frac{1}{2k}\frac{dg_P}{dk}, \text{ and } \frac{1}{2k}\frac{d}{dk}\frac{\partial^2 g_P}{\partial z^2} \text{ at } k_L,$$

where $g_P$ is the 3D lattice Green's function as shown in Eq. (2). This sub-section summarizes their evaluations using Ewald's method. Using Silveirinha and Fernandes's approach, at an arbitrary k, $$g_P(\overline{k}_i, k; \overline{r}) = \frac{1}{\Omega}\sum_J \frac{e^{i(\overline{k}_i+\overline{K}_J)\cdot\overline{r}}}{2|\overline{k}_i+\overline{K}_J|}\sum_{\pm}\frac{\exp(-(|\overline{k}_i+\overline{K}_J|\pm k)^2/(4E^2))}{|\overline{k}_i+\overline{K}_J|\pm k} + \tag{32}$$

$$\frac{1}{4\pi}\sum_I \cos(k\rho_I)\frac{\text{erfc}(E\rho_I)}{\rho_I}\exp(i\overline{k}_i\cdot\overline{r}_I)$$

where I and J are combined indices (same as $\alpha$ in Eq. (2)) in the spatial and spectral domain, respectively. $\rho_I=|\overline{r}-\overline{r}_I|$. $\overline{r}_I$ and $\overline{K}_J$ are the primary and reciprocal lattice vectors associated with the lattice index I and J, respectively. erfc(•) is the complementary error function. E is an arbitrary splitting factor, and the choice of $E=\sqrt{\pi}/\Omega^{1/3}$ balances the convergence rate of the spectral and spatial series. The advantage of Eq. (32) over the traditional Ewald's method is that it involves error functions with real arguments. In most cases, truncating the modal indices I, and J in each dimension at 2 suffices to accurately compute the lattice Green's function.

The evaluation of $$\frac{\partial^2 g_P}{\partial z^2}, \frac{1}{2k}\frac{dg_P}{dk}, \text{ and } \frac{1}{2k}\frac{d}{dk}\frac{\partial^2 g_P}{\partial z^2}$$

follows directly from Eq. (32). The results with $k \to 0$ are summarized as follows.

$$g_P(\overline{k}_i, 0; \overline{r}) = \tag{33}$$

$$\frac{1}{\Omega}\sum_J \frac{e^{i(\overline{k}_i+\overline{K}_J)\cdot\overline{r}}}{|\overline{k}_i+\overline{K}_J|^2}\exp\left(-\frac{|\overline{k}_i+\overline{K}_J|^2}{4E^2}\right) + \frac{1}{4\pi}\sum_I \frac{\text{erfc}(E\rho_I)}{\rho_I}\exp(i\overline{k}_i\cdot\overline{r}_I)$$

-continued $$\frac{\partial^2}{\partial z^2} g_P(\overline{k}_i, 0; \overline{r}) = \quad (34)$$

$$\frac{1}{\Omega} \sum_J \frac{-((\overline{k}_i + \overline{K}_J) \cdot \hat{z})^2 e^{i(\overline{k}_i + \overline{K}_J) \cdot \overline{r}}}{|\overline{k}_i + \overline{K}_J|^2} \exp\left(-\frac{|\overline{k}_i + \overline{K}_J|^2}{4E^2}\right) +$$

$$\frac{1}{4\pi} \sum_l \frac{\partial^2}{\partial z^2}\left[\frac{\mathrm{erfc}(E\rho_l)}{\rho_l}\right] \exp(i\overline{k}_i \cdot \overline{r}_l)$$

$$\lim_{k \to 0} \frac{1}{2k} \frac{d}{dk} g_P(\overline{k}_i, 0; \overline{r}) = \quad (35)$$

$$\frac{1}{\Omega} \sum_J \frac{e^{i(\overline{k}_i + \overline{K}_J) \cdot \overline{r}}}{2|\overline{k}_i + \overline{K}_J|} \exp\left(-\frac{|\overline{k}_i + \overline{K}_J|^2}{4E^2}\right) \times \left[\frac{|\overline{k}_i + \overline{K}_J|}{4E^4} + \frac{2}{4E^2|\overline{k}_i + \overline{K}_J|} + \frac{2}{|\overline{k}_i + \overline{K}_J|^3}\right] + \frac{1}{4\pi} \sum_l \left(-\frac{\rho_l^2}{2}\right) \frac{\mathrm{erfc}(E\rho_l)}{\rho_l} \exp(i\overline{k}_i \cdot \overline{r}_l)$$

$$\lim_{k \to 0} \frac{1}{2k} \frac{d}{dk} \frac{\partial^2}{\partial z^2} g_P(\overline{k}_i, 0; \overline{r}) = \quad (36)$$

$$\frac{1}{\Omega} \sum_J \frac{-((\overline{k}_i + \overline{K}_J) \cdot \hat{z})^2 e^{i(\overline{k}_i + \overline{K}_J) \cdot \overline{r}}}{2|\overline{k}_i + \overline{K}_J|} \exp\left(-\frac{|\overline{k}_i + \overline{K}_J|^2}{4E^2}\right) \times$$

$$\left[\frac{|\overline{k}_i + \overline{K}_J|}{4E^4} + \frac{2}{4E^2|\overline{k}_i + \overline{K}_J|} + \frac{2}{|\overline{k}_i + \overline{K}_J|^3}\right] -$$

$$\frac{1}{4\pi} \sum_l \left[\left(\frac{\partial \rho_l}{\partial z}\right)^2 \times \left(\frac{\mathrm{erfc}(E\rho_l)}{\rho_l} + 2\rho_l \frac{d}{d\rho_l} \frac{\mathrm{erfc}(E\rho_l)}{\rho_l} + \frac{\rho_l^2}{2} \frac{d^2}{d\rho_l^2} \frac{\mathrm{erfc}(E\rho_l)}{\rho_l}\right) + \left(\mathrm{erfc}(E\rho_l) + \frac{\rho_l^2}{2} \frac{d}{d\rho_l} \frac{\mathrm{erfc}(E\rho_l)}{\rho_l}\right) \frac{\partial^2 \rho_l}{\partial z^2}\right] \exp(i\overline{k}_i \cdot \overline{r}_l)$$

Note that the calculation in Eq. (33)-(36) may be carried out once at the single $k_L$, and thus it does not increase the overall complexity of the BBGFL technique.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A computing device, comprising:
a memory that stores computer instructions;
a processor that executes the computer instructions to perform actions including:
receiving a map of a periodic structure of an object having a specified geometry with source locations of exciting waves, the source locations being either inside theperiodic structure or outside the periodic structure;
computing Broadband Green's function for the specified geometry of theperiodic structure with periodically embedded scatterers, including
determining first Broadband Green's function for the specified geometry in an empty lattice without the plurality of embedded scatterers;
performing a first simulation of band eigenvalues and band field solutions for the specified geometry using the first Broadband Green's function, wherein the band eigenvalues are band frequencies and exhibit bandpasses and bandgaps, and wherein the band fieldsolutions are calculated from integral equations and are functions of space and are orthogonal;
normalizing the band field solutions prior to determining a second Broadband Green's function;
determining the second Broadband Green's function for the specified geometry in a non-empty lattice with the plurality of scatterers, using the band eigenvalues and the normalized band field solutions, including performing low wavenumber extraction to accelerate convergence of the Second Broadband Green's functions with plurality of scatterers;
performing a second simulation of signals of sources and defects inside the object using the second Broadband Green's function;
determining if the object meets at least one performance criteria based on the first and second simulations;
in response to the object not meeting the at least one performance criteria:
determining a modified periodic structure of the object by modifyingthe source locations and polarizations in the periodic structure based on the first and second simulations; and
providing an instruction to another computing device to fabricate anew object with the modified periodic structure; and
in response to the object meeting the at least one performance criteria, providing an indication that the object meets the at least one performance criteria.

2. The computing device of claim 1, wherein the computed Broadband Green's functions are suitable for computing the electromagnetic of optical signals due to electromagnetic or optical sources dispersed in the object.

3. The computing device of claim 1, wherein the Broadband Green's functions are suitable for simulation of signals in periodic structures with scatterers.

4. The computing device of claim 1, wherein the processor executes the computer instructions to perform further actions including performing simulations using the Broadband Green's functions over a wide frequency range without repeating for every frequency.

5. A system comprising:
a memory that stores computer instructions;
a processor that executes the computer instructions to perform actions including:
receiving a specified periodic lattice of an object having a plurality of scatterers;
determining first Broadband Green's function for the specified periodic lattice in an empty lattice without the plurality of scatterers;
performing a first simulation of band eigenvalues and band field solutions for the specified periodic lattice using the first Broadband Green's function, wherein the band eigenvalues are band frequencies and exhibit bandpasses and bandgaps, and wherein the band fieldsolutions are calculated from integral equations and are functions of space and are orthogonal;

normalizing the band field solutions prior to determining a second Broadband Green's function;

determining the second Broadband Green's function for the specified periodic lattice in a non-empty lattice with the plurality of scatterers, using the band eigenvalues and the normalized band field solutions, including performing low wavenumber extraction to accelerate convergence of the Second Broadband Green's functions with plurality of scatterers;

performing a second simulation of signals of sources and defects inside theobject using the second Broadband Green's function;

performing a third simulation of signals of sources placed outside the objectusing the second Broadband Green's function;

determining performance of the specified periodic lattice structure; and modifying at least one structure design of the specified periodic lattice structure based on the first, second, and third simulations and the determined performance of thespecified periodic lattice structure; and providing an instruction to another computing device to fabricate a new object with the modified specified periodic lattice structure.

6. The system of claim 5, wherein the object is one of ametamaterial, a photonic crystal, and a phononic crystal.

7. The system of claim 5, wherein determining the first Broadband Green's function includes converting the first Broadband Green's function into a linear eigenvalue problem.

8. The system of claim 7, wherein converting the first Broadband Green's function into the linear eigenvalue problem includes low wavenumber extraction.

9. The system of claim 5, wherein the second Broadband Green'sf unction includes band mode expansion and low wavenumber extraction.

10. The system of claim 5, wherein the first and second Broadband Green's functions are used to formulate integral equations that are suitable for performing simulations over a wide frequency range without repeating for every frequency or wavelength.

11. The system of claim 5, wherein the specified periodic lattice scatterer structure includes at least one of impurities, defects, displacement of scatterers, and putting the periodic scatterers in a finite volume.

12. The system of claim 5, wherein modifying the at least one structure design of the specified periodic lattice structure includes providing an instruction for another system to change the specified periodic lattice structure.

13. A computer-implemented method, comprising:

receiving a specified periodic structure of an object having periodic scatterers, the specified periodic structure having a given lattice shape, background permittivity, and permeability, the scatterers having a size, shape, permittivity, and permeability;

determining first Broadband Green's function with low wavenumber extraction for the specified periodic structure without the scatterers;

determining a solution of surface integral equations with the scatterers by casting into a matrix equation;

computing mode eigenvalues and mode eigenfunctions from the matrix equation; computing band diagrams, bandpasses, and bandgaps for the solution;

computing band field solutions of modes of electromagnetic and optical signals andpolarization dependences for the solution;

normalizing the band field solutions prior to determining a second BroadbandGreen's function;

determining the second Broadband Green's function for the specified periodic structure in a non-empty lattice with the scatterers, using the solution and the normalized band field solutions, including performing low wavenumber extraction to accelerate convergence of the Second Broadband Green's functions with the scatterers;

performing a simulation of signals of sources and defects inside the object using the second Broadband Green's function;

modifying at least one structure design of the specified periodic structure including the scatterers based on the simulation; and instructing fabrication of the object based on the at least one modified structuredesign of the specified periodic structure.

14. The computer-implemented method of claim 13, wherein the object is one of a metamaterial, a photonic crystal, and a phononic crystal.

15. The computer-implemented method of claim 13, wherein the second Broadband Green's functions are suitable for simulation of signals in periodic structures with scatterers.

16. The computer-implemented method claim 13, wherein the second Broadband Green's functions are suitable for performing simulations over awide frequency range without repeating for every frequency.

17. The computer-implemented method of claim 13, wherein instructing fabrication of the object includes providing an instruction to another computer to fabricate the object with the specified periodic structure having the at least one modified structure design.

* * * * *